(12) United States Patent
Lan et al.

(10) Patent No.: US 12,547,902 B2
(45) Date of Patent: Feb. 10, 2026

(54) DEVICE AND METHOD FOR NEURAL NETWORK COMPUTING, AND BOARD AND READABLE STORAGE MEDIUM

(71) Applicant: Cambricon Technologies Corporation Limited, Beijing (CN)

(72) Inventors: Huiying Lan, Beijing (CN); Ruitao Wang, Beijing (CN); Haizhao Luo, Beijing (CN); Bo Cao, Beijing (CN); Xunyu Chen, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 625 days.

(21) Appl. No.: 18/003,682

(22) PCT Filed: Sep. 23, 2021

(86) PCT No.: PCT/CN2021/119943
§ 371 (c)(1),
(2) Date: Dec. 28, 2022

(87) PCT Pub. No.: WO2022/063183
PCT Pub. Date: Mar. 31, 2022

(65) Prior Publication Data
US 2023/0274158 A1   Aug. 31, 2023

(30) Foreign Application Priority Data

Sep. 28, 2020 (CN) .......................... 202011043896.3
Sep. 28, 2020 (CN) .......................... 202011045852.4
(Continued)

(51) Int. Cl.
*G06N 3/10* (2006.01)
(52) U.S. Cl.
CPC ..................................... *G06N 3/10* (2013.01)

(58) Field of Classification Search
USPC ................................ 716/100, 103, 104, 106
See application file for complete search history.

(56) References Cited

U.S. PATENT DOCUMENTS

| 6,311,265 B1 | 10/2001 | Beckerle et al. |
| 2018/0314928 A1 | 11/2018 | Li et al. |

(Continued)

FOREIGN PATENT DOCUMENTS

| CN | 109754073 A | 5/2019 |
| CN | 110321999 A | 10/2019 |

(Continued)

OTHER PUBLICATIONS

PCT/CN2021/119943- International Search Report, mailed on Dec. 23, 2021, 7 pages.

(Continued)

*Primary Examiner* — Brian Ngo
(74) *Attorney, Agent, or Firm* — Getech Law LLC; Jun Ye

(57) ABSTRACT

The present disclosure relates to an apparatus and a method for performing neural network computing, a board card, and a readable storage medium. The computing apparatus of the present disclosure is included in an integrated circuit apparatus. The integrated circuit apparatus includes a general interconnection interface and other processing apparatus. The computing apparatus interacts with other processing apparatus to jointly complete a computing operation specified by a user. The integrated circuit apparatus further includes a storage apparatus. The storage apparatus is connected to the computing apparatus and other processing apparatus, respectively. The storage apparatus is used for data storage of the computing apparatus and other processing apparatus.

12 Claims, 36 Drawing Sheets

(30) Foreign Application Priority Data

Sep. 28, 2020 (CN) .......................... 202011045871.7
Sep. 28, 2020 (CN) .......................... 202011045888.2

(56) References Cited

U.S. PATENT DOCUMENTS

| | | | | |
|---|---|---|---|---|
| 2019/0325309 A1* | 10/2019 | Flamant | ................. | G06N 3/048 |
| 2020/0348662 A1* | 11/2020 | Cella | ..................... | G06N 3/084 |
| 2021/0157312 A1* | 5/2021 | Cella | ..................... | H04L 1/0041 |
| 2021/0174214 A1* | 6/2021 | Venkatesan | .......... | G06N 3/0495 |

FOREIGN PATENT DOCUMENTS

| | | | |
|---|---|---|---|
| CN | 110490309 A | 11/2019 |
| CN | 110908667 A | 3/2020 |
| CN | 111415007 A | 7/2020 |
| CN | 111667051 A | 9/2020 |
| CN | 111684470 A | 9/2020 |

OTHER PUBLICATIONS

Chen et al., "Deep Learning Processor Architecture", AI Computing Systems, Intelligent Computing System, China Machine Press, Apr. 30, 2020, 42 pages.
CN 202011045871.7—First Office Action mailed on Dec. 27, 2024, 18 pages.
CN202011043896.3—First Office Action malled on Dec. 20, 2024, 28 pages.
CN202011045852.4—First Office Action mailed on Dec. 31, 2024, 22 pages.
CN202011045888.2—First Office Action mailed on Dec. 13, 2024, 16 pages.
CN202011045852.4—Second Office Action mailed on Jul. 1, 2025, 36 pages.

\* cited by examiner

DEVICE AND METHOD FOR NEURAL NETWORK COMPUTING, AND BOARD AND READABLE STORAGE MEDIUM

CROSS REFERENCE OF RELATED APPLICATIONS

The present application is a 371 of international Application PCT/CN2021/119943, filed Sep. 23, 2021, which claims priority to: Chinese Patent Application No. 2020110458882 with the title of "Apparatus and Method for Fusion of Neural Network, Board Card, and Readable Storage Medium" filed on Sep. 28, 2020; Chinese Patent Application No. 2020110438963 with the title of "Computing Apparatus and Method for Computing Neural Network, Board Card, and Readable Storage Medium" filed on Sep. 28, 2020; Chinese Patent Application No. 2020110458717 with the title of "Apparatus and Method for Neural Network Computing, Board Card, and Readable Storage Medium" filed on Sep. 28, 2020; and Chinese Patent Application No. 2020110458524 with the title of "Apparatus and Method for Fusion of Neural Network, Board Card, and Readable Storage Medium" filed on Sep. 28, 2020. The contents of the aforementioned applications are incorporated herein by reference in their entireties.

TECHNICAL FIELD

The present disclosure generally relates to a neural network field. More specifically, the present disclosure relates to an apparatus and a method for performing neural network computing, a board card, and a readable storage medium.

BACKGROUND

A neural network is composed of a plurality of neuron systems connected according to certain rules. Roughly, the neural network is composed of following four layers: an input layer, a convolution layer, a pooling layer, and a fully connected layer.

The input layer is configured to truncate part of information from input data and convert the part of information into a feature matrix for presentation, where the feature matrix contains features corresponding to the part of information. The convolution layer is configured to receive the feature matrix from the input layer and perform feature extraction on the input data through a convolution operation. The convolution layer may be a multi-layer convolution layer in practice. The pooling layer is configured to replace a certain area of data with a value. This value is usually a maximum value or an average value of all values in the area. By pooling, on the premise of not losing too much information, a size of a model may be reduced, and computing speed may be improved. The fully connected layer plays the role of a classifier in the whole convolution neural network, which is equivalent to feature space conversion. The feature space conversion refers to extracting and integrating all useful information in previous layers and comparing the information based on different categories to judge whether the input data is similar to comparison objects.

With the development of technology, the number of layers of the neural network is increasing. Taking a classical visual geometry group (VGG) architecture as an example, VGG-A has a total of 11 weight layers, VGG-B has a total of 13 weight layers, VGG-C has a total of 16 weight layers, VGG-D has a total of 16 weight layers, and VGG-E has a total of 19 weight layers. The convolution layer and the fully connected layer refer to the weight layer in general. Some neural networks even have hundreds of layers. Not only that, with the increase of the number of layers, the number of parameters of the neural network also increases exponentially. For example, AlexNet has 60 million parameters participating in computing.

Both multiple layers and multiple parameters require a lot of on-chip and off-chip input/output accesses, which consumes a lot of resources and delays operation time simultaneously. Therefore, a mechanism to reduce the input/output accesses is urgently required in the field of artificial intelligence.

SUMMARY

In order to at least partly solve technical problems mentioned in BACKGROUND, a solution of the present disclosure provides an apparatus and a method for performing neural network computing, a board card, and a readable storage medium.

A first aspect of the present disclosure discloses an integrated circuit apparatus for performing neural network computing. The apparatus includes: a processing apparatus used to create a template fuse unit; a compiler used to convert the template fuse unit into an object code; a linker used to link the object code with a library to form an executable file; and a computing apparatus used to perform the executable file to implement the neural network computing.

A second aspect of the present disclosure discloses a board card, including the integrated circuit apparatus.

A third aspect of the present disclosure discloses a method for performing neural network computing. The method includes: creating a template fuse unit; converting the template fuse unit into an object code; linking the object code with a library to form an executable file; and performing the executable file to implement the neural network computing.

A fourth aspect of the present disclosure discloses a computer readable storage medium, on which computer program codes for performing neural network computing are stored. When the computer program codes are run by a processing apparatus, the method is performed.

By setting a fusion policy, the present disclosure dynamically determines the template fuse unit, fuses a plurality of layers in the neural network to form a new self-defined layer, and loads data required for computing the template fuse unit at a time, so as to reduce input/output overheads.

BRIEF DESCRIPTION OF DRAWINGS

By reading the following detailed description with reference to drawings, the above and other objects, features and technical effects of exemplary implementations of the present disclosure will become easier to understand. In the drawings, several implementations of the present disclosure are shown in an exemplary but not restrictive manner, and the same or corresponding reference numerals indicate the same or corresponding parts.

DETAILED DESCRIPTION

Figure 1:
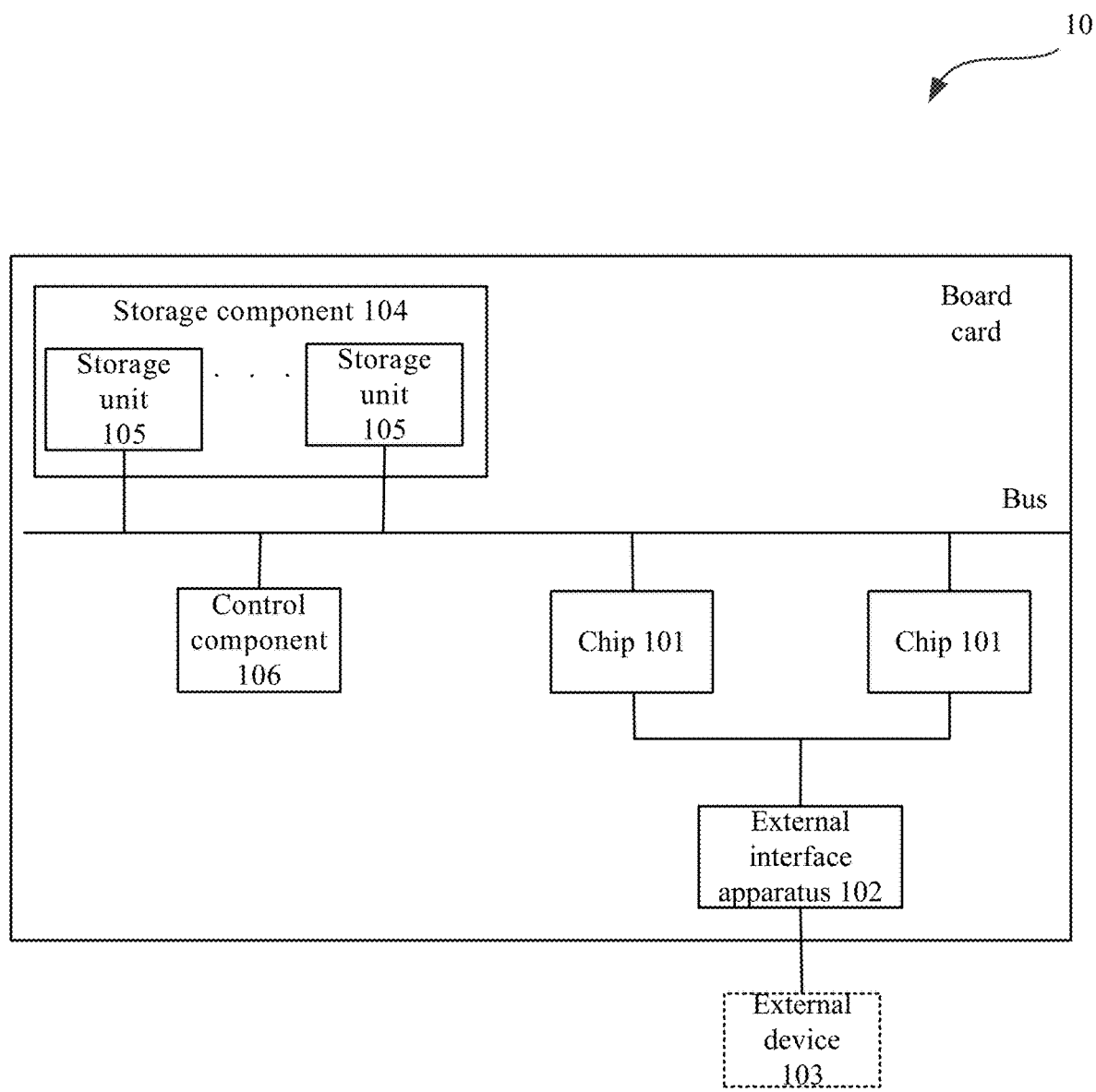
FIG. 1 is a structural diagram of a board card according to an embodiment of the present disclosure.

Technical solutions in embodiments of the present disclosure will be described clearly and completely hereinafter with reference to drawings in the embodiments of the present disclosure. Obviously, embodiments to be described are merely some rather than all embodiments of the present disclosure. All other embodiments obtained by those skilled in the art based on the embodiments of the present disclosure without creative efforts shall fall within the scope of protection of the present disclosure.

It should be understood that terms such as "first", "second", "third", and "fourth" that appear in the claims, the specification, and the drawings are used for distinguishing different objects rather than describing a specific order. It should be understood that terms "including" and "comprising" used in the specification and the claims indicate the presence of a feature, an entity, a step, an operation, an element, and/or a component, but do not exclude the existence or addition of one or more of other features, entities, steps, operations, elements, components, and/or collections thereof.

It should also be understood that terms used in the specification of the present disclosure are merely intended to describe a specific embodiment rather than to limit the present disclosure. As being used in the specification and the claims of the present disclosure, unless the context clearly indicates otherwise, singular forms such as "a", "an", and "the" are intended to include plural forms. It should also be understood that a term "and/or" used in the specification and the claims refers to any and all possible combinations of one or more of relevant listed items and includes these combinations.

As being used in the specification and the claims of the present disclosure, a term "if" may be interpreted as "when", or "once" or "in response to a determination" or "in response to a case where something is detected" depending on the context.

Specific implementations of the present disclosure will be described in detail in combination with drawings below.

A neural network is composed of an input layer, a convolution layer, an activation function, a pooling layer, and a fully connected layer, with several layers at least and hundreds of layers at most. Each layer performs an operator. For example, the convolution layer performs a convolution operator, and how many operators are required to be performed as there are how many layers. When a particular layer is mentioned in the present disclosure, the layer refers to an operator corresponding to the layer.

During neural network computing, input information and an output result of each layer of a model are different for each inference computing and are viewed as variable data. The variable data is generally represented by a feature map (matrix). In the present disclosure, input information of the whole neural network model and an input map of each layer of the model are collectively called a feature map. Once the feature map is loaded onto an on-chip memory component, the feature map is referred as an on-chip unit map in the present disclosure. Parameters for training a network model usually do not change frequently after the training is stabilized, or the parameters are compiled and generated after a network topology structure and hardware parameters are determined and do not changed during a computing process. Therefore, the parameters may be viewed as constant data. The constant data includes but is not limited to a weight, a bias, a device hardware instruction, a mean and a variance of batchnorm, and the like. In the present disclosure, the weight is used to represent all constant data uniformly. However, when "data" is mentioned in the present disclosure, the "data" generally refers to a map structure that allows operations corresponding to operators to be fused together in the neural network model according to a fusion policy. Variable data and constant data involved in the map structure are feature maps plus corresponding weights.

FIG. 1 is a schematic structural diagram of a board card 10 according to an embodiment of the present disclosure. As shown in FIG. 1, the board card 10 includes a chip 101, which is a system on chip (SoC), or called an on-chip system, and integrates one or a plurality of combined processing apparatuses. The combined processing apparatus is an artificial intelligence operation unit, which is used to support various deep learning algorithms and various machine learning algorithms and meet requirements for intelligent processing in complex scenarios in computer vision, speech, natural language processing, data mining, and other fields. In particular, deep learning technology is widely applied in the field of cloud intelligence. A notable feature of cloud intelligence applications is a large amount of input data, which has high requirements for storage capacity and computing power of a platform. The board card 10 of this embodiment is suitable for cloud intelligent applications. The board card 10 of this embodiment has huge off-chip storage, huge on-chip storage, and a lot of computing power.

The chip 101 is connected to an external device 103 through an external interface apparatus 102. The external device 103 may be, for example, a server, a computer, a camera, a monitor, a mouse, a keyboard, a network card, or a WIFI interface. To-be-processed data may be transferred from the external device 103 to the chip 101 through the external interface apparatus 102. A computing result of the chip 101 is still sent back to the external device 103 by the external interface apparatus 102. According to different application scenarios, the external interface apparatus 102 may have different interface forms, such as a peripheral component interconnect express (PCIe) interface.

The board card 10 further includes a storage component 104 used for storing data. The storage component 104 includes one or a plurality of storage units 105. The storage component 104 is connected to and transfers data to a control component 106 and the chip 101 through a bus. The control component 106 in the board card 10 is configured to regulate and control a state of the chip 101. As such, in an application scenario, the control component 106 may include a micro controller unit (MCU).

Figure 2:
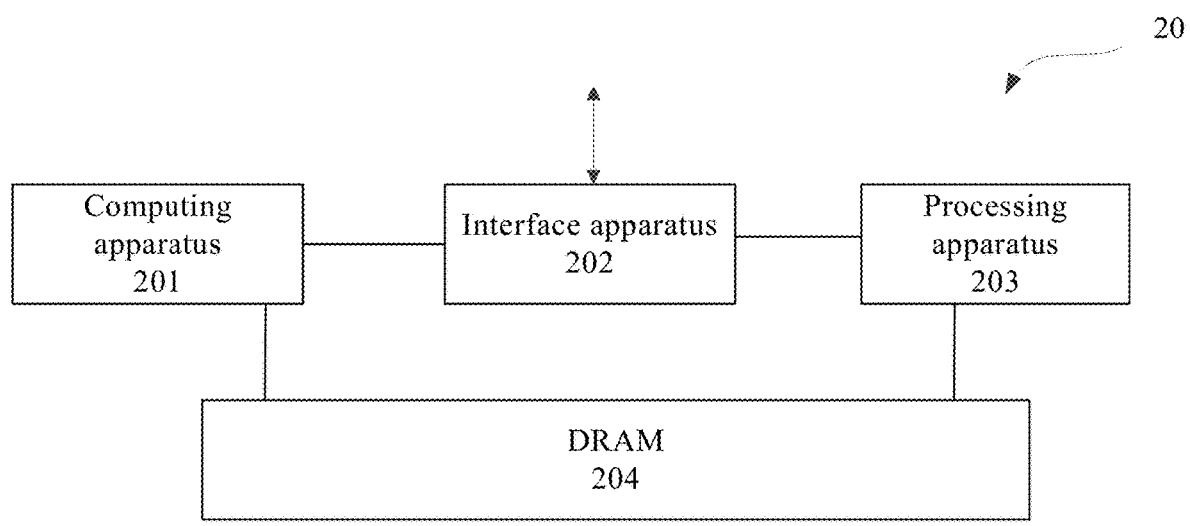
FIG. 2 is a structural diagram of an integrated circuit apparatus according to an embodiment of the present disclosure.

FIG. 2 is a structural diagram of a combined processing apparatus in the chip 101 of this embodiment. As shown in FIG. 2, the combined processing apparatus 20 includes a computing apparatus 201, an interface apparatus 202, a processing apparatus 203, and a dynamic random access memory (DRAM) 204.

The computing apparatus 201 is configured to perform an operation specified by a user. The computing apparatus 201 is mainly implemented as a single-core intelligent processor or a multi-core intelligent processor. The computing apparatus 201 is used for performing deep learning computing or machine learning computing. The computing apparatus 201 interacts with the processing apparatus 203 through the interface apparatus 202, so as to jointly complete the operation specified by the user.

The interface apparatus 202 is used to transfer data and control instructions between the computing apparatus 201 and the processing apparatus 203. For example, the computing apparatus 201 may acquire input data from the processing apparatus 203 via the interface apparatus 202 and write the input data to an on-chip storage apparatus of the computing apparatus 201. Further, the computing apparatus 201 may acquire the control instructions from the processing apparatus 203 via the interface apparatus 202 and write the control instructions to an on-chip control cache of the computing apparatus 201. Alternatively or optionally, the interface apparatus 202 may further read data in the storage apparatus of the computing apparatus 201 and then transfer the data to the processing apparatus 203.

The processing apparatus 203 serves as a general processing apparatus and performs basic controls that include but are not limited to moving data, starting and/or stopping the computing apparatus 201. According to different implementations, the processing apparatus 203 may be a central processing unit (CPU), a graphics processing unit (GPU), or one or more types of other general and/or dedicated processors. These processors include but are not limited to a digital signal processor (DSP), an application specific integrated circuit (ASIC), a field-programmable gate array (FPGA), or other programmable logic components, discrete gate or transistor logic components, discrete hardware components, and the like. Moreover, the number of the processors may be determined according to actual requirements. As described above, with respect to the computing apparatus 201 of the present disclosure only, the computing apparatus 201 of the present disclosure may be viewed as having a single-core structure or an isomorphic multi-core structure. However, when considered together, the computing apparatus 201 and the processing apparatus 203 may be viewed as forming a heterogeneous multi-core structure.

The DRAM 204 is used for storing to-be-processed data. The DRAM 204 is a double data rate (DDR) memory with a size of 16G or more than 16G generally. The DRAM 204 is used for saving data of the computing apparatus 201 and/or the processing apparatus 203.

Figure 3:
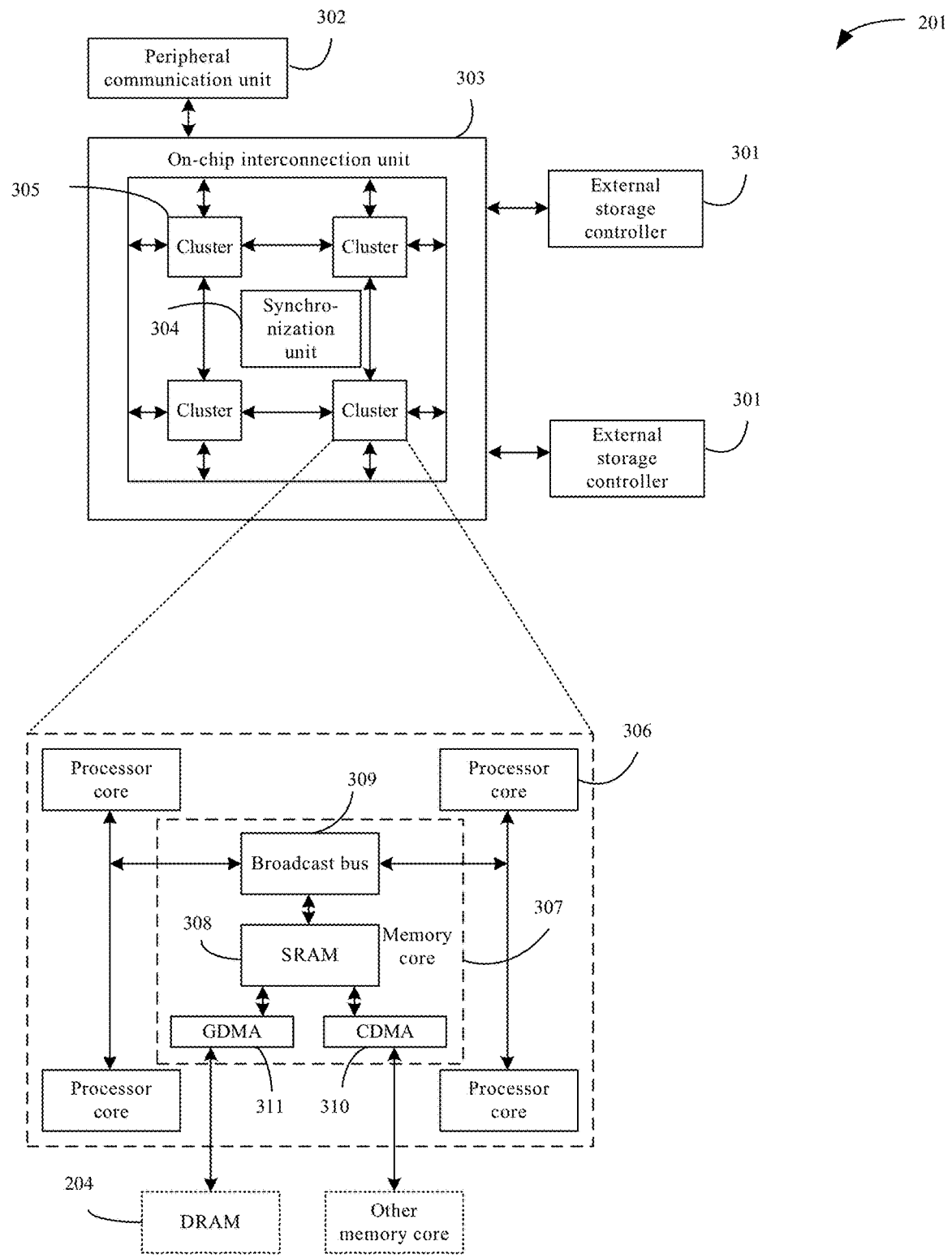
FIG. 3 is a schematic diagram of an internal structure of a computing apparatus according to an embodiment of the present disclosure.

FIG. 3 is a schematic diagram of an internal structure of a computing apparatus 201. The computing apparatus 201 is used for processing input data in computer vision, speech, natural language, and data mining. The computing apparatus 201 in the figure is designed in a multi-core hierarchical structure. The computing apparatus 201 serves as an on-chip system, which includes a plurality of clusters. Each cluster further includes a plurality of processor cores. In other words, the computing apparatus 201 is composed of an on-chip system-cluster-processor core hierarchy.

In terms of a hierarchy of the on-chip system, as shown in FIG. 3, the computing apparatus 201 includes an external storage controller 301, a peripheral communication unit 302, an on-chip interconnection unit 303, a synchronization unit 304, and a plurality of clusters 305.

There may be a plurality of external storage controllers 301, two of which are illustrated in the figure. The external storage controllers are used to, in response to access requests from the processor cores, access an external storage device, such as the DRAM 204 in FIG. 2, so as to read or write data from the off-chip. The peripheral communication unit 302 is used to receive a control signal from the processing apparatus 203 through the interface apparatus 202 and start the computing apparatus 201 to perform a task. The on-chip interconnection unit 303 connects the external storage controller 301, the peripheral communication unit 302, and the plurality of clusters 305. The on-chip interconnection unit 303 is used for transferring data and control signals between units. The synchronization unit 304 is a global barrier controller (GBC). The synchronization unit 304 is used for coordinating a work progress of each cluster, so as to ensure synchronization of information. The plurality of clusters 305 are computing cores of the computing apparatus 201, four of which are illustrated in the figure. With the development of hardware, the computing apparatus 201 of the present disclosure may further include 8, 16, 64, or even more clusters 305. The clusters 305 are used for efficiently performing deep learning algorithms.

In terms of a hierarchy of the clusters, as shown in FIG. 3, each cluster 305 includes a plurality of processor cores (IPU cores) 306 and a memory core (MEM core) 307.

Figure 4:
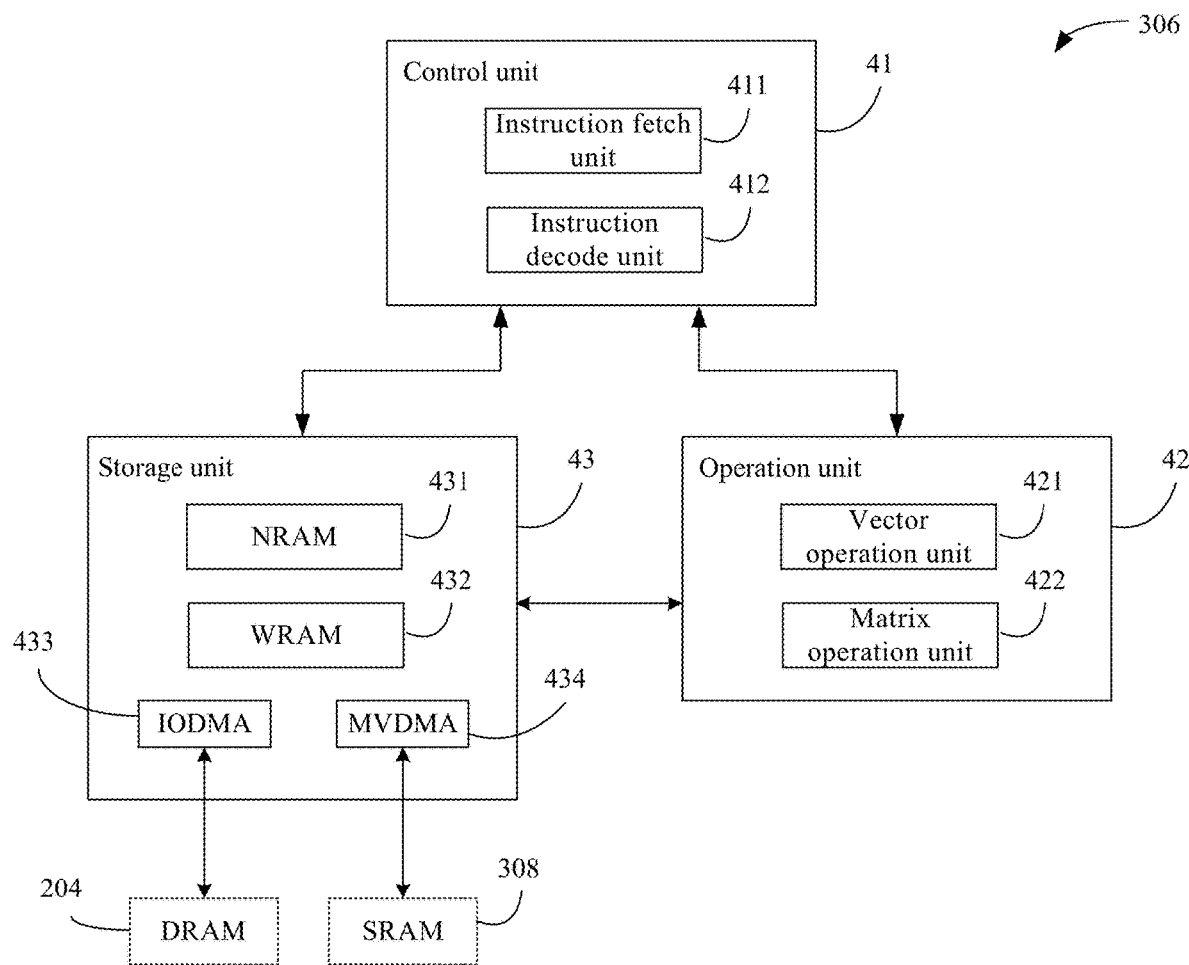
FIG. 4 is a schematic diagram of an internal structure of a processor core according to an embodiment of the present disclosure.

Four processor cores 306 are illustrated in the figure. The present disclosure does not limit the number of the processor cores 306. An internal structure of a processor core is as shown in FIG. 4. Each processor core 306 includes three units: a control unit 41, an operation unit 42, and a storage unit 43.

The control unit 41 is used for coordinating and controlling work of the operation unit 42 and the storage unit 43, so as to complete a deep learning task. The control unit 41 includes an instruction fetch unit (IFU) 411 and an instruction decode unit (IDU) 412. The instruction fetch unit 411 is used for acquiring an instruction from the processing apparatus 203. The instruction decode unit 412 is used for decoding the instruction acquired and sending a decoding result as control information to the operation unit 42 and the storage unit 43.

The operation unit 42 includes a vector operation unit 421 and a matrix operation unit 422. The vector operation unit 421 is used for performing a vector operation and supports complex operations, such as vector multiplication, vector addition, and vector nonlinear conversion. The matrix operation unit 422 is responsible for core computing of deep learning algorithms, which includes matrix multiplication and convolution.

The storage unit 43 is used for storing or moving related data. The storage unit 43 includes a neuron storage unit (neuron random access memory (RAM), NRAM) 431, a weight storage unit (weight RAM, WRAM) 432, an input/output direct memory access unit (input/output direct memory access, IODMA) 433, and a move direct memory access unit (move direct memory access, MVDMA) 434. The NRAM 431 is used for storing a feature map for computing by the processor cores 306 and an intermediate result after the computing. The WRAM 432 is used for storing a weight of a deep learning network. The IODMA 433 controls memory access of the NRAM 431/the WRAM 432 and the DRAM 204 through a broadcast bus 309. The MVDMA 434 is used for controlling memory access of the NRAM 431/the WRAM 432 and a shared storage unit (SRAM) 308.

Going back to FIG. 3, the memory core 307 is mainly used for storage and communication. In other words, the memory core 307 is mainly used for storing shared data or intermediate results between the processor cores 306 and performing communication between the clusters 305 and the DRAM 204, communication between the clusters 305, and communication between the processor cores 306. In other embodiments, the memory core 307 is able to perform a scalar operation. The memory core 307 is used for performing the scalar operation.

The memory core 307 includes the shared storage unit (SRAM) 308, the broadcast bus 309, a cluster direct memory access unit (cluster direct memory access, CDMA) 310, and a global direct memory access unit (global direct memory access, GDMA) 311. The SRAM 308 plays the role of a high-performance data transfer station. Data reused among different processor cores 306 in the same cluster 305 is not required to be acquired from the DRAM 204 separately through the processor cores 306. Instead, the data is transferred among the processor cores 306 through the SRAM 308. The memory core 307 is only required to quickly distribute the reused data from the SRAM 308 to the plurality of processor cores 306, so as to improve inter-core communication efficiency and greatly reduce on-chip/off-chip input/output access.

The broadcast bus 309, the CDMA 310, and the GDMA 311 are used for performing the communication between the processor cores 306, the communication between the clusters 305, and data transfer between the clusters 305 and the DRAM 204, respectively. The above will be explained separately below.

The broadcast bus 309 is used for completing high-speed communication between the processor cores 306 in the clusters 305. The broadcast bus 309 of this embodiment supports inter-core communication modes including unicast, multicast, and broadcast. The unicast refers to point-to-point (single processor core-to-single processor core) data transfer. The multicast refers to a communication mode in which a piece of data is transferred from the SRAM 308 to certain processor cores 306. The broadcast refers to a communication mode in which a piece of data is transferred from the SRAM 308 to all processor cores 306. The broadcast is a special case of the multicast.

Figure 5:
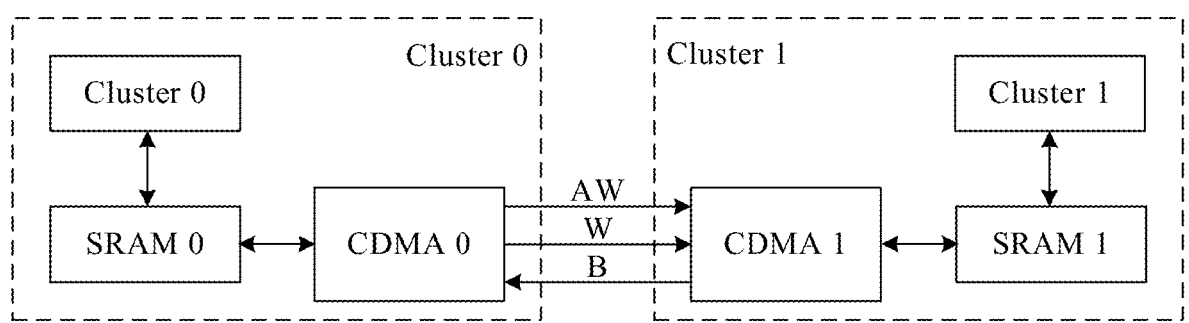
FIG. 5 is a schematic diagram that a processor core intends to write data to a processor core of another cluster.

The CDMA 310 is used for controlling memory access of the SRAM 308 between different clusters 305 in the same computing apparatus 201. FIG. 5 is a schematic diagram that a processor core intends to write data to a processor core of another cluster, so as to illustrate the working principle of the CDMA 310. In this application scenario, the same computing apparatus includes a plurality of clusters. For the sake of explanation, only a cluster 0 and a cluster 1 are shown in the figure. The cluster 0 and the cluster 1 include a plurality of processor cores, respectively. Similarly, for the sake of illustration, the cluster 0 shows only a processor core 0 in the figure, and the cluster 1 shows only a processor core 1 in the figure. The processor core 0 intends to write data to the processor core 1.

First, the processor core 0 sends a unicast write request to write the data to a local SRAM 0. A CDMA 0 serves as a master end, and a CDMA 1 serves as a slave end. The master end sends the write request to the slave end. In other words, the master end sends a write address AW and write data W and sends the data to an SRAM 1 of the cluster 1. Next, the slave end sends a write response B in response. Finally, the processor core 1 of the cluster 1 sends a unicast read request to read the data from the SRAM 1.

Going back to FIG. 3, the GDMA 311 works with the external storage controller 301. The GDMA 311 is used for controlling memory access from the SRAM 308 to the DRAM 204 in the clusters 305, or the GDMA 311 is used for reading the data from the DRAM 204 to the SRAM 308 in the clusters 305. It may be known from the above that communication between the DRAM 204 and the NRAM 431 or the WRAM 432 may be implemented through two channels. A first channel is to directly connect the DRAM 204 with the NRAM 431 or the WRAM 432 through the IODAM 433. A second channel is to transfer the data between the DRAM 204 and the SRAM 308 through the GDMA 311 first, and then to transfer the data between the SRAM 308 and the NRAM 431 or the WRAM 432 through the MVDMA 434. Although it seems that the second channel requires more components and longer data streams, in fact, in some embodiments, the bandwidth of the second channel is much greater than that of the first channel. Therefore, the communication between the DRAM 204 and the NRAM 431 or the WRAM 432 may be more efficient through the second channel. Embodiments of the present disclosure may select a data transfer channel according to hardware conditions.

In other embodiments, a function of the GDMA 311 and a function of the IODMA 433 may be integrated in the same component. For the sake of description, the GDMA 311 and the IODMA 433 are viewed as different components in the present disclosure. For those skilled in the art, as long as functions and technical effects realized by components are similar to those of the present disclosure, the components shall fall within the scope of protection of the present disclosure. Further, the function of GDMA 311, the function of IODMA 433, a function of CDMA 310, and a function of MVDMA 434 may also be implemented by the same component. Similarly, as long as functions and technical effects realized by a component are similar to those of the present disclosure, the component shall fall within the scope of protection of the present disclosure.

Neural network structures related to the present disclosure fall into two categories: a long-chain structure and a block structure. The long-chain structure means that a neural network model is composed of layers concatenated by a single chain. Each layer has only one input and one output, and the whole layer belongs to a single branch. For example, the neural network model may be a VGG16 model or an AlexNet model shown in FIG. 6. The block structure means that a sub-network in the neural network has only one input and one output, however, the sub-network has multiple branches. In other words, part of layers of the sub-network have a plurality of inputs or a plurality of outputs. For example, the block structure may be a resblock structure of resnet 50 and a block structure of inception_v3. FIG. 7 is a schematic diagram of an exemplary neural network model. This exemplary neural network model includes a sub-network 701 and a sub-network 702. The sub-network 701 has only one input and one output and includes layers 1 to 6. Layer 1 has two outputs, and layer 6 has two inputs. Therefore, the sub-network 701 includes two branches. One branch is layer 1→layer 2→layer3→layer 6, while another branch is layer1→layer 4→layer 5→layer 6. The sub-network 701 constitutes one block structure. Similarly, the sub-network 702 constitutes one block structure.

In performing deep learning computing at each layer, a lot of off-chip and on-chip access may be required. Especially, input data is read from the DRAM 204 to the computing apparatus 201, and then, a computing result of the computing apparatus 201 is stored to the DRAM 204. This kind of frequent access consumes a lot of hardware resources. In order to solve this problem, the present disclosure fuses adjacent layers of the neural network, which reduces off-chip and on-chip data transfer to a large extent.

Figure 8:
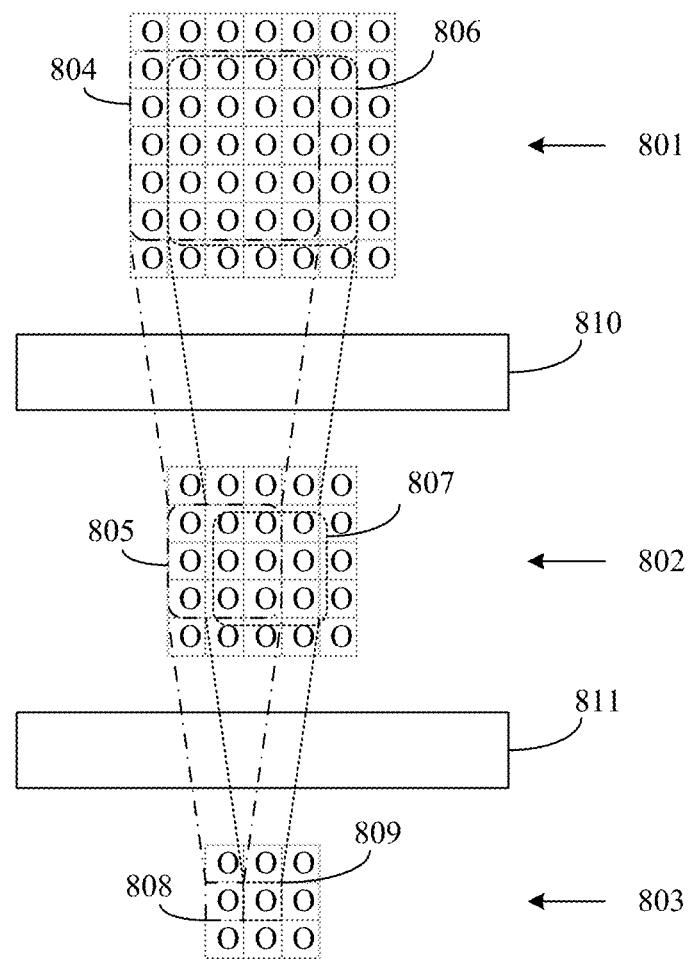
FIG. 8 is a schematic diagram that two convolution layers are fused together according to an embodiment of the present disclosure.

FIG. 8 is a schematic diagram that two convolution layers are fused together. An input of a first-layer convolution layer 810 is a 7×7 feature map 801. After this layer convolves the feature map 801 with a 3×3 kernel (which is not shown), a feature map 802 of the first-layer convolution layer 810 is obtained. A value of a 5×5 feature sub-map 804 may affect a 3×3 feature sub-map 805. Assuming that a stride is 1, after computing the 5×5 feature sub-map 804, the first-layer convolution layer 810 continues to compute a 5×5 feature sub-map 806. However, a value of the 5×5 feature sub-map 806 may affect a 3×3 feature sub-map 807.

In performing computing of a second-layer convolution layer 811, the feature map 802 becomes an input of the second-layer convolution layer 811. Similarly, after the feature map 802 is convolved with the 3×3 kernel, a feature map 803 of the second-layer convolution layer 811 is obtained. A value of the 3×3 feature sub-map 805 may affect a 1×1 feature sub-map 808 in the feature map 803. After computing the 3×3 feature sub-map 805, the second-layer convolution layer 811 continues to compute the 3×3 feature sub-map 807. However, a value of the 3×3 feature sub-map 807 may affect a 1×1 feature sub-map 809 in the feature map 803.

If the layers are not fused, in performing computing of the first-layer convolution layer 810, the computing apparatus 201 reads the 5×5 feature sub-map 804 from the DRAM 204. After the computing, the computing apparatus 201 stores the 3×3 feature sub-map 805 back to the DRAM 204. Next, the computing apparatus 201 reads the 5×5 feature sub-map 806 from the DRAM 204. After the computing, the computing apparatus 201 stores the 3×3 feature sub-map 807 to the DRAM 204. In performing computing of the second-layer convolution layer 811, similarly, it is required to read the 3×3 feature sub-map 805 from the DRAM 204. After the computing, it is required to store the 1×1 feature sub-map 808 to the DRAM 204. Next, it is required to read the 3×3 feature sub-map 807 from the DRAM 204. After the computing, it is required to store the 1×1 feature sub-map 809 to the DRAM 204. It may be known from the above explanation that the feature map 802, as intermediate data, is repeatedly read and stored on the chip and off the chip, which extremely occupies system resources.

If the first-layer convolution layer 810 and the second-layer convolution layer 811 are fused, which means to store the feature map 802 to the NRAM 431 (weights of the first-layer convolution layer 810 and the second-layer convolution layer 811 may also be stored in the WRAM 432), the number of accesses between the computing apparatus 201 and the DRAM 204 may be reduced, thereby improving execution efficiency of the whole neural network. Since the feature maps (such as the feature map 801, the feature map 802, and the feature map 803) involved in fusion look like an inverted pyramid in the context logic of the neural network model as a whole, the fusion is called pyramid fusion.

The pyramid fusion is usually a backward fusion based on a specific convolution layer and a specific pooling layer in the neural network. In other words, a starting layer of the fusion is the convolution layer or the pooling layer, and according to hardware conditions, the layer fuses a plurality of layers backwards, which may contain a plurality of convolution layers and a plurality of pooling layers. However, with the development of deep learning and neural networks, the ordering of layers become complex. For example, an activation layer is set before the convolution layer, and therefore, how the activation layer is fused with the convolution layer behind should also be considered. Therefore, in addition to simply taking the convolution layer and the pooling layer as the core for fusion, the present disclosure provides various fusion methods, which do not necessarily take the convolution layer and the pooling layer as the core. Instead, a specific policy is adopted to flexibly select each layer of the neural network for fusion. Even a user-defined layer may be fused as long as the layer complies with the fusion policy, so as to optimize the overall efficiency.

Another embodiment of the present disclosure shows a new kind of fusion method. This kind of fusion method is implemented by using hardware structures of FIG. 1, FIG. 2, FIG. 3, and FIG. 4 described above. This kind of fusion is called a template fuse unit (TFU). The template fuse unit mainly fuses a plurality of layers into one layer flexibly through a certain fusion policy, so as to reduce input/output overheads of the network. The template fuse unit includes the pyramid fusion and other fusion methods described above. The collection of these fused layers is called the template fuse unit and is viewed as a new layer or a self-defined layer.

This embodiment loads a feature map and a weight required by the template fuse unit from the DRAM 204 to the SRAM 308 on the chip at a time. After the feature map is loaded into the SRAM 308, the feature map is called an on-chip unit map. The on-chip unit map may be cut into sub-maps. One sub-map is loaded from the SRAM 308 to the NRAM 431 of the processor core 306 assigned to compute this sub-map every time, and a weight required for computing this sub-map is also loaded from the SRAM 308 to the WRAM 432. After each sub-map is computed, a corresponding intermediate result is obtained. The intermediate result is saved back to the SRAM 308. After all sub-maps are computed, computing results are stored back to the DRAM 204 at a time. In other words, a corresponding result obtained by an operation of an operator in the neural network model by the on-chip unit map and the weight is transferred between the DRAM 204 and the SRAM 308. An output (an intermediate result) corresponding to the sub-map is transferred between the SRAM 308 and the NRAM 431. From the perspective of the computing apparatus 201, data loading of the template fuse unit is in units of on-chip unit maps, while computing of the template fuse unit is in units of sub-maps.

More specifically, the SRAM 308 is one of important reference indexes of the fusion policy. A size of space of the SRAM 308 determines whether the template fuse unit is a large map mode or a small map mode. The small map mode and the large map mode refer to whether a feature map stored in the DRAM 204 may be moved to the SRAM 308 for processing at a time. The processing apparatus 203 compares storage space required by the feature map with available space of the SRAM 308. If the space of the SRAM 308 is insufficient to accommodate the feature map, the template fuse unit is the large map mode. If the space of the SRAM 308 is large enough to accommodate the whole feature map, the template fuse unit is the small map mode. It is required to be noted that in the large map mode, the on-chip unit map is just a part of the feature map, while in the small map mode, if the available space of the SRAM 308 is large enough, or the feature map is small enough, the SRAM 308 may be possible to accommodate a plurality of feature maps at a time. In other words, the on-chip unit map may include the plurality of feature maps.

If the template fuse unit is the large map mode, the feature map must be split before the feature map may be loaded into the computing apparatus 201. The processing apparatus 203 splits the feature map in the DRAM 204 until an on-chip unit map that is small enough to meet the space requirements of the SRAM 308 is generated, so that the on-chip unit map may be moved to the SRAM 308 for processing at a time. When the feature map is split, an input-dependent operation and an output-dependent operation may be generated.

The input-dependent operation means that on-chip unit maps after splitting are at least partly overlapped, and each sub-set requires some additional copies of inputs to perform a complete operation, resulting in data redundancy during a split operation. The so-called data redundancy means that the same piece of data is reused in the system. When the template fuse unit includes convolution, pooling, or matrix multiplication and other layers, the input-dependent operation is generated.

The output-dependent operation means that, after each sub-map produces an intermediate result, reduction is also required to obtain computing results. Reduction refers to splitting the on-chip unit map into sub-maps to perform computing respectively based on the understanding of the content of the on-chip unit map itself, so as to reduce the scale of computing. As such, on the premise of keeping the original appearance of the on-chip unit map as much as possible, the amount of data is reduced to the maximum extent, and then, the computing results are restored or integrated based on the sub-maps. The computing results are mutually dependent during the reduction. When the template fuse unit includes inner product, convolution, matrix multiplication, sorting, counting and other layers, the output-dependent operation is generated.

Data formats of the feature maps that may be processed by this embodiment include N, H, W, C dimensions, where N represents a batch, H represents a height, W represents a width, and C represents a channel. Taking image data as an example, N represents how many images are there in this batch; H represents how many pixels this image has in the vertical direction; W represents how many pixels this image has in the horizontal direction; and C represents the number of channels (for example, the number of channels C of a black-and-white image is 1, and the number of channels C of a RGB color image is 3).

Figure 9:
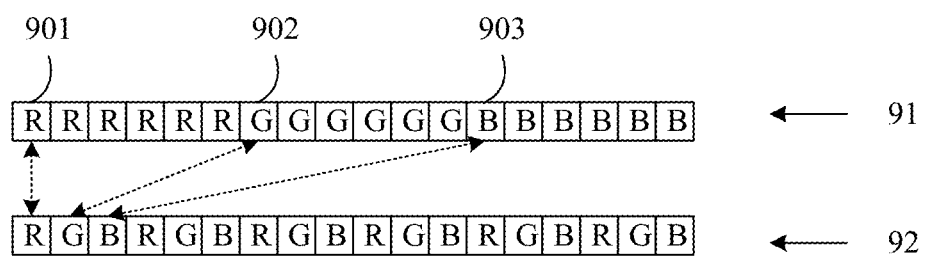
FIG. 9 is a diagram of formats of NCHW and NHWC.

The ordering of these dimensions determines how the data is composed. Common composition methods include NHWC and NCHW. FIG. 9 shows format differences between NCHW and NHWC. This figure takes an RGB color image as an example. In this figure, R represents a red pixel, G represents a green pixel, and B represents a blue pixel. A sequence 91 is in the NCHW format. N is arranged in the outer layer. Pixels in each channel are close together and then arranged according to the order of RGB. An offset of an element whose coordinates are (n, c, h, w) in storage is $((n \times C + c) \times H + h) \times W + w$. A sequence 92 is in the NHWC format. C is arranged in the innermost layer. RGB pixels of space positions corresponding to a plurality of channels are close together. The figure also shows positions of an input pixel 901, an input pixel 902, and an input pixel 903 in different arrangements. However, the input pixel 901, the input pixel 902, the input pixel 903 together are the color of a point in the image. A conversion method for a coordinate offset corresponding to an element whose coordinates are (n, c, h, w) is $((n \times H + h) \times W + \times C + c)$. First, the NHWC is closer to the image data storage format of Bitmap (BMP) than the NCHW. A file in the BMP format stores data pixel by pixel, and each pixel stores color values of all channels, which makes it unnecessary to carry out additional dimension conversions when reading input images. Therefore, the NHWC has better memory access locality, and through every three input pixels, one output pixel is obtained. However, the NCHW obtains a final output result only after all channel inputs are ready, which requires large cache space.

Figure 10:
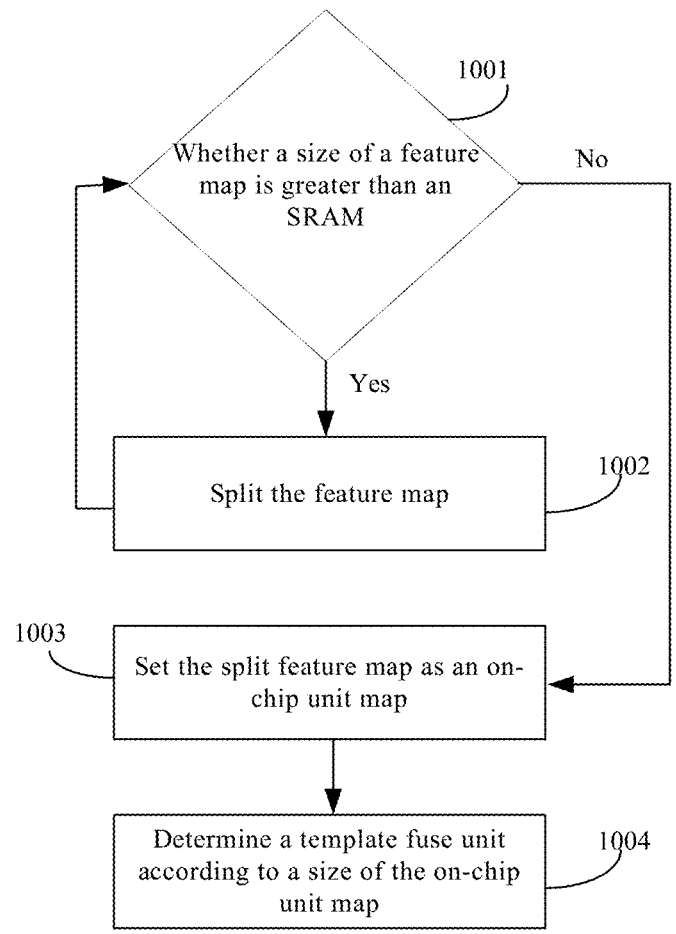
FIG. 10 is a flowchart of performing neural network computing by using a template fuse unit according to an embodiment of the present disclosure.

In this embodiment, each layer of the neural network may be fused as the template fuse unit based on data. FIG. 10 shows a corresponding flowchart.

In a step 1001, the processing apparatus 203 judges whether the storage space required by the feature map is larger than the available space of the SRAM 308. If the storage space required by the feature map is larger than the available space of the SRAM 308, it is represented that the feature map may not be loaded into the SRAM 308 at a time. Therefore, a step 1002 is performed to split the feature map. In this embodiment, the processing apparatus 203 preferentially chooses to split in the N dimension because no input-dependent operation or output-dependent operation will be generated. If splitting in the N dimension fails to meet the requirements, then, splitting in the H or W dimension is considered. At this time, the input-dependent operation or the output-dependent operation may be generated. This embodiment also supports splitting in the C dimension, especially splitting along the Cout direction. As such, one convolution is split into multiple convolution by means of data optimization, which allows the WRAM 432 to accommodate the weight. For example, the weight is split onto four processor cores 306. Therefore, as long as splitting in a certain dimension is processable by the computing apparatus 201, the splitting shall fall within the scope of the present disclosure.

Further, the processing apparatus 203 may perform splitting among the N, H, and W dimensions with specific granularity in order. The specific granularity may be a fixed ratio or a variable ratio, or the specific granularity may be represented by a function. In an application scenario, the processing apparatus 203 splits the feature map or the weight in an order from large to small. Taking the feature map as an example, first, a feature map whose dimension is NHWC is split into a feature map whose dimension is $N_1HWC$ and a feature map whose dimension is $N_2HWC$ in the N dimension, where the specific granularity is the fixed ratio, and $N_1$ and $N_2$ are each half of N. If the feature map is not small enough, the processing apparatus 203 continues to split the feature map whose dimension is $N_1HWC$ into a feature map whose dimension is $N_1H_1WC$ and a feature map whose dimension is $N_1H_2WC$ in the H dimension, where $H_1$ and $H_2$ are each half of H. If the feature map is not small enough, the processing apparatus 203 continues to split the feature map whose dimension is $N_1H_1WC$ into a feature map whose dimension is $N_1H_1W_1C$ and a feature map whose dimension is $N_1H_1W_2C$ in the W dimension, where $W_1$ and $W_2$ are each half of W. The processing apparatus 203 may continue splitting in the N, W, and H dimensions with smaller granularity, such as quarter, eighth, or sixteenth cuts, until the feature map is small enough and becomes an on-chip unit map that may be loaded into the SRAM 308 at a time.

It may be understood that the processing apparatus 203 may continue splitting in one dimension until the feature map may no longer be split, and then, the processing apparatus 203 selects another dimension to continue splitting. For example, the processing apparatus 203 continues splitting in the H dimension. If the feature map is split into the smallest unit, while the feature map still may not be loaded into the SRAM 308, then, the processing apparatus 203 performs splitting in the W dimension until the feature map is split into the smallest unit.

It is required to be noted that, since such a splitting method is to split in an order from large to small, when a split feature map meets conditions, a size of storage space required by the split feature map is usually almost the same as the available space of the SRAM 308. In other words, in the large map mode, the DRAM 204 may transfer only one split feature map to the SRAM 308 every time. However, in the small map mode, the space of the SRAM 308 may load a plurality of feature maps from the DRAM 204 at a time.

In another application scenario, the processing apparatus 203 performs splitting in an order from small to large. Similarly, the specific granularity may be the fixed ratio or the variable ratio, or the specific granularity may be represented by the function. For example, first, the processing apparatus 203 performs splitting in the N dimension by the smallest unit as the specific granularity, which is 1×H×W×C. If the SRAM 308 may load, the processing apparatus 203 continues to enlarge the splitting of the feature map. For example, the processing apparatus 203 enlarges the splitting of the feature map as 2×H×W×C. If the SRAM 308 may still load, the processing apparatus 203 continues to enlarge the splitting of the feature map until n×H×W×C may not be loaded. Then, a size of the on-chip unit map is (n−1)×H×W×C.

If storage space required by 1×H×W×C exceeds the available space of the SRAM 308, the processing apparatus 203 continues splitting in another dimension. For example, starting from the H dimension, the processing apparatus 203 continues to judge 1×1×W×C. If the feature map is small enough, the processing apparatus 203 enlarges the feature map along the H dimension until the storage space required by 1×(h−1)×W×C is exactly close to, but is not larger than, the available space of the SRAM 308. If the storage space required still exceeds the available space of the SRAM 308, then, the processing apparatus 203 continues splitting in another dimension, such as the W dimension. The processing apparatus 203 performs the splitting successively until optimal input data that may be loaded into the SRAM 308 at a time is found. Here, "optimal" means that the storage space required by the on-chip unit map is closest to, but is not larger than, the available space of the SRAM 308.

After the processing apparatus 203 splits the feature map, this process goes back to the step 1001. The processing apparatus 203 judges whether storage space required by the split feature map is still larger than the available space of the SRAM 308. If the storage space required by the split feature map is still larger than the available space of the SRAM 308, the step 1002 is performed again to continue splitting.

If the processing apparatus 203 judges that the storage space required by the split feature map is not larger than the available space of the SRAM 308, it is represented that the SRAM 308 may load the split feature map at a time. Then, a step 1003 is performed, and the processing apparatus 203 sets the split feature map as the on-chip unit map.

Finally, a step 1004 is performed, and the processing apparatus 203 determines the template fuse unit according to the size of the on-chip unit map. This step will be explained in detail later.

In other application scenarios, when the processing apparatus 203 performs the step 1001 and the step 1002 for several times, it is represented that the storage space required by the split feature map is getting closer to the available space of the SRAM 308. For example, assuming that the storage space required by the feature map is 100 k and the available space of the SRAM 308 is 40 k, in the step 1001, the processing apparatus 203 judges that the storage space required by the feature map is larger than the available space of the SRAM 308. Therefore, the step 1002 is performed to split the feature map into half along the N dimension. At this time, the split feature map is 50 k, and then, this process goes back to the step 1001. The storage space required by the split feature map is still larger than the available space of the SRAM 308, and then, the step 1002 is performed to split the feature map into half again along the N dimension. At this time, the split feature map is 25 k, and then, this process goes back to the step 1001. The storage space required by the split feature map is smaller than the available space of the SRAM 308, and then, the step 1003 is performed, and the processing apparatus 203 sets the split feature map (whose size is 25 k) as the on-chip unit map.

The available space of the SRAM 308 is 40 k, while the storage space required by the on-chip unit map is 25 k. There is still 15 k of idle space. The reason is that the splitting is performed in units of one half in the step 1002, so that the granularity of the last splitting is too large. This embodiment may gradually reduce the specific granularity of the splitting with the number of times of splitting, so that the storage space required by the on-chip unit map after the splitting is as close as possible to the available space of the SRAM 308. For example, the specific granularity may be set to half at the beginning. Next, the specific granularity may be set to three quarters. Finally, the specific granularity may be set to four fifths. Similarly, taking a case where the storage space required by the feature map is 100 k and the available space of the SRAM 308 is 40 k as an example, in the step 1001, the processing apparatus 203 judges that the storage space required by the feature map is larger than the available space of the SRAM 308. Therefore, the step 1002 is performed. At this time, the specific granularity is set to half, and the split feature map is 50 k. Then, this process goes back to the step 1001. At this time, the storage space required by the split feature map is still larger than the available space of the SRAM 308, and then, the step 1002 is performed. At this time, the specific granularity is set to three quarters, and the split feature map is 37.5 k. Then, this process goes back to the step 1001. At this time, the storage space required by the split feature map is smaller than the available space of the SRAM 308. Therefore, the step 1003 is performed, and the processing apparatus 203 sets the split feature map (whose size is 37.5 k) as the on-chip unit map. 37.5 k is closer to 40 k than 25 k. The latter method makes better use of the available space of the SRAM 308 and is more efficient. This embodiment does not limit the size of the specific granularity, and the specific granularity may be set according to application scenarios.

Figure 11:
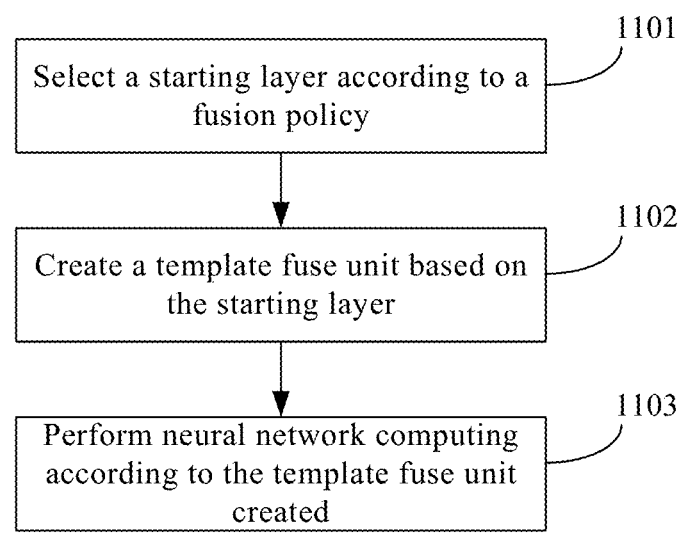
FIG. 11 is a flowchart of dynamically fusing a neural network according to a fusion policy according to an embodiment of the present disclosure.

After the size of the on-chip unit map is determined, the step 1004 is performed. This step is to dynamically fuse the neural network according to the fusion policy. FIG. 11 shows a method of dynamically fusing the neural network according to the fusion policy in this embodiment.

In a step 1101, a starting layer of the template fuse unit is selected according to a starting rule of the fusion policy. The processing apparatus 203 selects the starting layer of the template fuse unit according to the starting rule of the fusion policy. In other words, the processing apparatus 203 selects a layer that starts to fuse among unfused layers in the neural network.

In an application scenario, the starting rule means that the starting layer is a top unfused layer in the neural network. The processing apparatus 203 searches for the top unfused layer. Taking an AlexNet neural network model in FIG. 6 as an example, the model has a total of 23 layers. Assuming that layers 1 to 5 are fused, when the starting rule is that the starting layer is the top unfused layer in the neural network, the processing apparatus 203 selects a ReLU activation layer of layer 6 as the starting layer and fuses backwards (in other words, the processing apparatus 203 performs a fusion in the direction of layer 7). It is required to be noted that, under this starting rule, the starting layer is not necessarily a convolution layer or a pooling layer.

In another application scenario, considering that the convolution layer and the pooling layer are input/output resources-consuming, the starting rule is that the starting layer is a top unfused convolution or pooling layer. The processing apparatus 203 finds all the convolution and pooling layers of unfused layers in the neural network model first, and then, the processing apparatus 203 fuses backwards starting from the top unfused convolution or pooling layer. Similarly, taking the AlexNet neural network model in FIG. 6 as an example, assuming that layers 1 to 9 are fused, the processing apparatus 203 finds all the convolution and pooling layers of the unfused layers in the neural network model, which are layer 11, layer 13, and layer 15. Next, the processing apparatus 203 starts the fusion from the top unfused convolution or pooling layer. In other words, the starting layer is layer 11.

In a step 1102, a fusion is performed based on the starting layer, and all rules of the fusion policy are checked one by one, so as to create the template fuse unit. The processing apparatus 203 performs the fusion based on the starting layer and checks all rules of the fusion policy one by one, so as to create the template fuse unit. On the premise that all rules are satisfied, hardware resources of the computing apparatus 201 are sufficient to load data required for computing the template fuse unit at a time and then perform neural network computing according to the template fuse unit. In addition to the starting rule, the fusion policy may also exemplarily include following rules.

Rule 1: Fusing Backward

Fusing backward is to fuse in the direction of neural network model inference starting from the starting layer. Taking FIG. 6 as an example, fusing backward is to fuse in the direction of layer 1→layer 2→layer 3. If there are unfused layers before the starting layer, under this rule, these unfused layers will not be considered to be incorporated into the template fuse unit.

Rule 2: Preferentially Fusing Forward

Fusing forward is to fuse in the reverse direction of neural network inference starting from the starting layer. Taking FIG. 6 as an example, fusing forward is to fuse in the direction of layer 3→layer 2→layer 1. This rule is usually matched with the starting rule that the starting layer is the top unfused convolution or pooling layer. The reason is that there may be unfused layers before the convolution or pooling layer. After the starting layer is selected, the processing apparatus 203 preferentially fuses forward to try to incorporate the unfused layers before the starting layer into the template fuse unit. Similarly, taking the AlexNet neural network model in FIG. 6 as an example, assuming that layers 1 to 2 are fused, the processing apparatus 203 founds that the top unfused convolution or pooling layer is layer 5. Therefore, the starting layer is layer 5, and the processing apparatus 203 preferentially forward fuses layer 4 and layer 3. If the fusion may continue, the processing apparatus 203 backward fuses layer 6 and layer 7, and the like.

Rule 3: Preferentially Taking a Block Structure as a Unit

When the neural network model has a block structure, this rule requires the processing apparatus 203 to preferentially add and delete the template fuse unit by the block structure rather than by the layer. If the fusion of operation logic of the whole block fails, then, a fusion from layers on each branch is considered. Taking a neural network model in FIG. 7 as an example, the processing apparatus 203 preferentially takes a sub-network 701 or a sub-network 702 as a unit to perform the fusion.

When the neural network is a long-chain structure, since there is no block structure, the processing apparatus 203 directly adds and deletes the template fuse unit in the unit of the layer. This rule is not applicable to the neural network model with the long-chain structure.

Rule 4: Single-Branch Output

The fusion policy of this embodiment does not support that the template fuse unit is a multi-output network. The reason is that a shape derivation inside the template fuse unit mainly adopts a derivation form from back to front. The multi-output network means that it is required to forward derive respectively from different outputs, and results of the derivation do not necessarily come down to the same feature map, so that the results may not be converged.

In other words, the output of the template fuse unit is required to be the single-branch output, which means that the last layer of the template fuse unit may only have one output. FIG. 7 shows two fusion methods of a sub-network 701. A first method is to fuse layers 1 to 5 into a template fuse unit 703. A second method is to fuse layers 1 to 6 into a template fuse unit 704. Since outputs of layer 3 and layer 5 are outputs of the template fuse unit 703, the template fuse unit 703 belongs to a multi-output network. In other words, the template fuse unit 703 has a multi-branch output. However, an output of layer 6 is an output of the template fuse unit 704, and only one piece of output data is generated. Therefore, the template fuse unit 704 belongs to a single-output network. In other words, the template fuse unit 704 has a single-branch output. The processing apparatus 203 judges whether the output of the template fuse unit is the single-branch output. If this rule is not satisfied, the processing apparatus 203 adds and deletes layers in the template fuse unit until this rule is satisfied.

Rule 5: Including at Least Two Main Layers

When layer logic is too simple, performance of the template fuse unit is not as good as performance of the unfused layers. Therefore, when the layer logic is used as the fusion policy, the processing apparatus 203 evaluates whether an operation of each fused layer is complicated enough to enable the fusion to produce benefits. In order to produce benefits, it is required to incorporate a main layer into the template fuse unit as much as possible. The main layer refers to a layer that consumes a lot of input/output resources, such as matrix multiplication, pooling, or convolution. Here, the pooling includes various kinds of pooling, such as maximum pooling (maxpool) or average pooling (avgpool). The convolution includes various kinds of convolution, such as ordinary convolution, convolution with a mean, depthwise convolution (depthwise cony), and the like. This rule is that the template fuse unit includes at least two main layers. When the processing apparatus 203 judges that this rule is not satisfied, the processing apparatus 203 adjusts the template fuse unit until this rule is satisfied.

Rule 6: Including a Continuous Structure in which a Main Layer, a Main Layer, and a Non-Main Layer are Successively Adjacent This rule is that the template fuse unit is required to include a continuous structure of the main layer, the main layer, and the non-main layer. In other words, the template fuse unit is required to include the continuous structure in which the main layer, the main layer, and the non-main layer are successively adjacent. Such operations are complicated enough to enable the fusion to produce benefits. With reference to layer 4-layer 5-layer 6 in FIG. 6, where layer 4 is a maximum pooling layer, layer 5 is a convolution layer, and layer 6 is a ReLU activation layer, such a structure conforms to the continuous structure in which the main layer, the main layer, and the non-main layer are successively adjacent. Therefore, a template fuse unit including layer 4, layer 5, and layer 6 satisfies this rule. When the processing apparatus 203 judges that this rule is not satisfied, the processing apparatus 203 adjusts the template fuse unit until this rule is satisfied.

Rule 7: Including a Continuous Structure in which a Scalar Computing Layer and a Vector Computing Layer are Adjacent This rule is that the template fuse unit includes a continuous structure of the scalar computing layer and the vector computing layer. In other words, the template fuse unit includes the continuous structure in which the scalar computing layer and the vector computing layer are adjacent. The scalar computing layer refers to an addition layer, a subtraction layer, or a multiplication layer. The vector computing layer refers to an activation layer, a batch normalization layer, or a scaling layer. When the processing apparatus 203 judges that this rule is not satisfied, the processing apparatus 203 adjusts the template fuse unit until this rule is satisfied.

Rule 8: A Weight of a Convolution Layer is not an Output of a Certain Layer

This rule is that the weight of the convolution layer in the template fuse unit is not an output of any layer of the neural network, no matter whether this layer is incorporated into the template fuse unit or not. When the processing apparatus 203 judges that this rule is not satisfied, the processing apparatus 203 removes this convolution layer from the template fuse unit.

Rule 9: A Weight of a Convolution Layer is not Shared with any Layer of a Neural Network Since a weight of an operator of a neural network model involved in the template fuse unit has a special arrangement form, when a fused convolution operator shares a weight with other operators, arrangement logic of the weight will conflict. This rule is that the weight of the convolution operator in the template fuse unit is not shared with any layer of the neural network. When the processing apparatus 203 judges that this rule is not satisfied, the processing apparatus 203 removes this convolution operator from the template fuse unit.

Rule 10: A Weight is not Larger than Available Space of a WRAM

The large map mode has fewer restrictions on the WRAM 432. The reason is that an on-chip unit map that is loaded into the SRAM 308 is only a part of a feature map, and when computing the template fuse unit, the WRAM 432 is only required to store all weights of this feature map. However, since a plurality of feature maps may be loaded into the SRAM 308 in the small map mode, in this situation, required weights will be increased, whether the available space of the WRAM 432 is sufficient should be evaluated more carefully. This rule is that storage space required by the weight in the on-chip unit map is not larger than the available space of the WRAM 432. When the processing apparatus 203 judges that this rule is not satisfied, the processing apparatus 203 reduces a size of the on-chip unit map.

If the weight is split based on an output channel parameter Cout of the C dimension, since the weight will be averagely distributed among a plurality of processor cores 306, this rule is adjusted as:

$$\frac{W_j}{n} \leq W.$$

$W_j$ refers to storage space required by a weight involved in an on-chip unit map j, n refers to the number of processor cores in a cluster, and W refers to the available space of the WRAM 432.

Rule 11: Redundancy Percentage

The redundancy percentage refers to a ratio of a sum of redundancy generated by the input-dependent operation and the output-dependent operation to the amount of normal input/output of the template fuse unit. Here, the amount of normal input/output refers to the amount of data of the on-chip unit map without redundancy before splitting. The processing apparatus 203 computes a percentage of the amount of memory access $size_{TFU}$ of the on-chip unit map from the DRAM 204 to the SRAM 308 to the amount of normal input/output (excluding redundancy) $size_{ori}$ after the template fuse unit fuses a current layer. Here, the amount of memory access $size_{TFU}$ refers to the theoretical amount of memory access $size_{ori}$ plus a sum of redundancy. The formula is as follows:

$$\frac{(size_{TFU} - size_{ori})}{size_{ori}} \times 100\% \geq \text{percentage threshold.}$$

The processing apparatus 203 takes into account split information and the shape derivation of the template fuse unit and sets the percentage threshold to 50%, 75%, 100%, 125%, or 150%, and preferably, the processing apparatus 203 sets the percentage threshold to 100%. For example, if the percentage threshold is 100%, it is represented that, when the sum of redundancy is more than twice of the amount of normal input/output of the template fuse unit, the fusion is not performed. This rule is that a sum of redundancy generated by splitting the on-chip unit map does not exceed a specific proportion associated with the percentage threshold. Once the sum of redundancy generated by splitting the on-chip unit map exceeds the specific proportion associated with the percentage threshold, it is represented that there are too many redundant parts, and a lot of resources are spent on computing redundancy, thus reducing efficiency. Therefore, when the processing apparatus 203 judges that this rule is not satisfied, the processing apparatus 203 stops the fusion.

It is required to be noted that, in the small map mode, since at least one complete feature map is loaded from the DRAM 204 to the SRAM 308 at a time, there is no redundancy. This rule is not applicable to the small map mode.

Rule 12: Input and Output Sizes of an On-Chip Unit Map

Assuming that a size of space of the SRAM 308 is S, storage space required by the on-chip unit map is IN, and storage space required by computing results of the on-chip unit map is OUT, then, this rule is that the size of the space of the SRAM 308 is required to satisfy following conditions.

If IN and OUT may not reuse the storage space, IN+OUT<S.

If IN and OUT may reuse the storage space, MAX(IN, OUT)<S.

In other words, if IN and OUT may not reuse the storage space, a sum of the storage space of the on-chip unit map and the storage space of the computing results is smaller than the available space of the SRAM 308; and if IN and OUT may reuse the storage space, the larger of the storage space of the on-chip unit map and the storage space of the computing results is smaller than the available space of the SRAM 308.

Rule 13: $W_i+IN1+IN2 \leq S$

In the small map mode, this rule is that the size of the space of the SRAM 308 is required to satisfy a following condition:

$W_i+IN1+IN2 \leq S$.

In other words, a sum of storage space $W_i$ required by a weight of a sub-map i, storage space IN1 required by the on-chip unit map, and caching space IN2 is not larger than the available space of the SRAM 308. When the processing apparatus 203 judges that this rule is not satisfied, the processing apparatus 203 decreases the number of on-chip unit maps until this rule is satisfied.

Rule 14: $SubINi+W_i+IN2 \leq S$

In the small map mode, this rule is that the size of the space of the SRAM 308 is required to satisfy a following condition:

$SubINi+W_i+IN2 \leq S$.

In other words, a sum of storage space SubINi required by the sub-map i, the storage space $W_i$ required by the weight of the sub-map i, and the cache space IN2 is not larger than the available space of the SRAM 308. When the processing apparatus 203 judges that this rule is not satisfied, the processing apparatus 203 decreases the number of on-chip unit maps until this rule is satisfied.

Rule 15: $SubOUTi+W_{i+1}+IN2 \leq S$

In the small map mode, this rule is that the size of the space of the SRAM 308 is required to satisfy a following condition:

$SubOUTi+W_{i+1}+IN2 \leq S$.

In other words, a sum of storage space SubOUTi required by intermediate results of the sub-map i, storage space $W_{i+1}$ required by a weight of a next sub-map, and the cache space IN2 is not larger than the available space of the SRAM 308. When the processing apparatus 203 judges that this rule is not satisfied, the processing apparatus 203 decreases the number of on-chip unit maps until this rule is satisfied.

Rule 16: $W_i+W_{i+1} \leq W$

A weight involved in a convolution operation in the template fuse unit is moved independently and resides on the WRAM 432. In the small map mode, if a sub-map includes a plurality of feature maps, considering pipelining between sub-maps, the WRAM 432 stores weights of two adjacent sub-maps at most simultaneously. Assuming that storage space required by each sub-map i is $W_i$ and total space of the WRAM 432 is W, this rule is that the size of the space of the WRAM 432 is required to satisfy a following condition:

$W_i+W_{i+1} \leq W$.

In other words, a sum of the storage space $W_i$ required by the weight of the sub-map i and the storage space $W_{i+1}$ required by the weight of the next sub-map is not larger than the available space of the WRAM 432. When the processing apparatus 203 judges that this rule is not satisfied, the processing apparatus 203 decreases the number of on-chip unit maps until this rule is satisfied.

Rule 17: Storage Space Required by a Sub-Map is not Larger than Available Space of an NRAM This rule is that the storage space required by the sub-map is not larger than the available space of the NRAM 431. When the on-chip unit map in the SRAM 308 is to be split into sub-maps and moved to the NRAM 431, the processing apparatus 203 may perform fine-grained splitting in the N, H, and W dimensions. If the space of the NRAM 431 is not enough, the processing apparatus 203 splits the on-chip unit map into finer pieces until this rule is satisfied. In general, the NRAM 431 has reasonable available space, so that the on-chip unit map is split to a reasonable degree to be loaded at a time. From the perspective of the fusion policy, the template fuse unit is not affected by the number of batches. However, the on-chip unit map is split more finely (there are more sub-maps), the processing speed will be decreased, so the processing apparatus 203 is required to evaluate the space of the NRAM 431.

In some embodiments, the space of the SRAM 308 corresponds to the number of NRAMs 431 of the processing cores 306 in the cluster 305. For example, the cluster 305 includes four processor cores 306, and then the space of the SRAM 308 is four times of the space of the NRAM 431. In other words, in the large map mode, the on-chip unit map may generally be allocated to four processor cores 306 for processing. This kind of architecture design has considered that data that is loaded into the SRAM 308 may be allocated to all NRAMs 431 at a time. Therefore, this rule is not required to be considered in the large map mode.

Rule 18: The Number of Feature Maps is not Greater than a Feature Map Threshold

In the small map mode, the on-chip unit map may include a plurality of feature maps. The more the feature maps, the more the number of times of transferring the sub-maps between the SRAM 308 and the NRAM 431, and the efficiency will be decreased. Therefore, it is not always better to include more feature maps in the on-chip unit map. The processing apparatus 203 may compute the appropriate number of fusion layers based on the number of feature maps in the on-chip unit map to maximize benefits. This rule is that the number of feature maps in the on-chip unit map is not greater than the feature map threshold. When the processing apparatus 203 judges that this rule is not satisfied, the processing apparatus 203 decreases the number of feature maps in on-chip data until this rule is satisfied.

Rule 19: Stride Redundancy

The stride redundancy means that, when the template fuse unit fuses too many layers, and the lengths and widths of kernels of the convolution layer and the pooling layer are larger than strides, there is an overlap between input data required by each output point, which is the aforementioned input-dependent operation. This overlap is the stride redundancy. The stride redundancy makes each processor core 306 be required to read more data. However, this part of reused data may occupy on-chip and off-chip access resources. The more layers the template fuse unit includes, the more serious the stride redundancy is. This rule is that a sum of difference values between side lengths of the kernel of the convolution layer or the pooling layer and a stride of the kernel of the convolution layer or the pooling layer is not greater than a redundancy threshold.

In this embodiment, the definition of the redundancy threshold is as follows. Assuming that the length and width of the kernel of the convolution layer and the pooling layer are $k_x$ and $k_y$, and strides in the length and width directions are $s_x$ and $s_y$, respectively, and then stride redundancy in the length direction is a sum of $k_x$-$s_x$ of all the convolution layers and all the pooling layers in the template fuse unit. Similarly, stride redundancy in the width direction is a sum of $k_y$-$s_y$ of all the convolution layers and all the pooling layers in the template fuse unit. The redundancy threshold of this embodiment may be 3, 4, 5, or 6, and preferably, the redundancy threshold may be 4. This rule is not satisfied as long as the stride redundancy in either of the length or width directions is greater than the redundancy threshold. The processing apparatus 203 adjusts the template fuse unit. Usually, the processing apparatus 203 decreases the number of layers that are fused until this rule is satisfied.

The fusion policy provides an exception rule for the stride redundancy. If there are multiple branches in the layer to be fused and the template fuse unit may fuse the whole multiple branches, the performance of the template fuse unit may be better. In this situation, the processing apparatus 203 ignores the rule for the stride redundancy, which means that the stride redundancy does not restrict the template fuse unit to fuse the multiple branches. In other words, in the fusion policy of this embodiment, fusing the multiple branches takes precedence over the restriction of the stride redundancy. In other words, the stride redundancy is only considered in the case of a single branch.

The above rules are only examples. The present disclosure does not restrict the order in which each rule is performed or the fact that these rules are required to be considered simultaneously. Those skilled in the art may add or delete the rules in different application scenarios based on actual situations to implement a fusion policy that meets a current application scenario.

Going back to FIG. 11, in a step 1103, neural network computing is performed according to the template fuse unit created. The computing apparatus 201, based on a three-level operation hierarchy of system-on-chip-cluster-processor core, in combination with three-level memory design of DRAM-SRAM-NRAM/WRAM, takes the template fuse unit as a self-defined layer in the neural network and loads data required for computing the template fuse unit from the DRAM 204 to the SRAM 308 at a time. As such, the data may be cached and computed at appropriate levels, thereby forming sufficient pipelining. After computing, the computing apparatus 201 sends computing results from the SRAM 308 to the DRAM 204, which greatly reduces input/output overheads in the neural network computing.

Figure 12:
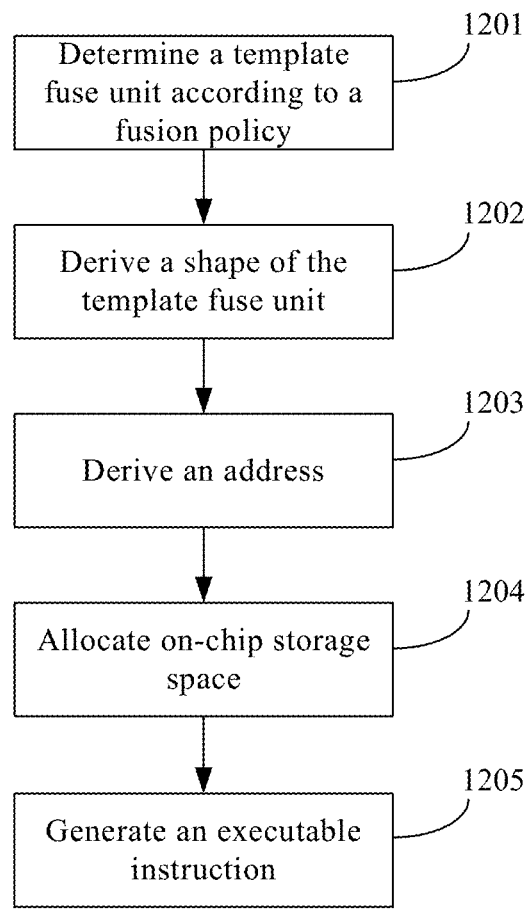
FIG. 12 is a flowchart of performing neural network computing by using a template fuse unit according to an embodiment of the present disclosure.

When input data from fields such as computer vision, speech, natural language processing, and data mining is intended for various deep learning algorithms and various machine learning algorithms, the present disclosure, based on the template fuse unit, may reduce the input/output overheads in the neural network computing. Another embodiment of the present disclosure shows a method of performing neural network computing by using a template fuse unit. FIG. 12 shows a process of this method.

In a step 1201, the template fuse unit is determined according to a fusion policy. The processing apparatus 203 selects a starting layer of the template fuse unit according to a starting rule of the fusion policy. Moreover, the processing apparatus 203 performs a fusion based on the starting layer and checks all rules of the fusion policy one by one, so as to create the template fuse unit. The previous embodiment has illustrated various rules of the fusion policy with examples in detail, which will not be repeated herein.

In this step, the template fuse unit may be represented in the form of a source code. Next, it is required to convert the source code into an object code of machine language, which is also known as machine code, through a compiler. The following steps show a process of converting the source code of the template fuse unit into the object code of the machine language by the compiler.

In a step 1202, a shape of the template fuse unit is derived. For data that is required to be processed by the template fuse unit, this embodiment adopts a method of reverse derivation. The compiler reversely derives forward from outputs what size of inputs is required. Taking FIG. 8 as an example, the compiler performs the reverse derivation from a feature map 803 to a feature map 802, and then to a feature map 801. In this step, the compiler not only derives required input data according to the template fuse unit, but also further derives redundancy.

Next, a step 1203 is performed to derive an address. According to the shape of the template fuse unit, the compiler derives an address of on-chip storage space of the whole control flow graph and implements access to a general address, so as to achieve the purpose of simplifying computing resources and shortening computing time. The control flow graph is an abstract data structure used in the compiler. The control flow graph represents all paths that a program may perform and reflects possible flow directions of all nodes in the process in the form of a flowchart. The control flow graph is composed of relationships between nodes. A node is also called a basic block (BB) and is a statement sequence that is performed sequentially to the maximum in the program. Each basic block has only one entrance and one exit. Data enters through the entrance and exits through the exit during execution. The characteristic of the basic block is that all instructions in the basic block are performed in order as long as a first instruction in the basic block is performed.

Each basic block includes at least one instruction. The instruction in the basic block may point to specific on-chip storage space by using a pointer. The pointer is a kind of variable and is used for saving an address of specific address space. Through the pointer, the processor cores 306 may load data into the space of the specific address pointed to by the pointer, or the processor cores 306 may fetch the data from the specific address pointed to by the pointer.

According to a division of the template fuse unit, the compiler initially divides basic blocks and then confirms the basic blocks and mutual relations between the basic blocks after iterative operations. At this point, the object code for implementing the template fuse unit is completed.

Not only that, the compiler also analyzes reused data of two front and back template fuse units in the neural network, judges how much data in a previous template fuse unit may be left on the chip for use by a next template fuse unit, and plans a storage address of each piece of data according to a judging result.

In this step, the compiler completes the derivation of the address in the control flow graph.

In a step 1204, on-chip storage space is allocated. The processing apparatus 203 allocates physical space for the SRAM 308, the NRAM 431, and the WRAM 432 based on the derivation of the address of the template fuse unit. In this step, the compiler completes the pointing of the pointer in the control flow graph.

Finally, a step 1205 is performed to generate an executable instruction. In this step, a linker links the object code generated by the compiler with a library, so as to make the object code be an executable file. More specifically, the object code is a program unit that includes a machine code and linker available information. The linker is used to parse undefined symbolic references, replace a placeholder in the object code with an address of a symbol, and then generate the executable instruction. The executable instruction may be performed directly by the computing apparatus 201 to complete the computing of the neural network.

By setting the fusion policy, the present disclosure dynamically determines the template fuse unit, fuses a plurality of layers in the neural network to form a new self-defined layer, and loads data required for computing the template fuse unit at a time, so as to reduce input/output overheads.

When the rules of the fusion policy mentioned above are used to determine the template fuse unit, it is not necessary to start the fusion with the convolution layer or the pooling layer. As mentioned in the above embodiment, in an application scenario, the starting rule may be that the starting layer is the top unfused layer in the neural network, and this layer may be a layer other than the convolution layer or the pooling layer. Such a starting rule makes the creation of the template fuse unit more flexible. For different neural networks, based on the ordering of each layer, the starting layer is appropriately selected to start the fusion, which is not limited by the positions and number of convolution layers or pooling layers in the neural network model, thereby adapting to various network models, making the fusion more comprehensive, and improving the overall benefit.

Figure 6:
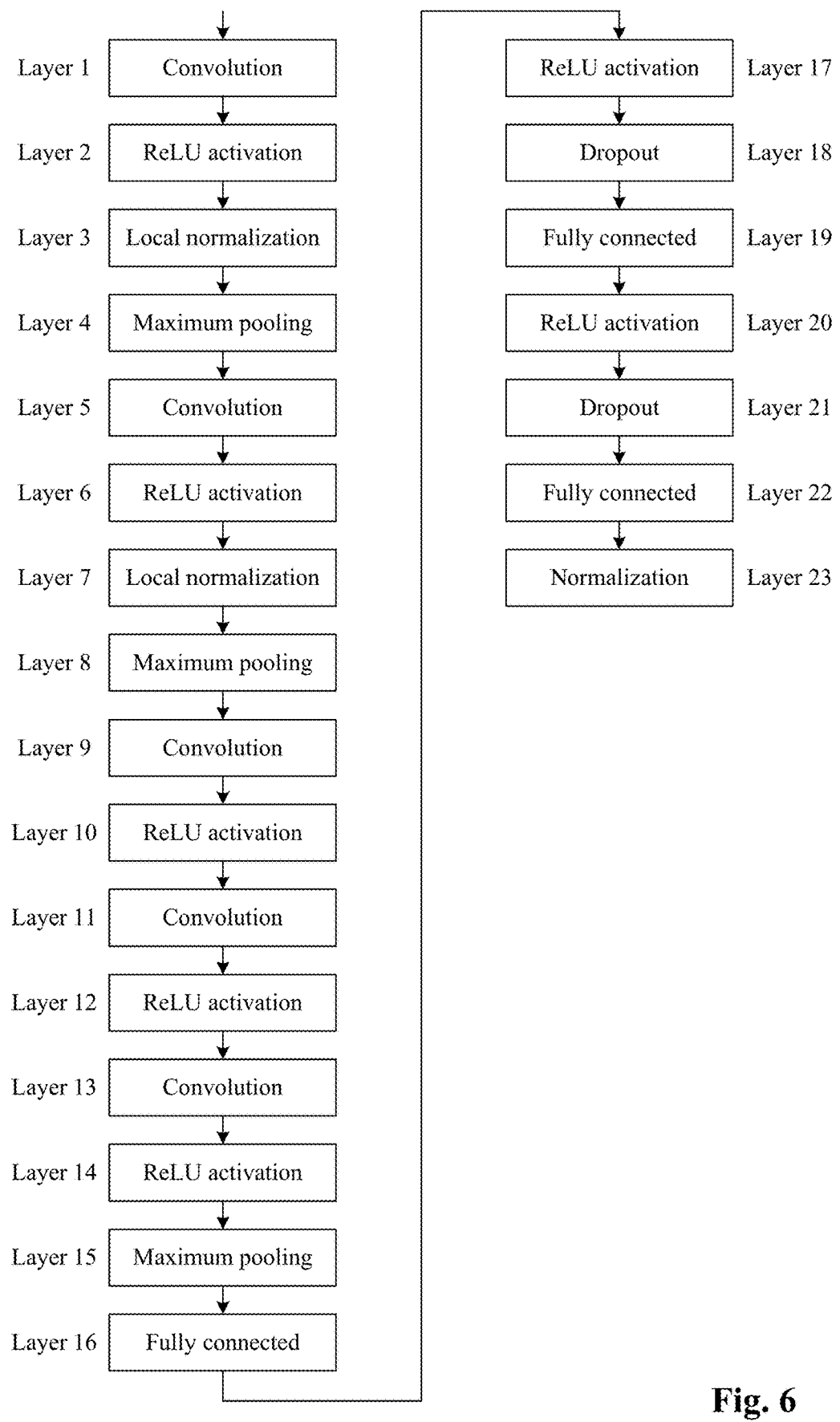
FIG. 6 is a schematic diagram of an AlexNet model.
Figure 7:
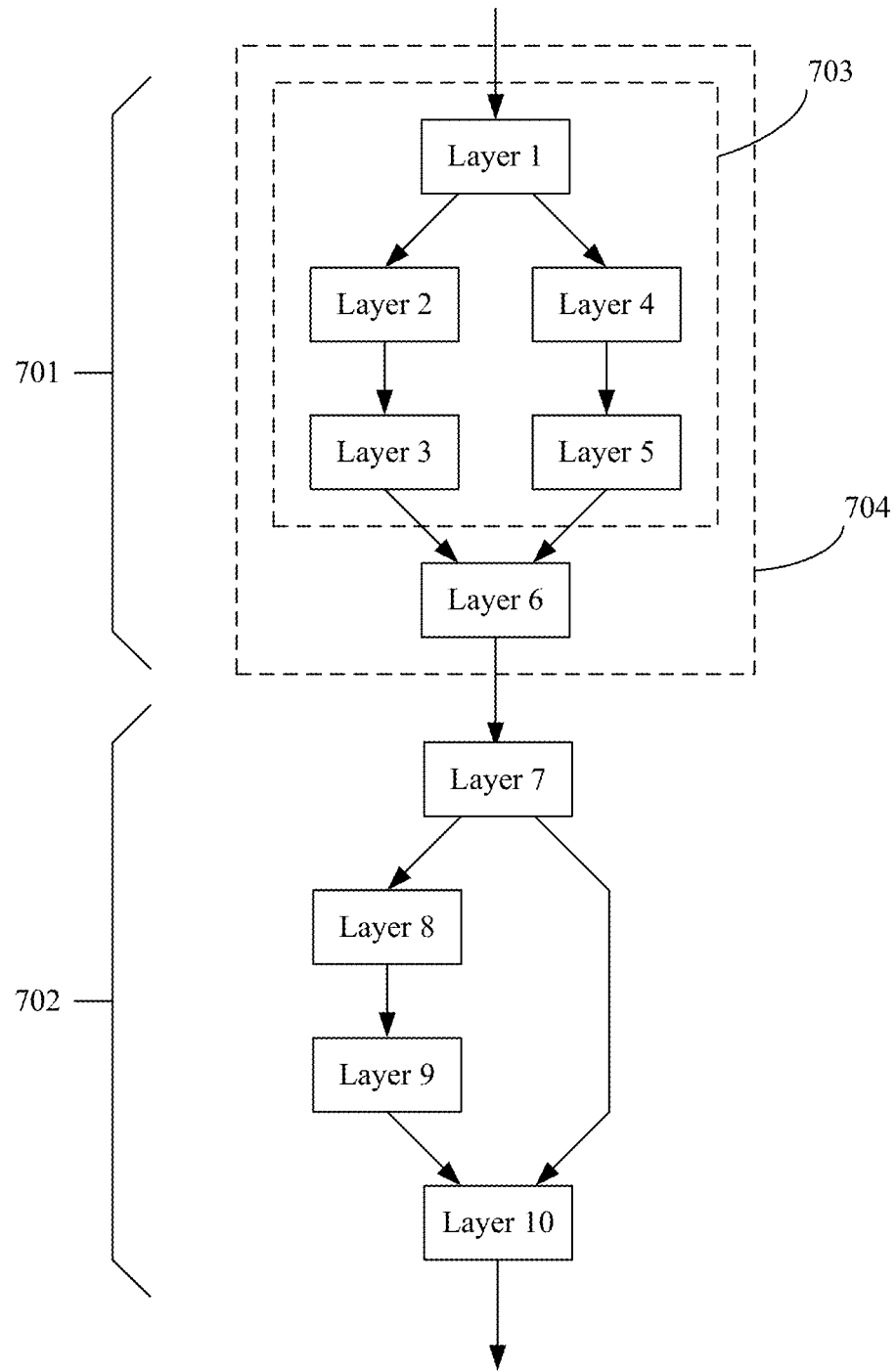
FIG. 7 is a schematic diagram of an exemplary neural network model.

For example, taking the neural network model of FIG. 6 as an example, assuming that layers 1 to 5 are fused, when creating a next template fuse unit, if the starting rule is that the starting layer is the top unfused convolution or pooling layer, a next convolution or pooling layer is layer 8. In other words, layer 6 and layer 7 may not be fused, and the overall benefit may be affected.

Another embodiment of the present disclosure shows a solution of fusing the neural network, where the starting layer is the layer other than the convolution layer and the pooling layer; in other words, the starting layer is a non-convolution layer and a non-pooling layer. This embodiment is also implemented based on the framework shown in FIGS. 1-4. This embodiment also performs the flowchart shown in FIG. 11.

In the step 1101, the starting layer is selected according to the fusion policy. The processing apparatus 203 selects the starting layer according to the fusion policy. For example, the starting rule of the fusion policy is that the starting layer is the top unfused layer in the neural network, and this layer is the layer other than the convolution layer or the pooling layer.

It is required to be noted that this step does not adopt the starting rule in which the starting layer is the top unfused convolution or pooling layer. If the starting layer is selected according to this starting rule, the starting layer may be restricted as either the convolution layer or the pooling layer. As such, the advantage that this embodiment is not limited by the positions and number of convolution layers or pooling layers in the neural network model does not exist.

In an application scenario, the starting layer may be an element-wise layer, which is also called an element-by-element layer. In this layer, each element of a vector is operated. For this type of operation, the shape of input data is the same as that of output data. The element-wise layer includes following types.

1. Elementary operations: vector addition, vector subtraction, vector multiplication, and the like.
2. Advanced operations: absolute value, square root, division, exponent, remainder, exponentiation, and the like.
3. Trigonometric function operations
4. Rounding operations: ceil, round, floor, int, and the like.
5. Activation functions: sigmoid, tanh, ReLU, and the like.

In another application scenario, the starting layer may be an addpadding layer. The addpadding is used for not discarding information of original image and keeping a size of input data consistent with the original image by adding an element to the blank around the input data.

In another application scenario, the starting layer may be a self-defined layer. With the development of deep learning and the complexity of the neural network, public or standard operators are not enough, and more and more operators with self-defined operation rules are applied in the neural network. This embodiment may select the self-defined layer as the starting layer.

In another application scenario, the starting rule of the fusion policy of this embodiment enables the processing apparatus 203 to further judge whether the neural network includes a block structure. If the neural network does not include the block structure, it is represented that the neural network is a long-chain structure, and the processing apparatus 203 selects the top unfused layer in the neural network according to the starting rule. If the neural network includes the block structure, this embodiment performs the fusion preferentially by the block structure with reference to the rule 3. Then, the processing apparatus 203 judges whether the top layer in the block structure is the layer other than the convolution layer and the pooling layer. If the top layer in the block structure is the layer other than the convolution layer and the pooling layer, the processing apparatus 203 takes the top layer as the starting layer.

Figure 13:
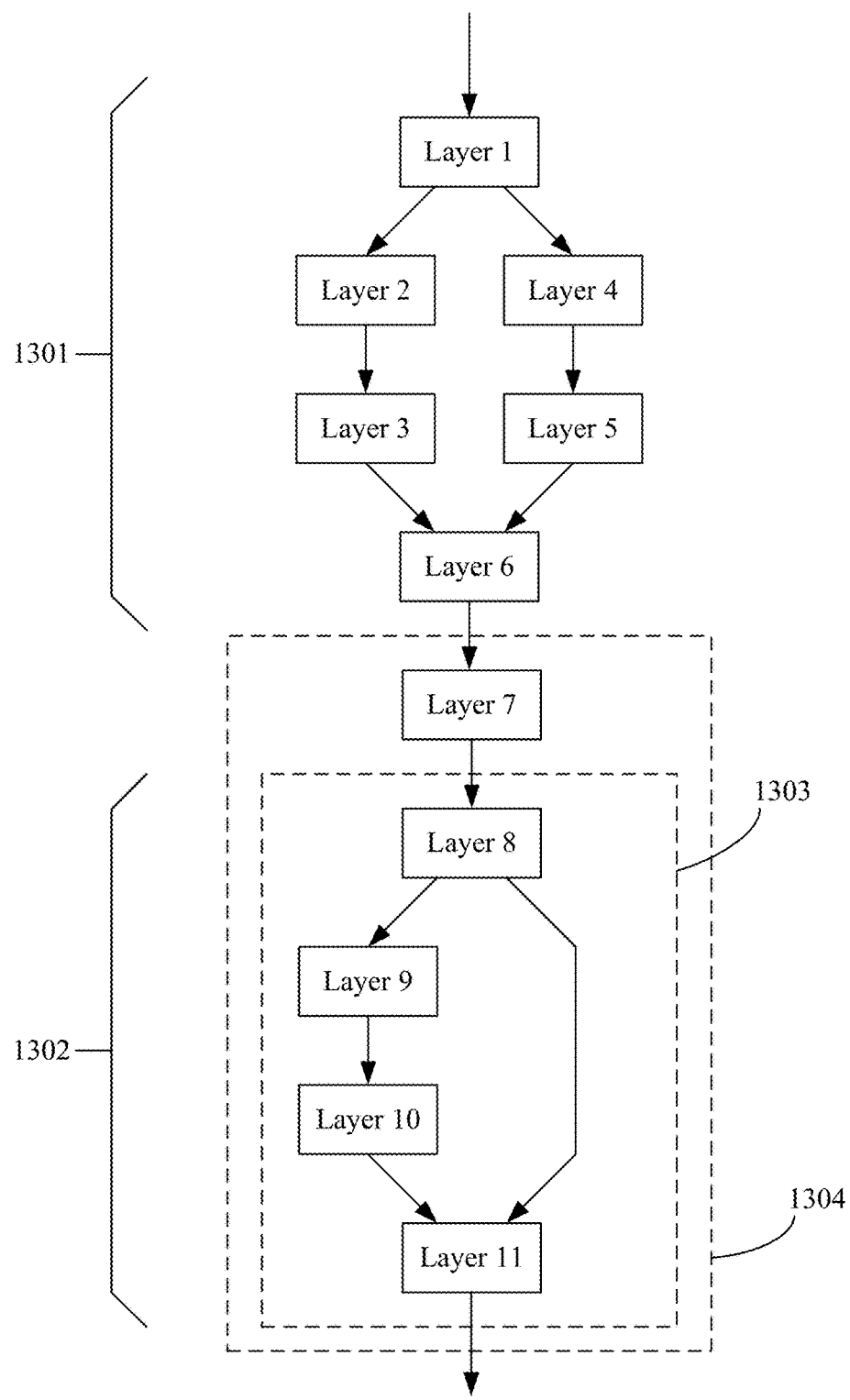
FIG. 13 is a schematic diagram of a neural network model with a block structure.

When the processing apparatus 203 judges that the top layer is one of the convolution layer and the pooling layer, the processing apparatus 203 may directly select the convolution layer or the pooling layer as the starting layer, or the processing apparatus 203 may forward select a layer closest to the top layer other than the convolution layer and the pooling layer as the starting layer. FIG. 13 shows a neural network model with a block structure. This exemplary neural network model includes a sub-network 1301 and a sub-network 1302. The sub-network 1301 includes layers 1 to 6. The sub-network 1302 includes layers 8 to 11. The sub-network 1301 and the sub-network 1302 are connected by layer 7. Assuming that the sub-network 1301 is fused, when fusing the sub-network 1302, according to the rules, the processing apparatus 203 judges whether the top layer (layer 8) of the sub-network 1302 is a layer other than a convolution layer and a pooling layer. If the top layer (layer 8) of the sub-network 1302 is the layer other than the convolution layer and the pooling layer, layer 8 is directly selected as a starting layer for fusion. If layer 8 is the convolution layer or the pooling layer, the processing apparatus 203 may also select layer 8 as the starting layer, or the processing apparatus 203 may forward select a layer closest to the top layer other than the convolution layer and the pooling layer as the starting layer. If a preceding layer closest to layer 8 is layer 7, layer 7 is not fused, and it is assumed that layer 7 is neither the convolution layer nor the pooling layer, and then the processing apparatus 203 selects layer 7 as the starting layer. If layer 7 is the convolution layer or the pooling layer, this embodiment may select layer 7 or layer 8 as the starting layer.

This embodiment preferentially fuses the whole block structure to improve fusion benefits. However, in a specific application scenario, the processing apparatus 203 is unable to forward select the layer closest to the top layer other than the convolution layer and the pooling layer as the starting layer. Taking the neural network model of FIG. 7 as an example, assuming that the sub-network 701 is fused, when fusing the sub network 702, if layer 7 is the convolution layer or the pooling layer, while in the case where the sub-network 701 is fused, the processing apparatus 203 is unable to forward select the layer closest to the top layer other than the convolution layer and the pooling layer as the starting layer. At this time, the processing apparatus 203 changes to backward select the layer (layer 8) closest to the top layer other than the convolution layer and the pooling layer as the starting layer. However, as such, the whole block structure may not be incorporated into the template fuse unit. Since fusion effect achieved by using layer 8 as the starting layer is not ideal, the processing apparatus 203 may also directly select layer 7 as the starting layer.

After the starting layer is selected, the step 1102 is then performed to create the template fuse unit based on the starting layer. The processing apparatus 203 may create the template fuse unit according to rules (rules 1 to 19) that are enumerated in the above embodiment. These rules are only examples. The present disclosure does not restrict the order in which the rules are performed or the fact that these rules are required to be considered simultaneously. Those skilled in the art may add or delete the rules in different application scenarios according to actual situations to implement a fusion policy that meets a current application scenario.

The step 1101 and the step 1102 correspond to the step 1201 where the template fuse unit is determined according to the fusion policy. Next, the compiler derives the shape of the template fuse unit (the step 1202), derives the address (the step 1203), and allocates the on-chip storage space (the step 1204). Finally, the executable instruction is generated by the linker (the step 1205).

In the step 1103, the neural network computing is performed according to the template fuse unit created. The computing apparatus 201 performs the executable instruction to perform the neural network computing according to the template fuse unit.

The starting layer of this embodiment may be a layer other than the convolution layer and the pooling layer. Such a starting rule makes the creation of the template fuse unit more flexible. For different neural networks, the starting layer is appropriately selected to start the fusion, which is not limited by the positions and number of convolution layers or pooling layers in the neural network model, thereby adapting to various network models, making the fusion more comprehensive, and improving the whole benefit.

Figure 14:
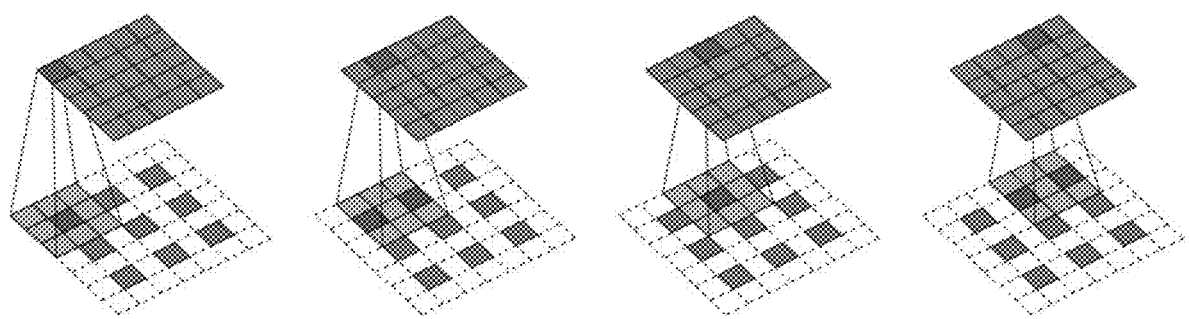
FIG. 14 is a schematic diagram of input/output feature maps in a regular pyramid structure.

In a modern neural network model, it is not necessary that an input/output feature map of each layer is in the form of an inverted pyramid shown in FIG. 8. Sizes of input feature maps of some layers are less than a size of feature map data. This kind of layer is often used in the deep learning field of computer vision. Under certain circumstances, it is required to restore a size of image to an original size for further computing. When computing this kind of layer, the size of image is enlarged to implement an operation of mapping the image from small resolution to large resolution. FIG. 14 is a schematic diagram of this kind of layer. It may be known from FIG. 14 that input/output feature maps are in the form of a regular pyramid. This kind of layer is called a regular pyramid layer in the present disclosure. While, a layer where an input feature map is greater than an output feature map in FIG. 8 is called an inverted pyramid layer.

In practice, the regular pyramid layer includes a deconvolution layer, an unpooling layer, or an unsampling layer.

The deconvolution is also called transpose convolution or dilated convolution. The deconvolution is not the complete inverse of forward convolution. The deconvolution is a kind of special forward convolution. The deconvolution requires parameters for computing, while the parameters are required to be trained. The deconvolution is to enlarge a size of input image by supplementing 0 in a certain proportion first, to rotate a convolution kernel, and then to perform the forward convolution.

Figure 15A:
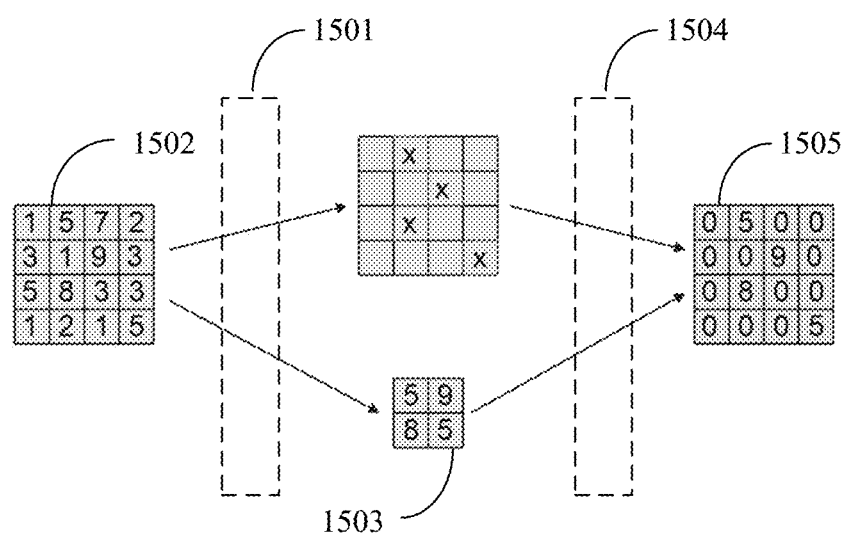
FIG. 15A is a schematic diagram of an unpooling operation of maximum pooling.
Figure 15B:
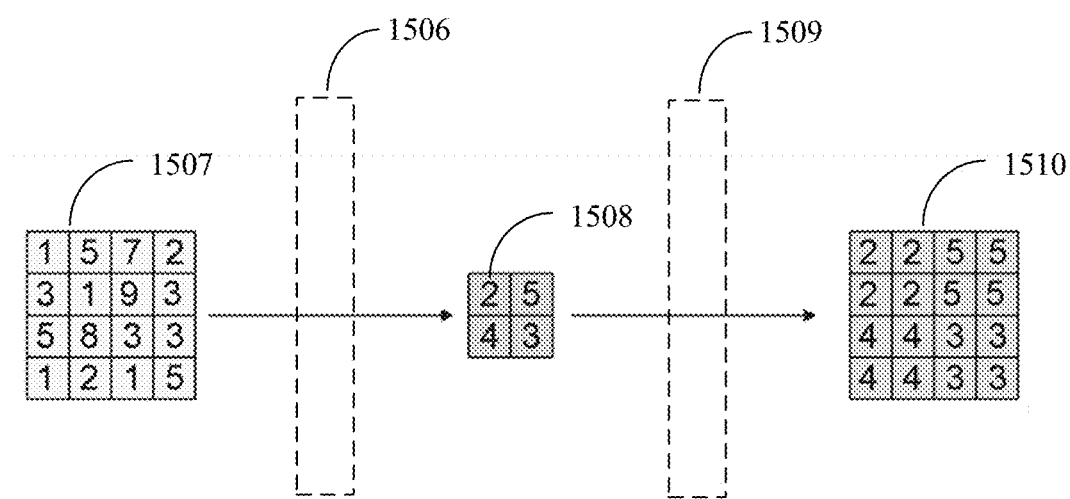
FIG. 15B is a schematic diagram of an unpooling operation of average pooling.

An unpooling operation is divided into an unpooling operation of maximum pooling and an unpooling operation of average pooling. The unpooling of maximum pooling is to reserve position information of a maximum value and then supplement 0 in other positions. As shown in FIG. 15A, a maximum pooling layer 1501 is shown in the figure. An input feature map 1502 of the maximum pooling layer 1501 generates an output feature map 1503 after passing through the maximum pooling layer 1501. The figure also shows an unpooling layer 1504 of maximum pooling. An input feature map 1503 of the unpooling layer 1504 generates an output feature map 1505 after passing through the unpooling layer 1504, and a size of the output feature map 1505 is greater than a size of the input feature map 1503. The unpooling of average pooling is to fill average values into corresponding positions in a corresponding original data area. As shown in FIG. 15B, an average pooling layer 1506 is shown in the figure. An input feature map 1507 of the average pooling layer 1506 generates an output feature map 1508 after passing through the average pooling layer 1506. The figure also shows an unpooling layer 1509 of average pooling. An input feature map 1508 of the unpooling layer 1509 generates an output feature map 1510 after passing through the unpooling layer 1509, and a size of the output feature map 1510 is greater than a size of the input feature map 1508.

Figure 16:
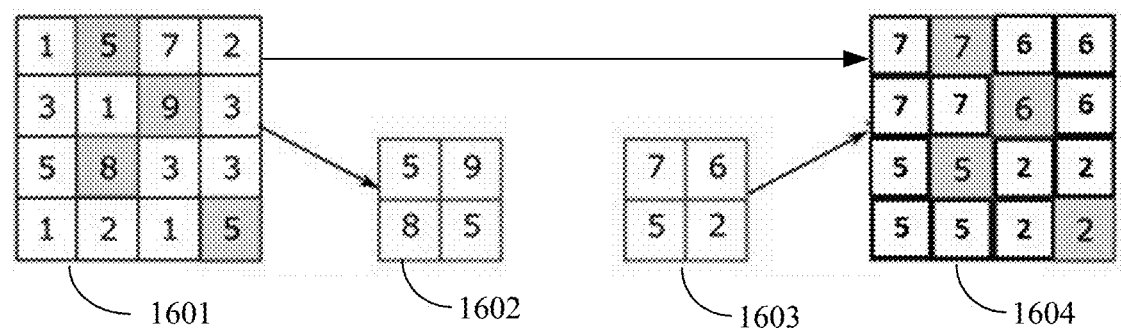
FIG. 16 is a schematic diagram of an unsampling operation.

The unsampling is to directly expand a feature map according to a kernel in the corresponding original data area. FIG. 16 is a schematic diagram of the unsampling. In the figure, an input feature map 1601 generates an intermediate feature map 1602 after passing through a maximum pooling layer (which is not drawn in the figure). After the intermediate feature map 1602 is expanded by a kernel 1603 of an unsampling layer (which is not drawn), an output feature map 1604 is obtained, and a size of the output feature map 1604 is greater than a size of the intermediate feature map 1602.

Figure 17:
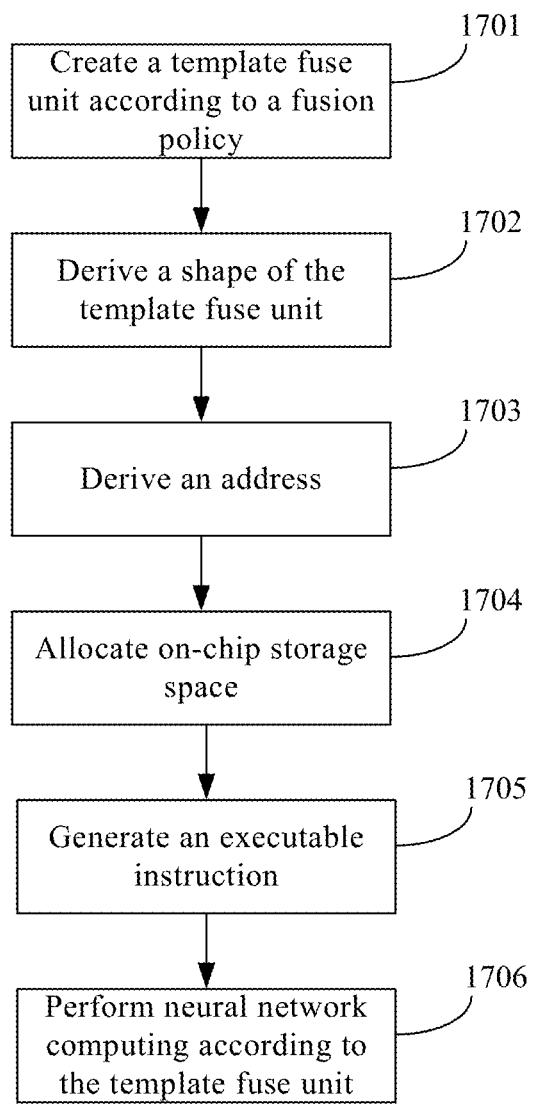
FIG. 17 is a flowchart of fusing an exemplary neural network according to an embodiment of the present disclosure.
Figure 18:
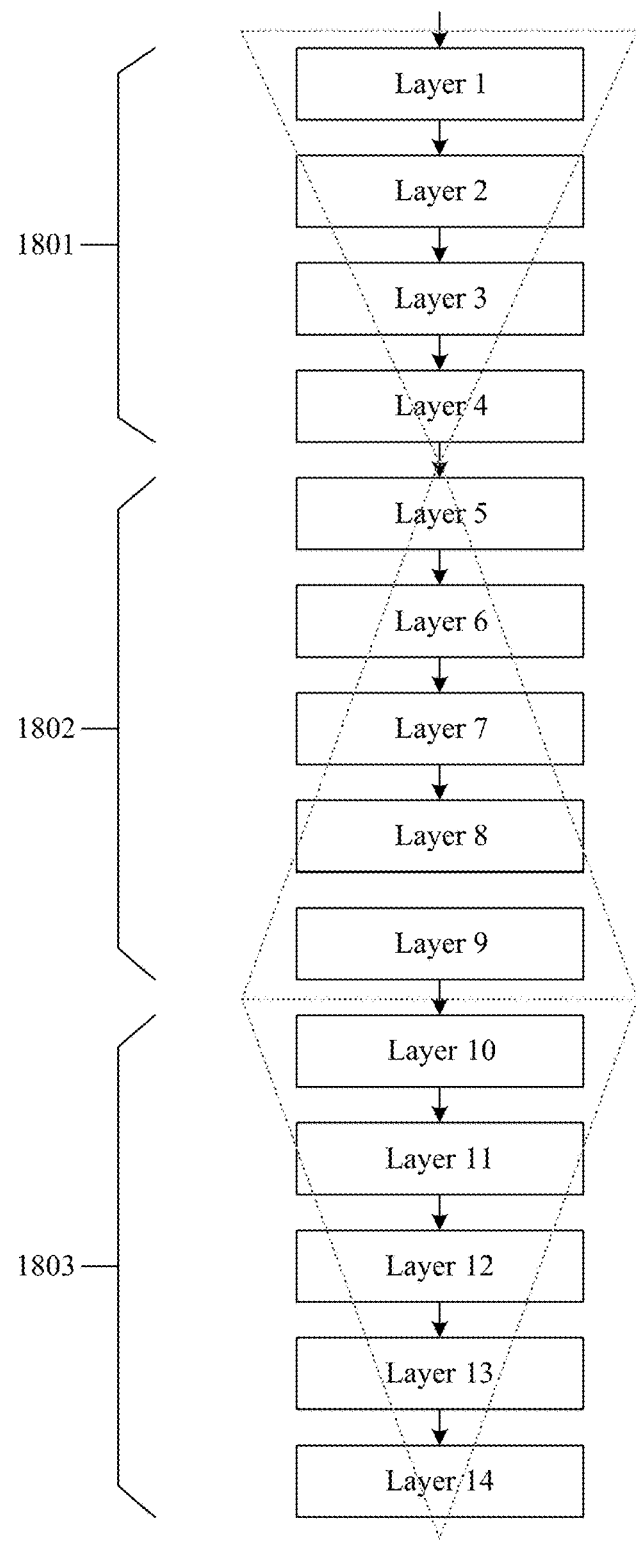
FIG. 18 is an exemplary neural network model.

The aforementioned operators are characterized by the fact that the input feature map is less than the output feature map. Additionally, there also exists a user-defined layer that also has the characteristic where the input feature map is less than the output feature map. Another embodiment of the present disclosure shows a solution of fusing the neural network. This solution also has the framework shown in FIGS. 1 to 4, and the fusion policy of the solution may fuse the regular pyramid layer. FIG. 17 shows a flowchart of fusing the neural network shown in FIG. 18 by this embodiment. FIG. 18 is an exemplary neural network model, which has 14 layers totally. A first section 1801 includes layers 1 to 4, which are inverted pyramid layers. A second section 1802 includes layers 5 to 9, which are regular pyramid layers. A third section 1803 includes layers 10-14, which are inverted pyramid layers.

In a step 1701, a template fuse unit is created according to a fusion policy. The processing apparatus 203 may select a starting layer of the template fuse unit according to a starting rule of a fusion policy. In an application scenario, the starting rule may be that a top unfused layer is the starting layer of the template fuse unit. Assuming that layers 1 to 3 are fused, layer 4 is the starting layer of this template fuse unit. Moreover, backward fusion is performed from layer 4, all rules of the fusion policy are checked one by one, so as to create the template fuse unit. First, layer 5 of the regular pyramid layer is fused. If the fusion may continue, the processing apparatus 203 may continue to fuse backward. In another application scenario, the starting rule may be that the top regular pyramid layer in all unfused layers is the starting layer of the template fuse unit. Similarly, assuming that layers 1 to 3 are fused, layer 5 is the top regular pyramid layer. Therefore, layer 5 is the starting layer of this template fuse unit, and fusion is performed backward.

This embodiment does not limit the fusion of the regular pyramid layers and the inverted pyramid layers. The fusion may include only the regular pyramid layers. For example, the template fuse unit includes layers 5 to 9. Moreover, the fusion may mix the regular pyramid layers and the inverted pyramid layers. For example, the template fuse unit includes layers 3 to 6, or the template fuse unit includes layers 9 to 12. In other words, the template fuse unit may include only the regular pyramid layers. Moreover, the template fuse unit may include the inverted pyramid layers plus the regular pyramid layers, or the template fuse unit may include the regular pyramid layers plus the inverted pyramid layers.

Not only that, the regular pyramid layers and the inverted pyramid layers may be adjacent in the template fuse unit, such as layer 4 and layer 5, and layer 9 and layer 10.

When the neural network has a block structure and the block structure includes the regular pyramid layer, a rule of the fusion policy of this embodiment may refer to adding and deleting the template fuse unit in units of block structures.

A main layer in this embodiment may be a matrix multiplication layer, a pooling layer, a convolution layer, a deconvolution layer, an unpooling layer, and an unsampling layer. When the neural network includes a plurality of main layers, the rule of the fusion policy may be that the template fuse unit includes at least two main layers. When the processing apparatus 203 judges that this rule is not satisfied, the processing apparatus 203 may adjust the template fuse unit until the rule is satisfied. This embodiment may further include anther rule of the fusion policy that the template fuse unit includes a continuous structure of main layer+main layer+non-main layer. When the processing apparatus 203 judges that this rule is not satisfied, the processing apparatus 203 may adjust the template fuse unit until this rule is satisfied.

In a step 1702, a shape of the template fuse unit is derived. Next, a step 1703 is performed to derive address. In a step 1704, on-chip storage space is allocated. In a step 1705, an executable instruction is generated. These steps are the same as steps 1202 to 1205, which are not repeated again.

Finally, a step 1706 is performed to perform neural network computing according to the template fuse unit. The computing apparatus 201 performs the aforementioned executable instruction to perform the neural network computing according to the template fuse unit.

This embodiment may fuse the regular pyramid layers and the inverted pyramid layers. Such a fusion policy may make the template fuse unit more flexible and free from the limitation of input feature maps and output feature maps, so as to adapt to various network models, make the fusion more comprehensive, and enhance the whole benefit.

Figure 19:
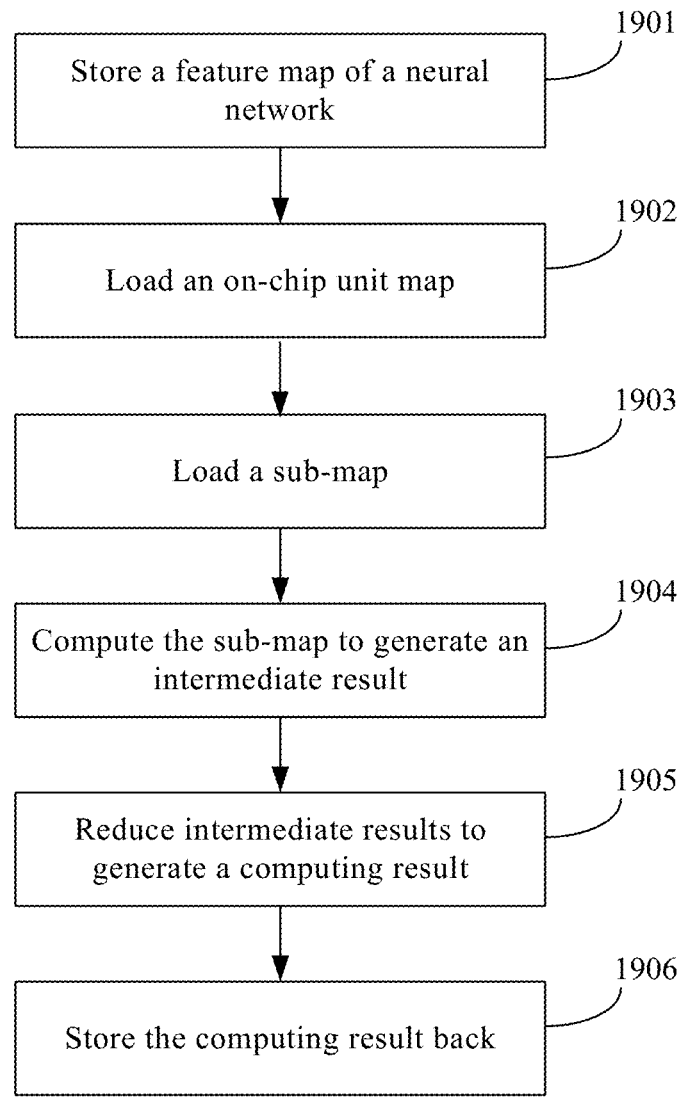
FIG. 19 is a flowchart of computing a neural network based on an executable instruction according to an embodiment of the present disclosure.

After generating the executable instruction, the computing apparatus 201 may infer the neural network in units of template fuse units according to the executable instruction. Another embodiment of the present disclosure shows a solution of computing a neural network based on an executable instruction. This solution also has the framework shown in FIGS. 1-4, which is a diagram used for computing the template fuse unit. This diagram implements a process shown in FIG. 19.

In a step 1901, a feature map of a neural network is stored. As described in the foregoing embodiments, the processing apparatus 203 fuses a plurality of layers of the neural network according to a fusion policy to generate a template fuse unit, and based on each rule, the processing apparatus 203 splits the feature map into an on-chip unit map appropriately.

More specifically, when the processing apparatus 203 decides the template fuse unit according to the fusion policy in the step 1201 of FIG. 12 and judges that the feature map is greater than available space of SRAM 308, which refers to a larger map mode, it is required to split the feature map, so as to enable the feature map to be loaded into the SRAM 308 multiple times. The splitting may be performed in at least one of N, H, and W dimensions with specific granularity. In this embodiment, the specific granularity may be but is not limited to half. However, when the processing apparatus 203 judges that the feature map is not greater than the available space of the SRAM 308, which refers to a small map mode, the on-chip unit map may include single or a plurality of feature maps depending on how many feature maps may be loaded in the available space of the SRAM 308. Technical details of converting the feature map to the on-chip unit map have been described in the foregoing embodiments for the large map mode and the small map mode. Therefore, the following will not repeat.

Feature maps for neural network computing are stored in DRAM 204.

In a step 1902, the on-chip unit map is loaded. Since an executable instruction is used for computing the neural network based on the template fuse unit, when the processing apparatus 203 performs the executable instruction, the neural network computing is performed according to the template fuse unit, rather than according to layer-by-layer computing of each layer of the neural network. The executable instruction contains information about how to split the feature map into the on-chip unit map. In other words, the executable instruction contains address information of the on-chip unit map. The SRAM 308 loads the on-chip unit map from the appropriate address of DRAM 204 via GMDA 311 according to the address information.

In a step 1903, sub-maps are loaded. NRAM 432 loads the sub-maps via MVDMA 434. Taking a case where one cluster 305 includes four processor cores 306 as an example, the on-chip unit map may be split into four sub-maps. One processor core 306 in the cluster 305 may split the on-chip unit map into four sub-maps in at least one of N, H, and W dimensions with specific granularity. Then, the sub-maps are sent to NRAM 432 of each processor core 306 via MVDMA 434, respectively. In this embodiment, the specific granularity may be but is not limited to half.

In a step 1904, the sub-maps are computed, and corresponding intermediate results are generated. An operation unit 42 of each processor core 306 takes out the sub-maps from NRAM 431 for computing and saves the intermediate results back to the NRAM 431 after generating the intermediate results. It is required to be noted that since a sub-map assigned to each processor core 306 belongs to a different part of the on-chip unit map, each intermediate result also reflects a part of a computing result.

In a step 1905, the intermediate results are reduced, so as to generate a computing result corresponding to the on-chip unit map. Reduction refers to combining the intermediate results into the computing result, which is also the aforementioned output-dependent operation. A broadcast bus 309 sends an intermediate result of each processor core 306 to a next processor core 306. The processor core 306 computes an intermediate result of a previous processor core 306 and a corresponding intermediate result that the processor core 306 stores, so as to generate a computing result. The reduction may be implemented in a number of ways. The following takes ring allreduce as an example to explain how this embodiment performs the reduction.

Figure 20:
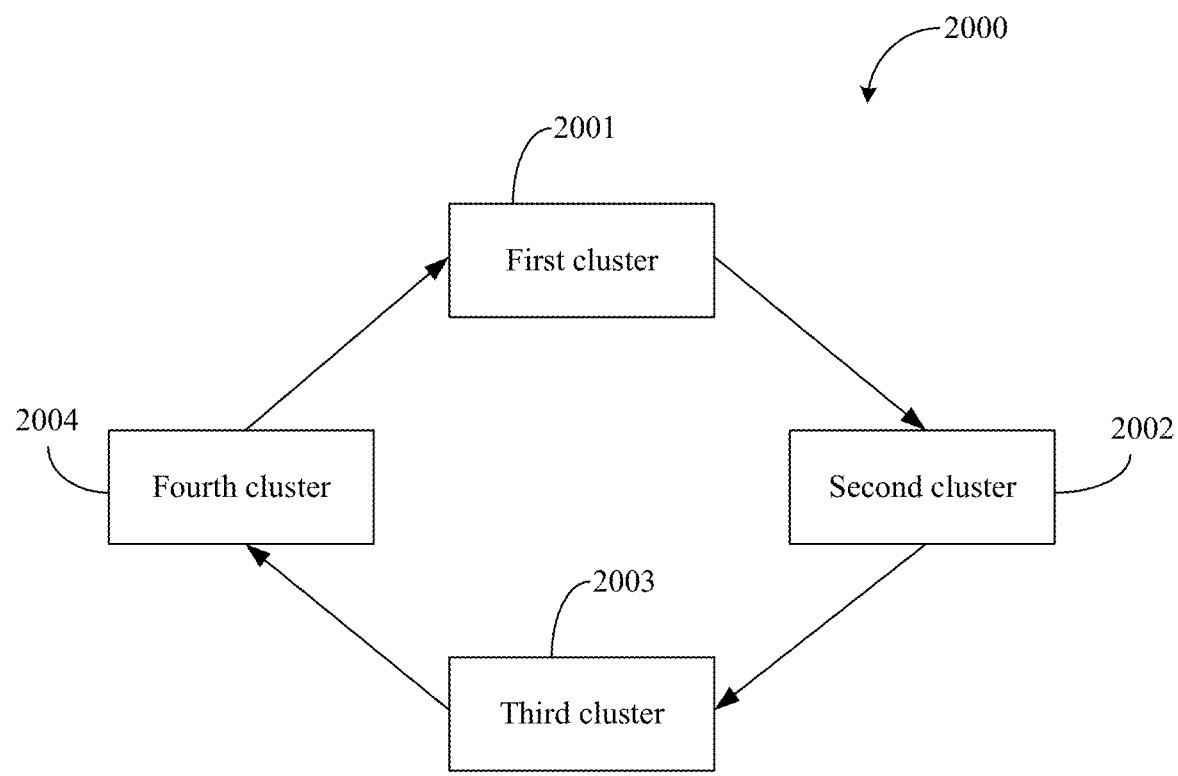
FIG. 20 is a ring allreduce framework diagram.

FIG. 20 shows a ring allreduce framework. The ring allreduce framework 2000 illustratively shows four clusters in the computing apparatus 201: a first cluster 2001, a second cluster 2002, a third cluster 2003, and a fourth cluster 2004, where each cluster includes four processor cores. The ring allreduce framework 2000 organizes these clusters into a logical loop. Each cluster is only connected to a previous cluster and a next cluster and receives and sends data in the same direction. As shown in the arrow direction in FIG. 20, each cluster receives the data from the previous cluster in clockwise direction and sends the data to the next cluster after computing the data. The data transfer of the cluster is performed through the CDMA 310 under the control and coordination of the synchronization unit 304. Such a framework may take full advantage of an input/output bandwidth of each cluster.

Figure 21:
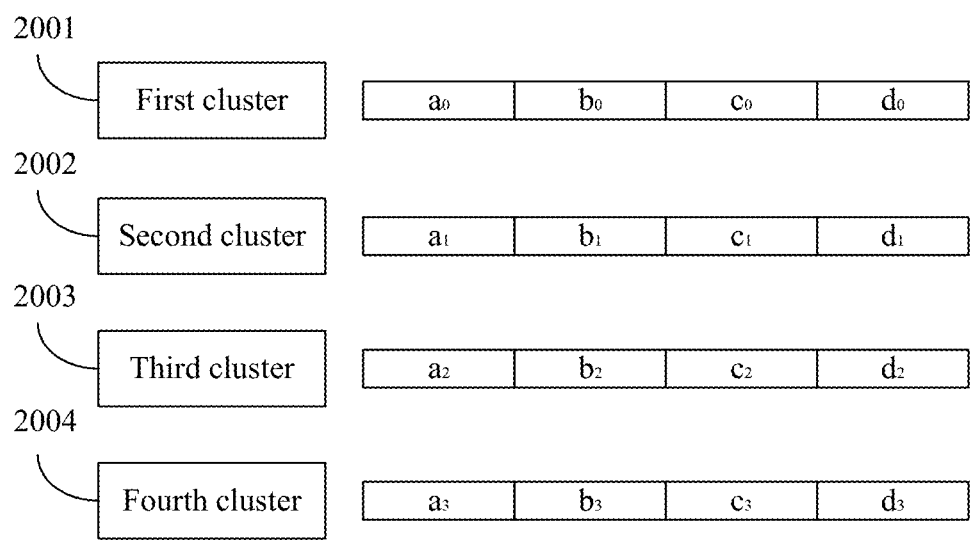
FIG. 21 is a schematic diagram of a plurality of clusters in a logical loop.

A plurality of clusters in the logical loop are as shown in FIG. 21. Before ring allreduce, each processor core in each cluster has completed sub-map computing of the core. In other words, the intermediate results have been generated before the ring allreduce. The intermediate results are stored in the NRAM of each processor core. Taking the first cluster 2001 as an example, four processor cores of the first cluster 2001 generate intermediate results including $a_0$, $b_0$, $c_0$, and $d_0$, respectively.

Next, a reduction program is performed, and these clusters will go through N−1 (where N is 4 herein) reduction iterations. In each iteration, these clusters will send all intermediate results to the next cluster and receive all intermediate results from the previous cluster for computing, where intermediate results that are sent and received by each cluster are different in each iteration.

Figure 22A:
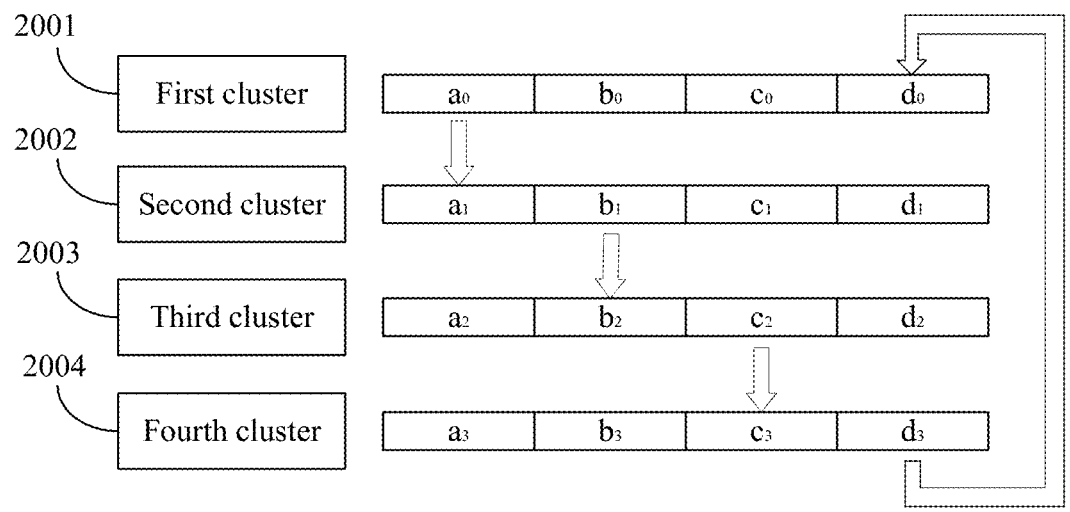
FIG. 22A is a schematic diagram of a first iteration of ring allreduce.

For the sake of explanation, here, it is assumed that an output-dependent operation is only required to sum these intermediate results to generate a computing result. FIG. 22A shows that in a first iteration, an intermediate result $a_0$ of the first cluster 2001 is transferred to the second cluster 2002 and added to an intermediate result $a_1$. An intermediate result $b_1$ of the second cluster 2002 is transferred to the third cluster 2003 and added to an intermediate result $b_2$. An intermediate result $c_2$ of the third cluster 2003 is transferred to the fourth cluster 2004 and added to an intermediate result $c_3$. An intermediate result $d_3$ of the fourth cluster 2004 is transferred to the first cluster 2001 and added to an intermediate result $d_0$.

Figure 22B:
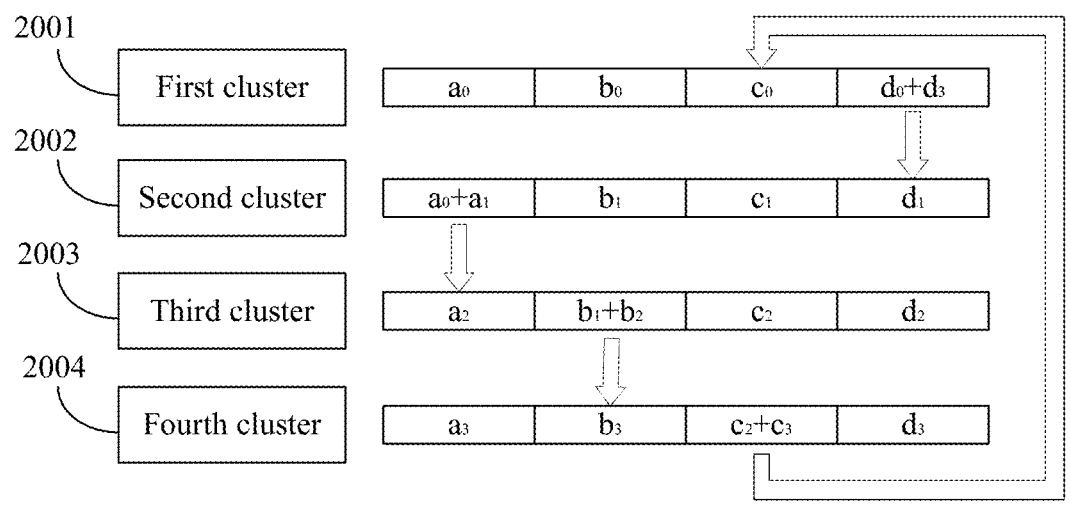
FIG. 22B is a schematic diagram of a second iteration of ring allreduce.

FIG. 22B shows that in a second iteration, an intermediate result $a_0+a_1$ of the second cluster 2002 is transferred to the third cluster 2003 and added to an intermediate result $a_2$. An intermediate result $b_1+b_2$ of the third cluster 2003 is transferred to the fourth cluster 2004 and added to an intermediate result $b_3$. An intermediate result $c_2+c_3$ of the fourth cluster 2004 is transferred to the first cluster 2001 and added to an intermediate result $c_0$. An intermediate result $d_0+d_3$ of the first cluster 2001 is transferred to the second cluster 2002 and added to an intermediate result $d_1$.

Figure 22C:
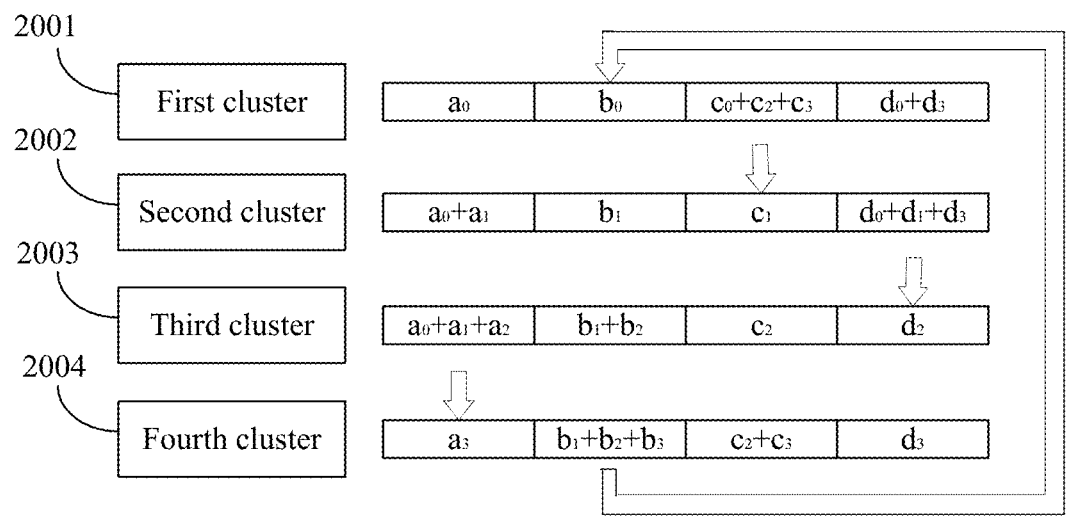
FIG. 22C is a schematic diagram of a third iteration of ring allreduce.

FIG. 22C shows that in a third iteration, an intermediate result $a_0+a_1+a_2$ of the third cluster 2003 is transferred to the fourth cluster 2004 and added to an intermediate result $a_3$. An intermediate result $b_1+b_2+b_3$ of the fourth cluster 2004 is transferred to the first cluster 2001 and added to an intermediate result $b_0$. An intermediate result $c_0+c_2+c_3$ of the first cluster 2001 is transferred to the second cluster 2002 and added to an intermediate result $c_1$. An intermediate result $d_0+d_1+d_3$ of the second cluster 2002 is transferred to the third cluster 2003 and added to an intermediate result $d_2$.

Figure 23A:
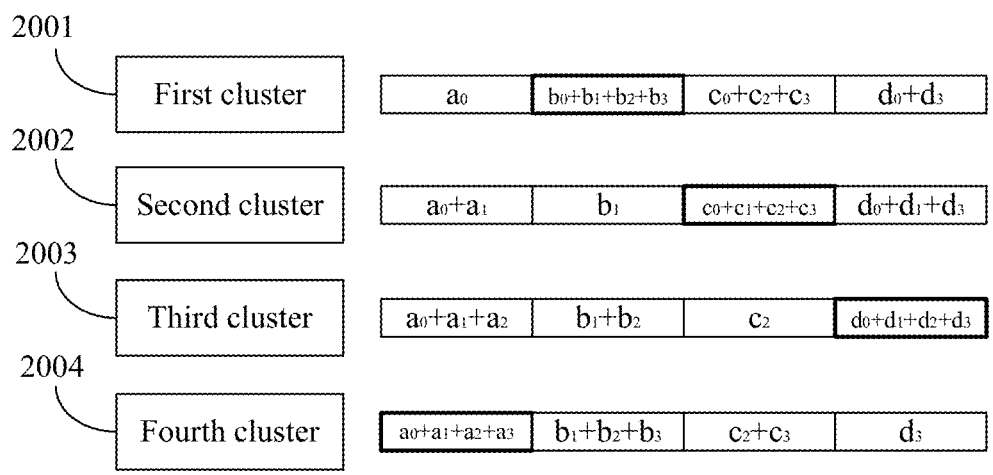
FIG. 23A is a schematic diagram of ring allreduce where each cluster has a processor core to perform complete reduction computing.

After the aforementioned addition computing, a state shown in FIG. 23A may be obtained. Each cluster has one processor core that performs complete reduction computing, which is the sum of longitudinal corresponding intermediate results. For example, a second processor core of the first cluster 2001 contains a computing result $b_0+b_1+b_2+b_3$. A third processor core of the second cluster 2002 contains a computing result $c_0+c_1+c_2+c_3$. A fourth processor core of the third cluster 2003 contains a computing result $d_0+d_1+d_2+d_3$. A first processor core of the fourth cluster 2004 contains a computing result $a_0+a_1+a_2+a_3$.

Figure 23B:
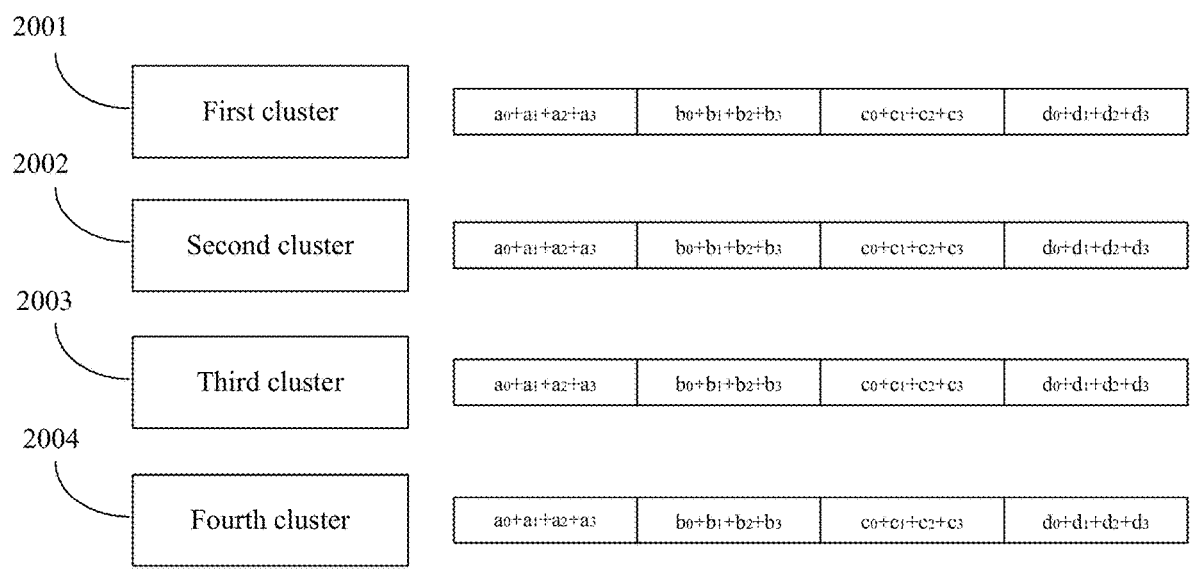
FIG. 23B is a schematic diagram of ring allreduce after performing complete computing.

In order to implement allreduce, the clusters must exchange these computing results, so that all cluster have the same final value. This step is called allgather. A process of an allgather program is similar to that of the reduction program. In other words, N−1 iterations are also performed, but values that are received by the clusters are not accumulated, but overwritten. Finally, a result shown in FIG. 23B may be obtained. All processor cores contain complete computing results, and these computing results are stored in the SRAM 308.

The above ring allreduce operation is intended only to illustrate one implementation of reduction of this embodiment, and the present disclosure does not limit a way of reduction.

Finally, a step 1906 is performed to save the computing results back. The SRAM 308 saves the computing results back to the DRAM 204 via the GDMA 311. These computing results are results of computing the on-chip unit map by the clusters. At this point, the computing apparatus 201 completes computing of the on-chip unit map.

This embodiment computes the neural network based on the executable instruction. The executable instruction of this embodiment performs computing according to the template fuse unit rather than each layer of the neural network. As such, this embodiment reduces on-chip and off-chip input/output consumption and improves computing efficiency.

Figure 24:
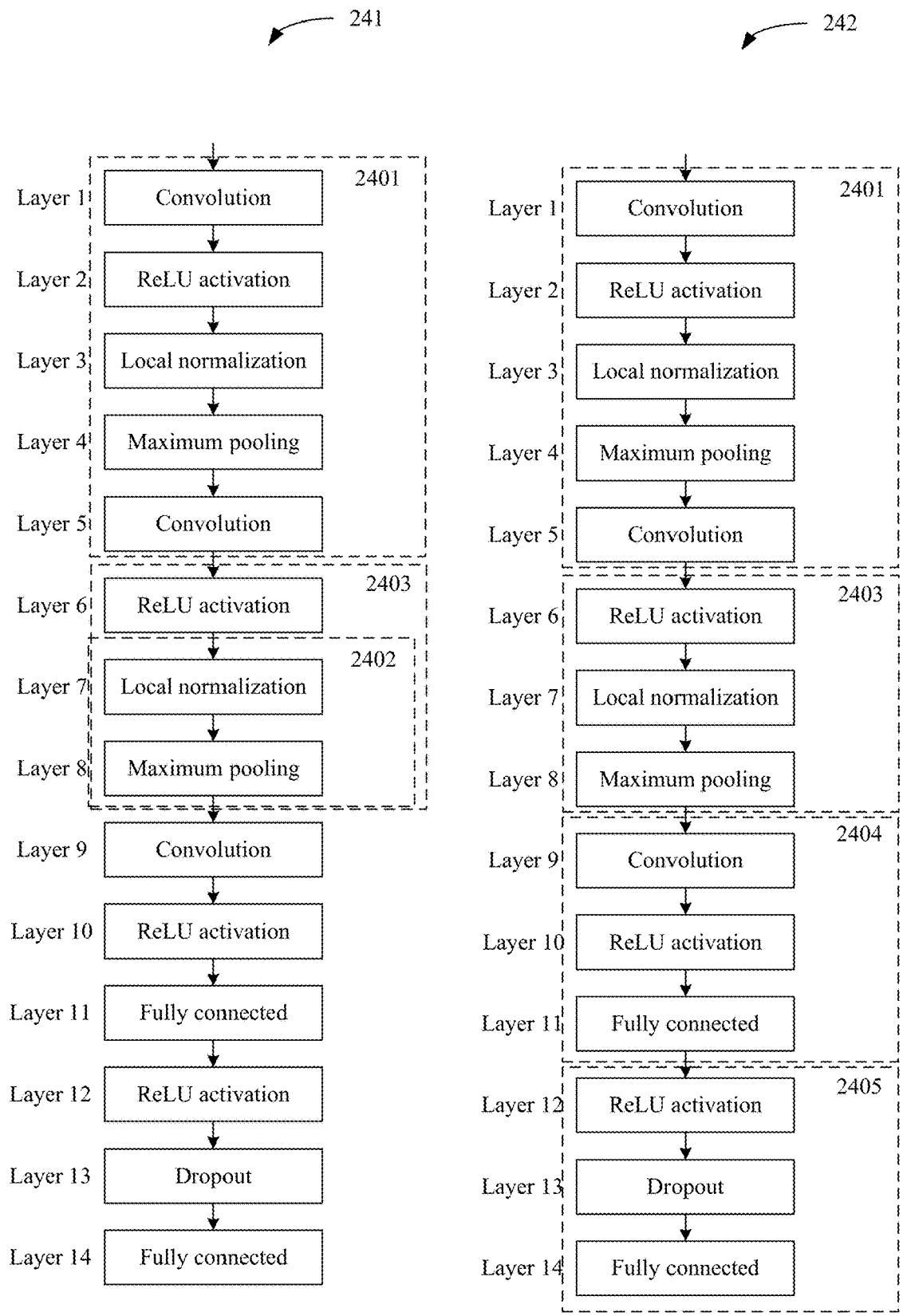
FIG. 24 is an exemplary long-chain neural network.
Figure 25:
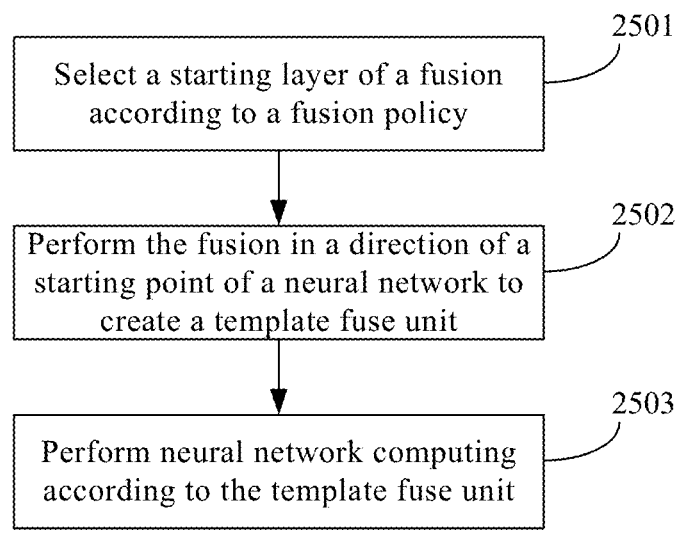
FIG. 25 is a flowchart of implementing a forward fusion of a neural network according to an embodiment of the present disclosure.

As mentioned in rule 2 of the aforementioned fusion policy, the present disclosure may choose to perform forward fusion preferentially. The forward fusion refers to a fusion in the opposite direction of neural network inference from a starting layer. In other words, the fusion is performed in the direction of a starting point of the neural network. FIG. 24 shows an exemplary long-chain neural network, which has 14 layers totally. Another embodiment of the present disclosure shows a method of implementing a forward fusion of a neural network by using the framework of FIGS. 1-4. The neural network is illustratively a long-chain neural network shown in FIG. 24. The method is as shown in FIG. 25.

In a step 2501, a starting layer of the fusion is selected according to a fusion policy. First referring to the neural network 241, the processing apparatus 203 selects the starting layer of the fusion according to the fusion policy. For the sake of explanation, it is assumed that layers 1 to 5 in FIG. 24 have been fused into a template fuse unit 2401. Moreover, one of rules of the fusion policy of this embodiment is that the starting layer is a top unfused convolution or pooling layer. In this step, when performing the fusion, the processing apparatus 203 judges which of unfused layers are convolution layers or pooling layers. As shown in the figure, layer 8 is a maximum pooling layer, layer 9 is a convolution layer, and therefore, the top unfused convolution or pooling layer is layer 8, and the processing apparatus 203 sets layer 8 as a starting layer of this fusion.

In a step 2502, the fusion is performed in the direction of the starting point of the neural network, so as to create the template fuse unit. In this embodiment, each layer in the template fuse unit must be continuous, and each layer should not fuse unfused layers over fused layers. In other words, each layer in the template fuse unit must be a continuous unfused layer. When layer 8 is the starting layer and the fusion is performed in the direction of the starting point of the neural network 241, layer 7 is incorporated into the template fuse unit, and the processing apparatus 203 judges whether layer 7 is an unfused layer. Since only layers 1 to 5 have been fused into the template fuse unit 2401, layer 7 is the unfused layer, and the processing apparatus 203 sets layer 7 (local normalization layer) to be fused with layer 8 (maximum pooling), which is a template fuse unit 2402.

When fusing, the processing apparatus 203 views the top layer in the template fuse unit 2402 as an input layer of the template fuse unit. In other words, layer 7 is the input layer. Moreover, the processing apparatus 203 views the last layer in the template fuse unit 2402 as an output layer of the template fuse unit 2402. In other words, the starting layer 8 is the output layer. The processing apparatus 203 performs pyramid fusion based on the input layer and the output layer. More specifically, the template fuse unit 2402, based on an inverted pyramid data structure shown in FIG. 8, takes an input of layer 7 as an input of the template fuse unit 2402 and an output of layer 8 as an output of the template fuse unit 2402, and derives backward from input data to output data. Intermediate data between layer 7 and layer 8 is stored in the SRAM 308 and is not saved back to the DRAM 204. Under this principle, judgment is performed according to rules of the fusion policy mentioned in the above embodiment, so as to determine whether layer 7 plus layer 8 satisfies the rules and may be the template fuse unit.

Assuming that the template fuse unit 2402 satisfies all rules of the fusion policy, next, the processing apparatus 203 continues the fusion in the direction of the starting point of the neural network 241. In other words, the processing apparatus 203 is intended to incorporate layer 6 (ReLU activation layer) into the template fuse unit, which is a template fuse unit 2403. The template fuse unit 2403 also has the inverted pyramid data structure shown in FIG. 8. The template fuse unit 2403 takes an input of layer 6 as an input of the template fuse unit 2403 and an output of layer 8 as an output of the template fuse unit 2403. Both intermediate data between layer 6 and layer 7 and the intermediate data between layer 7 and layer 8 is stored in the SRAM 308 and are not saved back to the DRAM 204. The judgment is performed according to rules of the fusion policy mentioned in the above embodiment, so as to determine whether layers 6 to 8 satisfy the rules and may be the template fuse unit.

Assuming that the template fuse unit 2403 also satisfies all rules of the fusion policy, next, the processing apparatus 203 continues the fusion in the direction of the starting point of the neural network 241. In other words, the processing apparatus 203 is intended to incorporate layer 5 into the template fuse unit. The processing apparatus 203 judges whether a newly added layer has been fused. Since layer 5 has been fused into the template fuse unit 2401, the processing apparatus 203 will not incorporate layer 5. At this point, the fusion is stopped, and the template fuse unit at this stage is created, which is the template fuse unit 2403.

The whole neural network 241 will be fused in the way described above. The neural network 242 shows a possible final fusion result. Originally, the whole neural network 242 includes 14 layers, which means 14 operators. After the fusion is completed, the 14 layers become four self-defined layers, which means four self-defined operators, which are composed of the template fuse unit 2401, the template fuse unit 2403, a template fuse unit 2404, and a template fuse unit 2405.

Going back to FIG. 25, in a step 2503, neural network computing is performed according to the template fuse unit. In the neural network 242, the computing apparatus 201 performs the neural network computing according to four self-defined layers composed of the template fuse unit 2401, the template fuse unit 2403, the template fuse unit 2404, and the template fuse unit 2405. In other words, when performing the neural network computing, the computing apparatus 201 performs the aforementioned four self-defined layers to replace original 14 layers, thus achieving technical effects of reducing input/output overheads and improving resource benefits.

When computing the neural network, since the template fuse unit includes a plurality of layers, when computing in units of template fuse units, the present disclosure may load weights that are required from the DRAM 204 to the SRAM 308 at a time. Taking a case where one template fuse unit includes a first convolution layer and a second convolution layer as an example, when computing the template fuse unit, the processing apparatus 203 not only loads a weight of the first convolution layer into the SRAM 308, but also loads a weight of the second convolution layer into the SRAM 308. More specifically, when the processor cores 306 computes the first convolution layer, the weight of the second convolution layer has already been stored in the SRAM 308. Once the first convolution layer is computed, the weight of the second convolution layer may be loaded from the SRAM 308 to the WRAM 432 immediately, so as to improve the speed of loading the weight.

Not only that, the WRAM 432 may also pre-load the weight. If the WRAM 432 is large enough, the weight of the first convolution layer and the weight of the second convolution layer may be loaded from the SRAM 308 to the WRAM 432 at a time. After the first convolution layer is computed, the weight of the second convolution layer is not required to be loaded from the SRAM 308 to the WRAM 432, and the operation unit 42 may read the weight of the second convolution layer from the WRAM 432 directly for computing. As such, weight loading time may be further reduced, and the overall running speed may be further improved.

Figure 26:
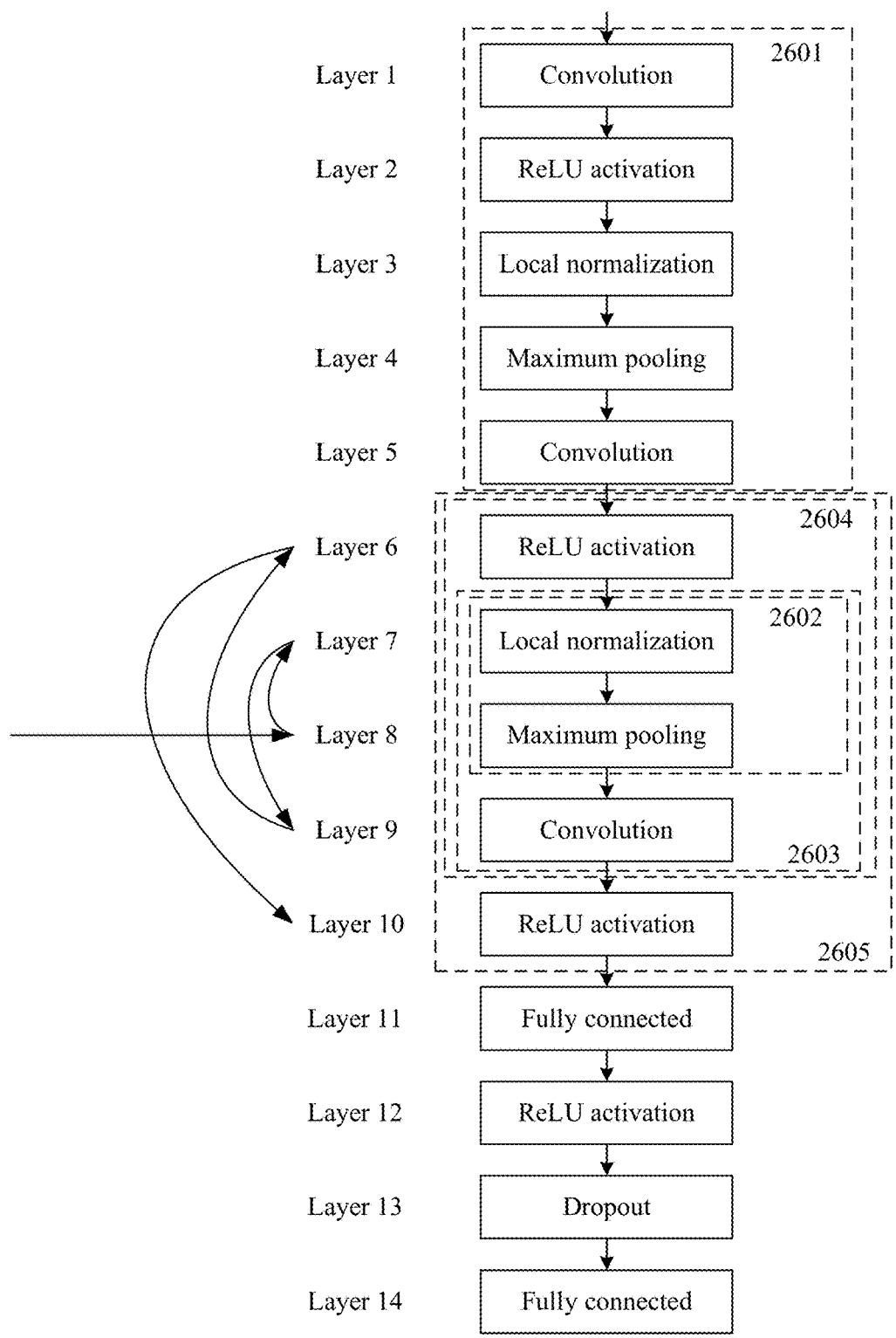
FIG. 26 is an exemplary long-chain neural network.

Another embodiment of the present disclosure shows a method of implementing a bidirectional fusion of a neural network by using the framework of FIGS. 1-4. The neural network also takes the long-chain neural network in FIG. 24 as an example and is also illustrated in FIG. 26.

Figure 27:
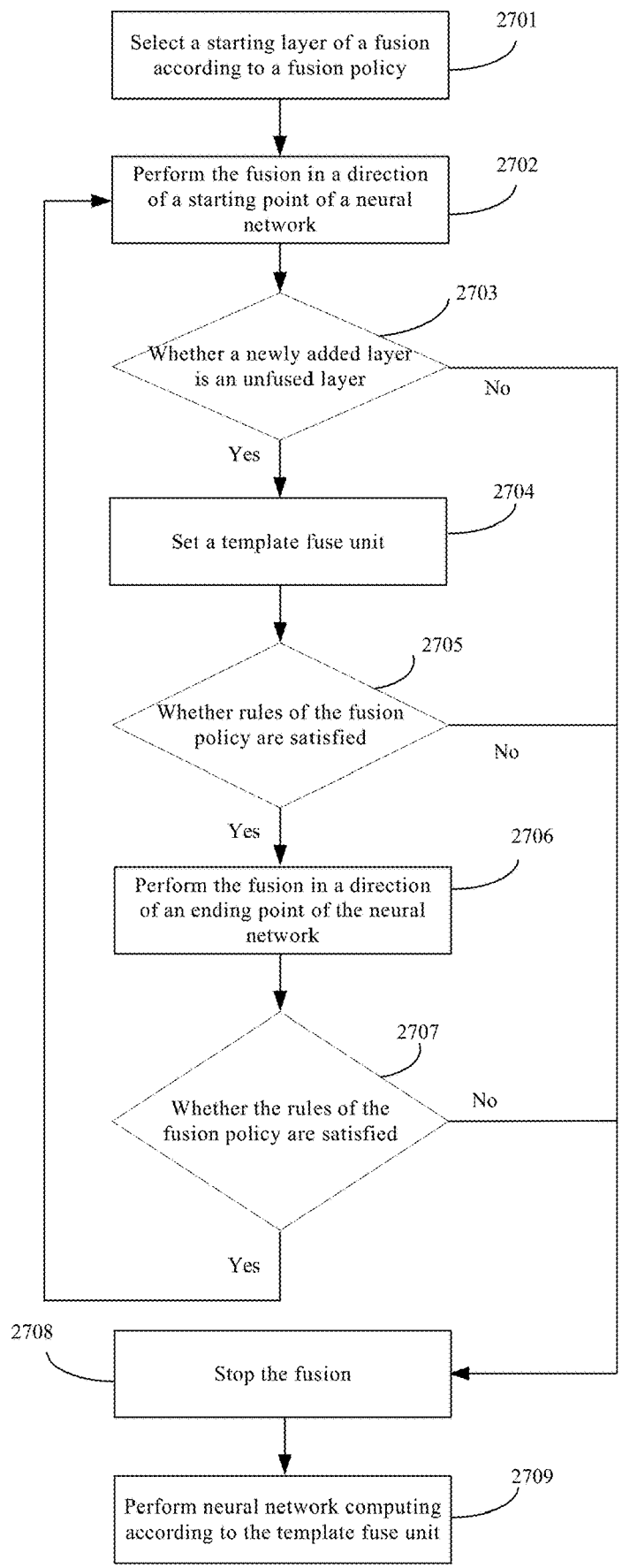
FIG. 27 is a flowchart of implementing a bidirectional fusion of a neural network according to an embodiment of the present disclosure.

The bidirectional fusion means that the fusion may be performed either forward or backward. The method is as shown in FIG. 27. The fusion policy also performs the fusion forward and backward, so as to create the template fuse unit. Then, the neural network computing is performed according to the template fuse unit. Similarly, it is assumed that layers 1 to 5 in FIG. 26 have been fused into a template fuse unit 2601. Moreover, a starting rule of the fusion policy of this embodiment is that the starting layer is a top unfused convolution or pooling layer.

In a step 2701, the processing apparatus 203 selects a starting layer of the fusion according to the fusion policy. The processing apparatus 203 judges that the top unfused convolution or pooling layer is a maximum pooling layer of layer 8, and therefore, the processing apparatus 203 sets layer 8 as a starting layer of this fusion.

In a step 2702, the fusion is performed in the direction of the starting point of the neural network. The processing apparatus 203 performs the fusion forward and incorporates layer 7 into the template fuse unit. Layer 7 becomes a newly added layer.

In a step 2703, the processing apparatus 203 judges whether the newly added layer is an unfused layer. If layer 7 is the unfused layer, a step 2704 is performed, and the processing apparatus 203 sets layer 7 and layer 8 as a template fuse unit 2602.

Next, a step 2705 is performed, and the processing apparatus 203 judges whether the template fuse unit 2602 complies with rules of the fusion policy. When fusing, the processing apparatus 203 views the top layer in the template fuse unit 2602 as an input layer of the template fuse unit 2602. In other words, layer 7 is the input layer. Moreover, the processing apparatus 203 views the starting layer in the template fuse unit 2602 as an output layer of the template fuse unit 2602. In other words, layer 8 is the output layer. The processing apparatus 203 performs pyramid fusion based on the input layer and the output layer.

If the template fuse unit 2602 complies with rules of the fusion policy, a step 2706 is performed, and the processing apparatus 203 performs the fusion in the direction of an ending point of the neural network from the starting layer. In other words, from layer 8, layer 7 is fused first. In this step, the fusion jumps back, and backward fusion of layer 9 is performed, so as to form a template fuse unit 2603. This type of forward and backward jump fusion is called jump fusion.

In a step 2707, the processing apparatus 203 judges whether the template fuse unit 2603 complies with rules of the fusion policy. When fusing, the processing apparatus 203 views the top layer of continuous layers in the template fuse unit 2603 as an input layer of the template fuse unit 2603. In other words, layer 7 is the input layer. While, the processing apparatus 203 views the last layer of backward jump as an output layer of the template fuse unit 2603. In other words, layer 9 is the output layer. The processing apparatus 203 performs pyramid fusion based on the input layer and the output layer.

If the template fuse unit 2603 complies with the rules of the fusion policy, this process goes back to the step 2702. The processing apparatus 2702 performs the fusion in the direction of the starting point of the neural network and incorporates layer 6 into the template fuse unit. In the step 2703, the processing apparatus 203 judges whether the newly added layer is the unfused layer. If layer 6 is the unfused layer, the step 2704 is performed, and the processing apparatus 203 sets layer 6 and layer 9 as a template fuse unit 2604.

Next, a step 2705 is performed, and the processing apparatus 203 judges whether the template fuse unit 2604 complies with rules of the fusion policy. When fusing, the processing apparatus 203 views the top layer in the template fuse unit 2604 as an input layer of the template fuse unit 2604. In other words, layer 6 is the input layer. Moreover, the processing apparatus 203 views the last layer of backward jump as an output layer of the template fuse unit 2604. In other words, layer 9 is the output layer. The processing apparatus 203 performs pyramid fusion based on the input layer and the output layer.

If the template fuse unit 2604 complies with the rules of the fusion policy, the step 2706 is performed, and the processing apparatus 203 performs the fusion in the direction of the ending point of the neural network. At this point, the jump fusion of layer 10 is performed, so as to form a template fuse unit 2605. In a step 2707, the processing apparatus 203 judges whether the template fuse unit 2605 complies with rules of the fusion policy. When fusing, the processing apparatus 203 views the top layer of continuous layers in the template fuse unit 2605 as an input layer of the template fuse unit 2605. In other words, layer 6 is the input layer. While, the processing apparatus 203 views the last layer of backward jump as an output layer of the template fuse unit 2605. In other words, layer 10 is the output layer. The processing apparatus 203 performs pyramid fusion based on the input layer and the output layer.

If the template fuse unit 2605 complies with the rules of the fusion policy, this process goes back to the step 2702. The processing apparatus 2702 performs the fusion in the direction of the starting point of the neural network and incorporates layer 5 into the template fuse unit. In the step 2703, the processing apparatus 203 judges whether layer 5 is the unfused layer. Since layer 5 has been fused into the template fuse unit 2601, a step 2708 is performed, and the processing apparatus 203 stops the fusion. In the step 2705 and the step 2707, when the processing apparatus 203 judges that the template fuse unit does not comply with the rules of the fusion policy, the step 2708 is also performed, and the processing apparatus 203 stops the fusion. At this point, the processing apparatus 203 creates the template fuse unit.

Finally, a step 2709 is performed, and the computing apparatus 201 performs the neural network computing according to the created template fuse unit.

In another application scenario, if, in the step 2703, the processing apparatus 203 judges that the newly added layer has been fused, the processing apparatus 203 may jump to perform the fusion in the direction of the ending point of the neural network. For example, when the processing apparatus 203 judges that layer 5 has been fused, the step 2706 may be performed directly. The processing apparatus 203 performs the fusion in the direction of the ending point of the neural network, and the jump fusion of layer 11 is performed. In other words, a new template fuse unit includes layers 6 to 11, and the fusion is performed backward until the fusion policy is no longer satisfied.

In another application scenario, the jump fusion of this embodiment may be performed by fusing backward first and then fusing forward, and the jump may be performed in order. Similarly, taking a case where layer 8 in FIG. 26 is the starting layer as an example, the processing apparatus 203 fuses layer 9 backward first. Next, the processing apparatus 203 jumps forward to fuse layer 7. Then, the processing apparatus 203 jumps backward to fuse layer 10, and so on. The present disclosure does not limit the order in which forward jump fusion and backward jump fusion are performed.

This embodiment explains an operation mode of jump fusion. It may be understood that the aforementioned jump fusion jumps forward or backward once as one layer is fused every time, as shown by arrows on the left side of FIG. 26. Those skilled in the art may adjust the way of jumping easily within the scope of the present disclosure. Jump is performed once as n layers are fused every time, where n is a natural number. For example, the jump may be performed forward or backward once as two layers are fused every time, or the jump may be performed forward or backward at a time as three layers are fused every time. Such adjustments are covered by the scope of disclosure of the present disclosure and also by the scope of protection of the present disclosure.

Figure 28:
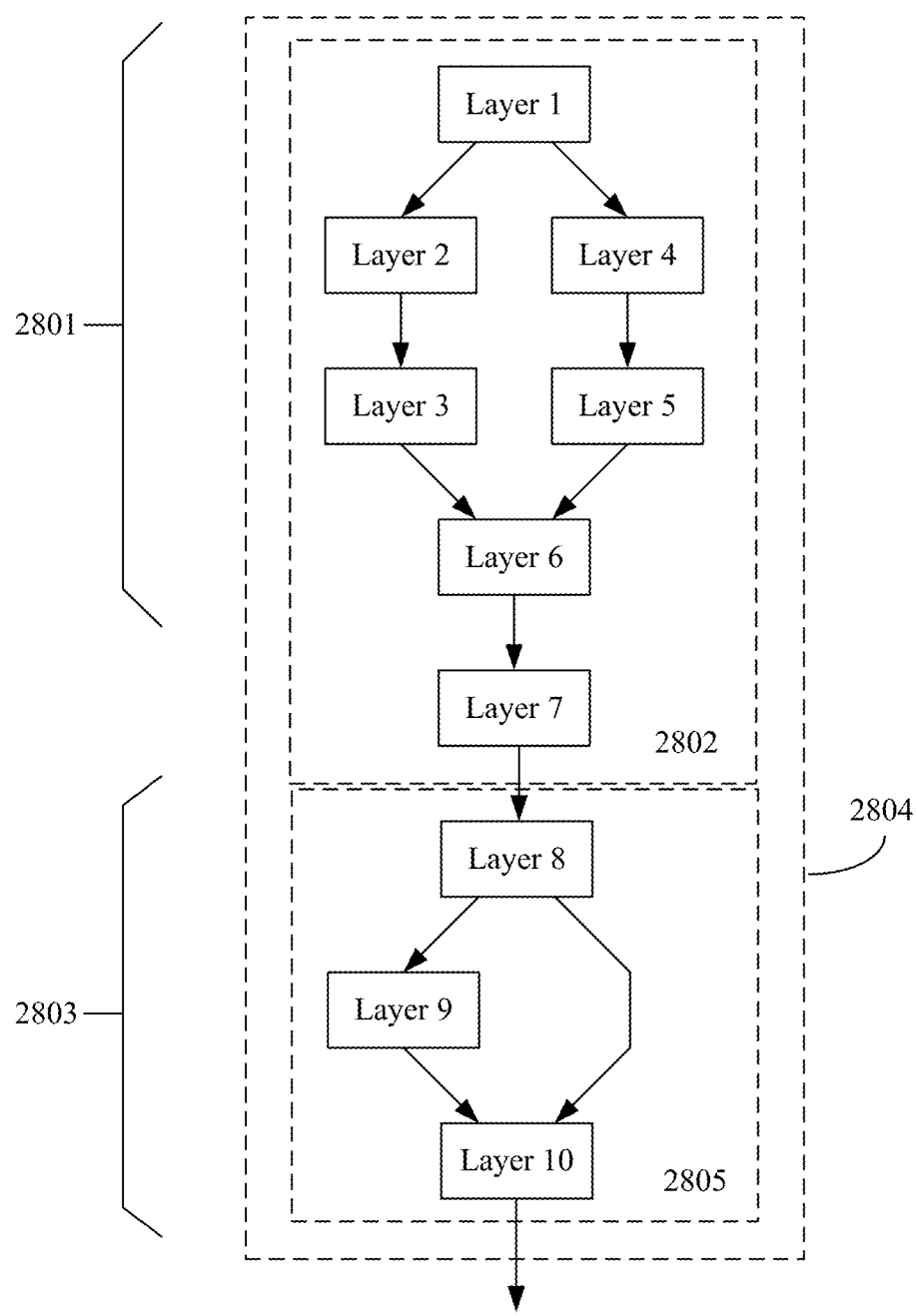
FIG. 28 is an exemplary block-structured neural network.

Another embodiment of the present disclosure shows a method of implementing a bidirectional fusion of a neural network by using the framework of FIGS. 1-4. The neural network illustratively has a block structure shown in FIG. 28. The starting rule of the fusion policy of this embodiment is also that the starting layer is the top unfused convolution or pooling layer. Jump fusion is performed in the direction of the starting point of the neural network and in the direction of the ending point of the neural network from the starting layer, so as to create the template fuse unit. Then, the neural network computing is performed according to the template fuse unit. Additionally, since this neural network is the block structure, one of rules of the fusion policy of this embodiment is that the fusion is performed in units of block structures. The following will further explain a way of deciding the template fuse unit.

First, the processing apparatus 203 selects the starting layer of the fusion according to the fusion policy. Moreover, the fusion is performed in the direction of the starting point of the neural network from the starting layer. Assuming that the top unfused convolution or pooling layer is layer 7, therefore, the processing apparatus 203 sets layer 7 as the starting layer of this fusion and performs the fusion forward to incorporate layer 6 into the template fuse unit. Although layer 6 is the unfused layer and may be fused, the processing apparatus 203 judges that layer 6 belongs to a block structure 2801. According to the fusion policy, the processing apparatus 203 is required to perform the fusion with the block structure 2801 as a unit. Therefore, the processing apparatus 203 incorporates layers 1 to 6 at a time, which forms a template fuse unit 2802.

Next, the processing apparatus 203 judges whether the template fuse unit 2802 complies with other rules of the fusion policy. When fusing, the processing apparatus 203 views layer 1 as an input layer of the template fuse unit 2802 and layer 7 as an output layer of the template fuse unit 2802. The processing apparatus 203 performs pyramid fusion based on the input layer and the output layer. This embodiment may select appropriate rules to form the fusion policy with reference to rules 1 to 19, such as rule 5: including at least two main layers, rule 6: including a continuous structure of main layer+main layer+non-main layer, and rule 7: including a continuous structure of scalar computing layer+vector computing layer, and the like.

If the template fuse unit 2802 complies with the rules of the fusion policy, next, the processing apparatus 203 performs the fusion in the direction of the ending point of the neural network. In other words, the processing apparatus 203 fuses layer 8. However, since layer 8 has two outputs, which enables the template fuse unit to become a multi-branch output, layer 8 does not comply with rule 4. Moreover, layer 8 belongs to a block structure 2803, and the processing apparatus 203 will fuse the whole block structure 2803 to form the template fuse unit 2804. Next, the processing apparatus 203 judges whether the template fuse unit 2804 complies with the rules of the fusion policy. If the template fuse unit 2804 complies with the rules of the fusion policy, the template fuse unit 2804 may become a final template fuse unit. The computing apparatus 201 performs the neural network computing based on the template fuse unit 2804. If the template fuse unit 2804 does not comply with the rules of the fusion policy, it is represented that hardware conditions of the computing apparatus 201 are insufficient to perform the template fuse unit 2804 at a time. At this time, the processing apparatus 203 stops the fusion and creates one template fuse unit thereof, which is the template fuse unit 2802.

The processing apparatus 203 will continue to try to fuse the block structure 2803 to form another template fuse unit 2805. Assuming that the template fuse unit 2805 complies with the fusion policy, the processing apparatus 203 then creates another template fuse unit.

Finally, the computing apparatus 201 performs the neural network computing according to two created template fuse units, which are the template fuse unit 2802 and the template fuse unit 2805. Compared to 10 layers of computing, input/output consumption may be greatly reduced.

Another embodiment of the present disclosure shows a solution of implementing a forward fusion, a backward fusion, a bidirectional fusion, a jump fusion of the neural network by using the framework of FIGS. 1-4. The solution of implementing the forward fusion, the backward fusion, the bidirectional fusion, the jump fusion of the neural network has been described in the aforementioned plurality of embodiments and will not be repeated separately. The fusion policy of this embodiment has a variety of fusion flexibility. For the same neural network, advantages and disadvantages of various template fuse unit solutions of forward fusion, backward fusion, bidirectional fusion, and jump fusion may be evaluated respectively, and the best solution may be further selected as the template fuse unit. In this embodiment, the best solution may be that the number of template fuse units is the least, main layers are fused most, the number of unfused layers is the least, or on-chip storage space occupied by the unfused layers is the least. Since this embodiment may accept a variety of fusion ways and select the best one as the template fuse unit, this embodiment may make full use of hardware environment of the computing apparatus 201. Compared with the aforementioned embodiment, this embodiment may further save input/output losses and further improve computing efficiency.

In the aforementioned embodiment, the step 1103, the step 1706, the step 2503, the step 2709 all refer to the neural network computing according to the template fuse unit. Another embodiment of the present disclosure shows a method of performing the template fuse unit. This method makes full use of the concurrency between the GDMA 311, the IODMA 433, the MVDMA 434, and the operation unit 42, and introduces the concept of pipeline, so that intermediate results reside on the chip as much as possible. As such, not only the input/output between on-chip and off-chip may be reduced, but also the advantage of high bandwidth of moving of the on-chip unit map may be used to accelerate processing speed. Here, the concurrency means that the aforementioned several components may be operated independently and in parallel, independent of the influence of other components.

As mentioned earlier, an input of a first layer and an output of a last layer in the template fuse unit may be used as interactive data between the template fuse unit and the DRAM 204. During this period, computing of each layer does not require access to the DRAM 204. In this embodiment, the processing apparatus 203 further divides the template fuse unit into several sub template fuse units according to sizes of the NRAM 431 and the WRAM 432.

Figure 29:
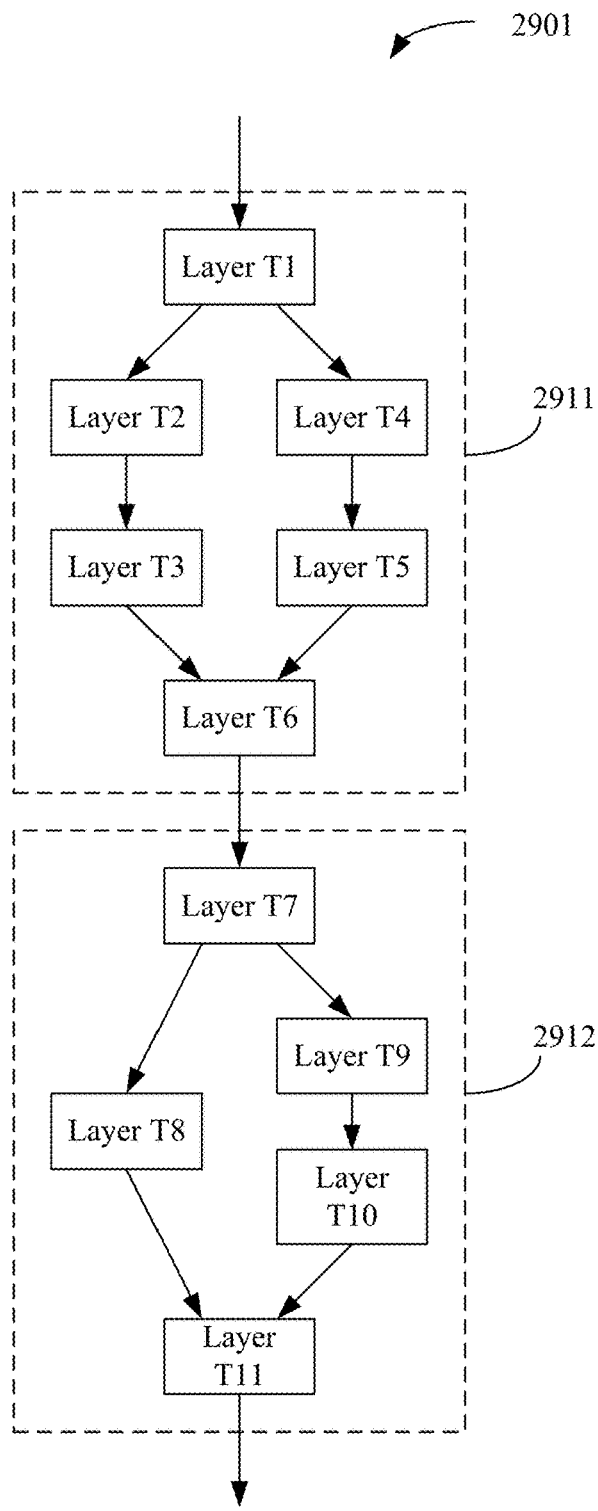
FIG. 29 is a flowchart of dividing sub template fuse units according to an embodiment of the present disclosure.

FIG. 29 is a schematic diagram of dividing sub template fuse units. Layers T1 to T11 in the figure constitute a segment of a specific deep learning network. The processing apparatus 203 divides a template fuse unit 2901 into a first sub template fuse unit 2911 and a second sub template fuse unit 2912 according to sizes of the NRAM 431 and the WRAM 432. In other embodiments, the processing apparatus 203 may divide the template fuse unit into an unspecified number of sub template fuse units.

Before starting to compute the template fuse unit 2901, the GDMA 311 moves data required by the template fuse unit 2901 from the DRAM 204 to the SRAM 308 at a time. Next, the MVDMA 434 moves sub-maps required to perform the first sub template fuse unit 2911 to the NRAM 431, and then the operation unit 42 starts to perform tasks of the first sub template fuse unit 2911. In other words, the operation unit 42 computes layers T1 to T6, and during this period, the operation unit is not required to access the SRAM 308. After the first sub template fuse unit 2911 is computed, a first intermediate result is generated. The MVDMA 434 moves the first intermediate result from the NRAM 431 to the SRAM 308.

Next, the MVDMA 434 moves sub-maps required to perform the second sub template fuse unit 2912 from the SRAM 308 to the NRAM 431. The operation unit 42 performs tasks of the second sub template fuse unit 2912. In other words, the operation unit 42 computes layers T7 to T11, and during this period, the operation unit is also not required to access the SRAM 308. After the second sub template fuse unit 2912 is computed, a second intermediate result is generated. The MVDMA 434 moves the second intermediate result from the NRAM 431 to the SRAM 308. One processor core 306 reduces the first intermediate result and the second intermediate result, so as to generate a computing result. Finally, the GDMA 311 moves the computing result from the SRAM 308 to the DRAM 204 at a time. At this point, tasks of the template fuse unit 2901 are completed. In other words, tasks of layers T1 to T11 are completed. During this period, the DRAM 204 is accessed only at the beginning and end of the template fuse unit 2901, which may greatly decrease the number of times of input/output.

One important reason why the computing apparatus 201 has strong computing power lies in a three-level operation hierarchy of system-on-chip-cluster-processor core in combination with three-level memory design of DRAM-SRAM-NRAM/WRAM, which enables data to be cached and computed at appropriate levels, thereby forming sufficient pipelines.

When the computing apparatus 201 performs computing, the computing may be mainly divided into three phases. Load phase: loading data. Compute phase: moving data, computing, moving intermediate results. Store phase: storing results back.

Figure 30:
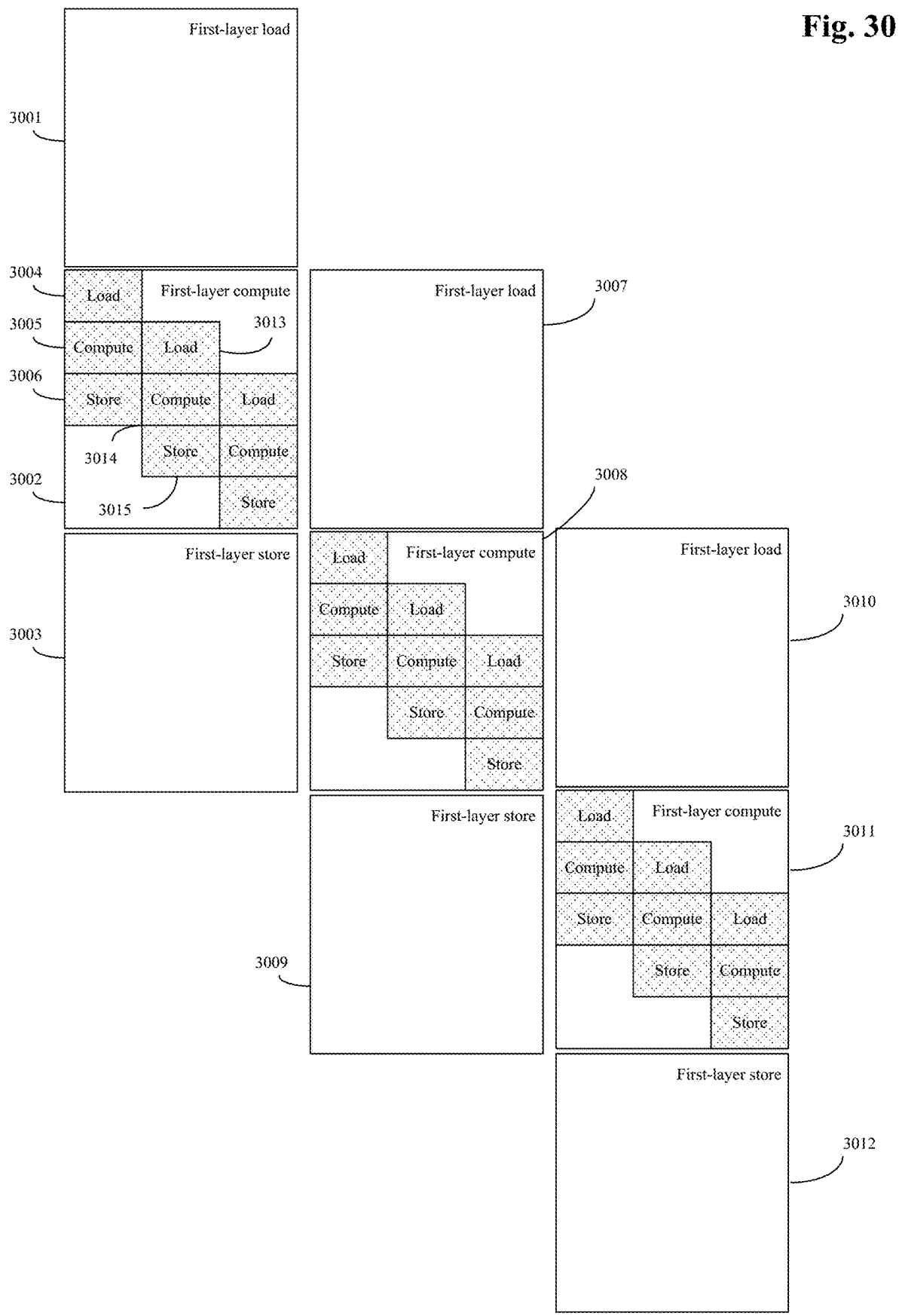
FIG. 30 is a schematic diagram of a two-layer three-level pipeline according to an embodiment of the present disclosure.

More specifically, this embodiment adopts a two-layer three-level pipeline. As shown in FIG. 30, a first-layer load phase 3001, a first-layer compute phase 3002, and a first-layer store phase 3003 occur at the cluster level. In the first-layer load phase 3001, the template fuse unit is performed, and the GDMA 330 loads data from the DRAM 204 to the SRAM 308. In the first-layer compute phase 3002, the cluster 305 computes the loaded on-chip unit map and generates the computing result. In the first-layer store phase 3003, the GDMA 330 stores the computing result from the SRAM 308 back to the DRAM 204.

Since the cluster 305 includes a plurality of processor cores 306, and the first-layer compute phase 3002 actually splits the on-chip unit map into corresponding sub-maps through the memory core 307 and broadcasts the sub-maps to the processor cores 306 for computing, a three-level pipeline of a second layer is operated in the processor cores 306. More specifically, in a second-layer load phase 3004, the sub template fuse units are performed, and the MVDMA 434 loads sub-maps from the SRAM 308 to the NRAM 431 and simultaneously loads weights that are required to the WRAM 432. In a second-layer compute phase 3005, the sub-maps and the weights are moved to the operation unit 42 for computing, and then the intermediate results are moved back to the NRAM 431. In a second-layer store phase 3006, the MVDMA 434 stores the intermediate results from the NRAM 431 back to the SRAM 308.

A first-layer pipeline means that the first-layer load phase 3001, the first-layer compute phase 3002, and the first-layer store phase 3003 may be concurrent. Here takes a case where the same cluster 305 intends to process a first on-chip unit map, a second on-chip unit map, and a third on-chip unit map as an example. First, the first on-chip unit map is loaded to the SRAM 308 in the first-layer load phase 3001. Next, the first on-chip unit map is computed in the first-layer compute phase 3002, and a first computing result is moved back to the SRAM 308. While the first on-chip unit map is computed, the second on-chip unit map is loaded to the SRAM 308 in a first-layer load phase 3007. When the first computing result is stored back to the DRAM 204 in the first-layer store phase 3003, the second on-chip unit map is computed in a first-layer compute phase 3008, and a second computing result is moved back to the SRAM 308. Moreover, the third on-chip unit map is loaded to the SRAM 308 in a first-layer load phase 3010.

In order to cooperate with operations of the aforementioned pipeline, the SRAM 308 of this embodiment includes two storage space: ping storage space and pong storage space. The pipeline of the template fuse unit is divided into three types according to ping-pong properties of the SRAM 308: I/O parity, input parity, and no parity. The I/O parity may support the parallel of loading, computing, and storing. In order to implement the I/O parity, the ping storage space and the pong storage space are required to be exactly the same for loading and storing respectively. The input parity only supports the parallel of storing and computing and increases additional moving time in the SRAM 308. Compared with the I/O parity, the ping storage space and the pong storage space are not required to be exactly the same, but a cache of the same size as store storage space is required to be allocated. The no parity refers to the parallel of loading/storing and computing, and no additional space allocation is required.

In order to implement the aforementioned first-layer pipeline, the SRAM 308 of this embodiment has the same size ping storage space and pong storage space, so as to achieve the effect of the I/O parity. Taking FIG. 30 for illustration again, the first-layer load phase 3001, the first-layer compute phase 3002, and the first-layer store phase 3003 of a first sub-map are performed in the ping storage space. The first-layer load phase 3007, the first-layer compute phase 3008, and a first-layer store phase 3009 of a second sub-map are performed in the pong storage space. The first-layer load phase 3010, a first-layer compute phase 3011, and a first-layer store phase 3012 of a third sub-map are performed in the ping storage space, and so on.

A second-layer pipeline means that the second-layer load phase 3004, the second-layer compute phase 3005, and the second-layer store phase 3006 may be concurrent. Here tries to take a case where the same processor core 306 intends to process the first sub-map, the second sub-map, and the third sub-map as an example. First, the first sub-map is loaded to the NRAM 431 in the second-layer load phase 3004, and required weights are loaded to the WRAM 432. Next, the first sub-map is computed and reduced in the second-layer compute phase 3005, and an intermediate result after reduction is moved back to the NRAM 431. Simultaneously, the second sub-map is loaded to the NRAM 431 in a second-layer load phase 3013, and required weights are loaded to the WRAM 432. Finally, a first intermediate result is stored back to the SRAM 308 in the second-layer store phase 3006. Simultaneously, the second sub-map is computed and reduced in a second-layer compute phase 3014, and an intermediate result after reduction is moved back to the NRAM 431. Moreover, the third sub-map is loaded to the NRAM 431 in a second-layer load phase 3015, and required weights are loaded to the WRAM 432.

Considering that each cluster 305 has different tasks, and completion time is naturally different, a synchronization unit 304 of this embodiment may synchronize task completion time by using a synchronization barrier instruction, so as to avoid timing errors.

In an application scenario, weight permutation is not enabled in this embodiment. In other words, during an execution process of the aforementioned pipeline, when one sub-map is computed, weights of a next sub-map are broadcast synchronously. Therefore, the WRAM 432 may store weights of two adjacent sub-maps at the same time. Since weights of a plurality of sub-maps may affect each other in the space of the WRAM 432, space occupied by the weights of two adjacent sub-maps in the WRAM 432 may be greater than a sum of the weights of two adjacent sub-maps. For the SRAM 308, in order to facilitate direct broadcast rather than multiple times of access to the DRAM 204 in the case of a plurality of batches, the processing apparatus 203 is required to allocate a plurality of pieces of space of storing weights for the SRAM 308. These weights may reside in the SRAM 308 at all times. If the template fuse unit includes a plurality of convolution layers, space of the SRAM 308 or the WRAM 432 may not be large enough to accommodate all the weights, so that the plurality of layers are not able to be fused.

When the processing apparatus 203 judges that the template fuse unit includes the plurality of convolution layers, this embodiment may switch to a weight permutation mode. The weight permutation means that, when computing one sub-map, the processing apparatus 203 loads weights of a next sub-map from the DRAM 204 to the SRAM 308. When the next sub-map is computed, the broadcast bus 309 broadcasts the weights to the WRAM 432. Compared with a case where the weight permutation is not enabled, although the weight permutation may increase the number of times of on-chip and off-chip access, the SRAM 308 is only required to configure storage space for the maximum weight, while the SRAM 308 only stores weights of one sub-map at any time, and the space may be reused. Rules of the fusion policy may include switching of weight permutation. When a sum of weights of the template fuse unit is small, the weight permutation is not used, so as to strive for faster computing speed. When the sum of weights is large, the weight permutation is used, so as to strive for fusing more layers.

This embodiment, based on the three-level operation hierarchy of system-on-chip-cluster-processor core and three-level memory design of DRAM-SRAM-NRAM/WRAM, builds the two-layer three-level pipeline, which makes full use of hardware resources and improves neural network computing efficiency.

Figure 31:
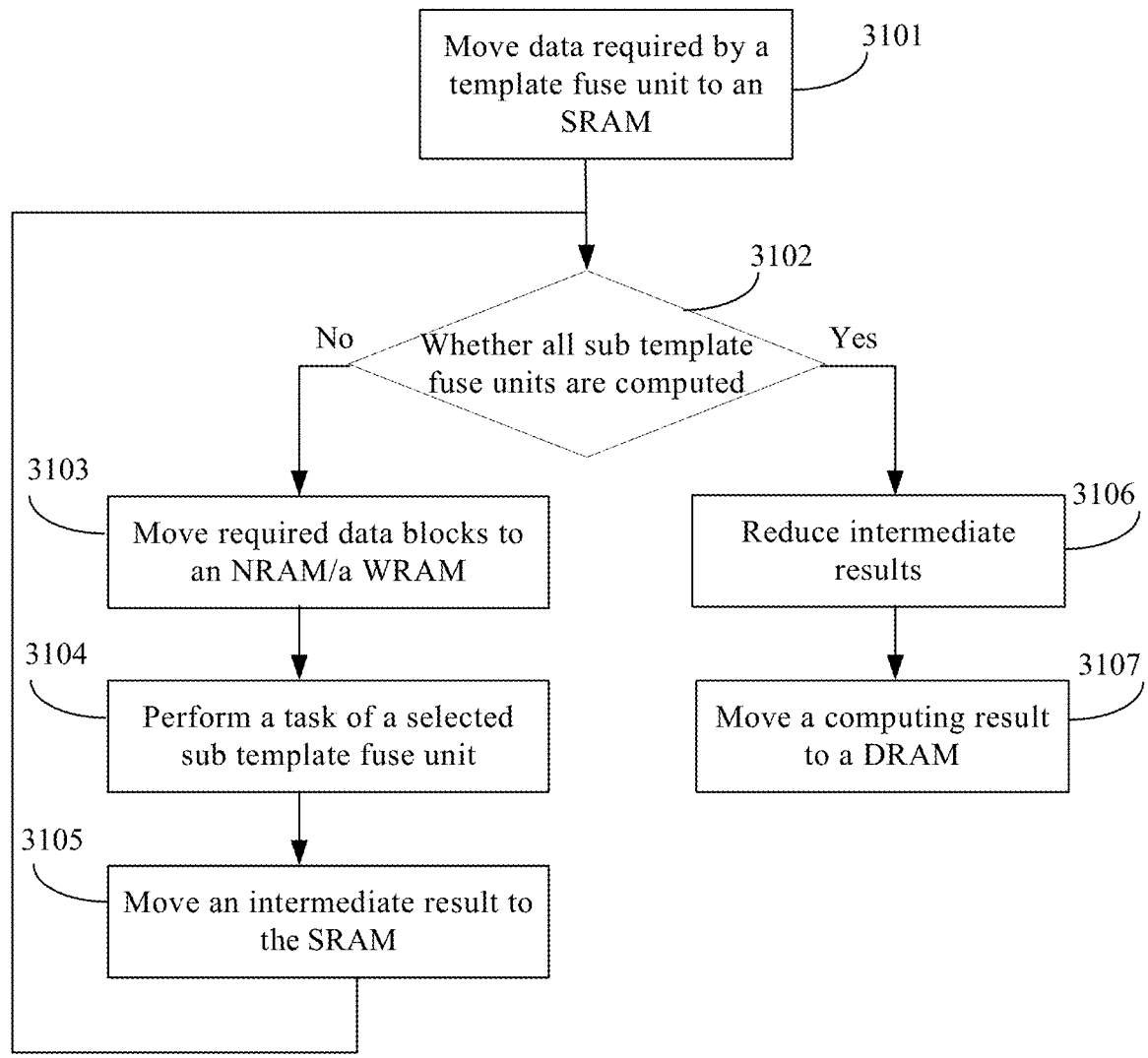
FIG. 31 is a flowchart of performing a computing program based on a template fuse unit according to an embodiment of the present disclosure.

FIG. 31 is a flowchart of performing a computing program based on a template fuse unit according to another embodiment of the present disclosure, where the template fuse unit includes a plurality of sub template fuse units. In a step 3101, data required by the template fuse unit is moved from off-chip DRAM 204 to SRAM 308 at a time. In a step 3102, whether all sub template fuse units in the template fuse unit are computed is judged. If not all sub template fuse units in the template fuse unit are computed, a step 3103 is performed to select one uncomputed sub template fuse unit and move data that is required by the uncomputed sub template fuse unit to the NRAM 431 and the WRAM 432. In a step 3104, a task of the sub template fuse unit selected is performed, and during this period, it is not required to access the SRAM again. In a step 3105, a generated intermediate result is moved from the NRAM 431 to the SRAM 308, and this process goes back to the step 3102.

If in the step 3102, it is judged that all sub template fuse units are performed, a step 3106 is performed to reduce all intermediate results to generate a computing result. In a step 3107, the computing result is moved from the SRAM 308 to the DRAM 204. At this point, tasks of the template fuse unit are completed.

Figure 32:
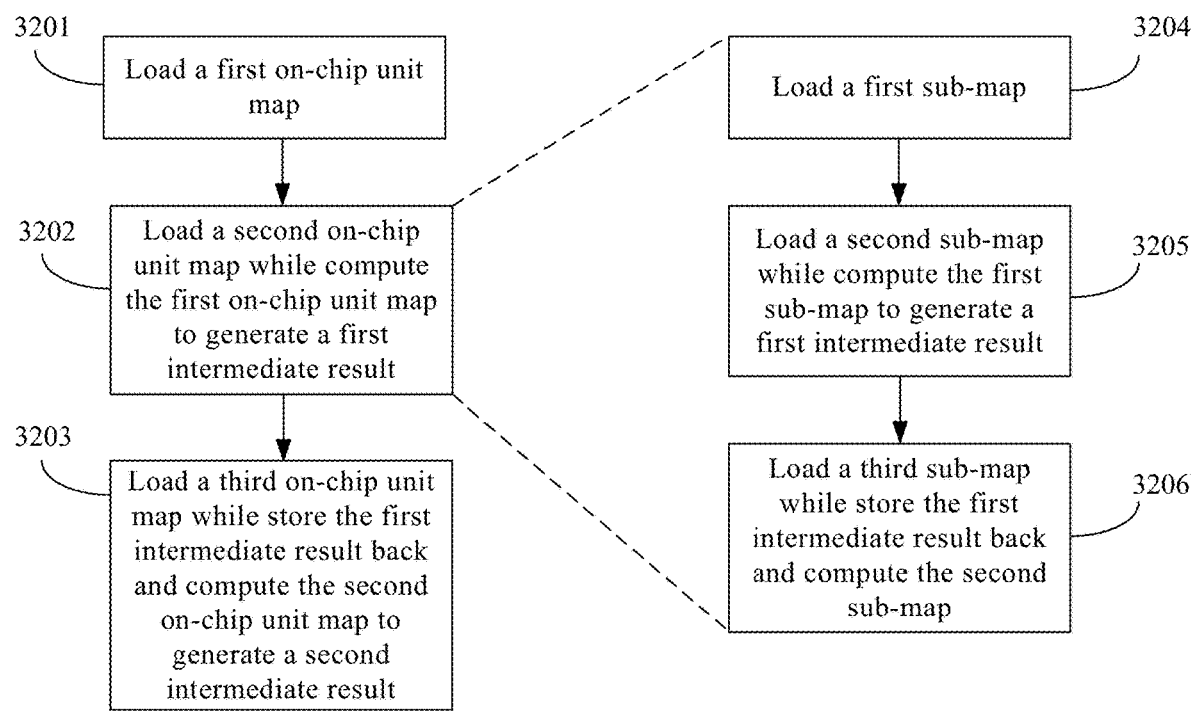
FIG. 32 is a flowchart of a two-layer three-level pipeline according to an embodiment of the present disclosure.

FIG. 32 is a flowchart of a two-layer three-level pipeline according to another embodiment of the present disclosure. In a step 3201, a first on-chip unit map is loaded. In a step 3202, a second on-chip unit map is loaded while the first on-chip unit map is computed to generate a first intermediate result. In a step 3203, a third on-chip unit map is loaded while the first intermediate result is stored back and the second on-chip unit map is computed to generate a second intermediate result. The step 3202 also includes following steps. In a step 3204, a first sub-map is loaded, where the first sub-map is at least part of the first on-chip unit map. In a step 3205, a second sub-map is loaded while the first sub-map is computed to generate a first intermediate result, where the second sub-map is at least part of the first on-chip unit map. In a step 3206, a third sub-map is loaded while the first intermediate result is stored back and the second sub-map is computed, where the third sub-map is also at least part of the first on-chip unit map.

Another embodiment of the present disclosure shows a computer readable storage medium, on which computer program codes for dynamically fusing a neural network according to a fusion policy are stored. When the computer program codes are run by a processor, methods described in FIG. 10, FIG. 11, FIG. 12, FIG. 17, FIG. 19, FIG. 25, FIG. 27, FIG. 31, FIG. 32 are performed.

By setting the fusion policy, the present disclosure dynamically determines the template fuse unit, fuses a plurality of layers in the neural network to form a new self-defined layer, and loads data required for computing the template fuse unit at a time, so as to reduce input/output overheads.

According to different application scenarios, the electronic device or apparatus of the present disclosure may include a server, a cloud server, a server cluster, a data processing apparatus, a robot, a computer, a printer, a scanner, a tablet, a smart terminal, a PC device, an Internet of Things terminal, a mobile terminal, a mobile phone, a traffic recorder, a navigator, a sensor, a webcam, a camera, a video camera, a projector, a watch, a headphone, a mobile storage, a wearable device, a visual terminal, an autonomous driving terminal, a vehicle, a household appliance, and/or a medical device. The vehicle includes an airplane, a ship, and/or a car; the household appliance includes a television, an air conditioner, a microwave oven, a refrigerator, an electric rice cooker, a humidifier, a washing machine, an electric lamp, a gas cooker, and a range hood; and the medical device includes a nuclear magnetic resonance spectrometer, a B-ultrasonic scanner, and/or an electrocardiograph. The electronic device or apparatus of the present disclosure may be further applied to Internet, Internet of Things, data center, energy, transportation, public management, manufacturing, education, power grid, telecommunications, finance, retail, construction sites, medical, and other fields. Further, the electronic device or apparatus of the present disclosure may be used in application scenarios including cloud, edge, and terminal related to artificial intelligence, big data, and/or cloud computing. In one or a plurality of embodiments, according to the solution of the present disclosure, an electronic device or apparatus with high computing power may be applied to a cloud device (such as the cloud server), while an electronic device or apparatus with low power consumption may be applied to a terminal device and/or an edge device (such as a smart phone or the webcam). In one or a plurality of embodiments, hardware information of the cloud device is compatible with hardware information of the terminal device and/or the edge device. As such, according to the hardware information of the terminal device and/or the edge device, appropriate hardware resources may be matched from hardware resources of the cloud device to simulate hardware resources of the terminal device and/or the edge device, so as to complete unified management, scheduling, and collaborative work of terminal-cloud integration or cloud-edge-terminal integration.

It is required to be explained that for the sake of brevity, the present disclosure describes some method embodiments as a series of actions and combinations thereof, but those skilled in the art may understand that the solution of the present disclosure is not limited by an order of actions described. Therefore, according to the present disclosure or under the teaching of the present disclosure, those skilled in the art may understand that some steps of the method embodiments may be performed in a different order or simultaneously. Further, those skilled in the art may understand that the embodiments described in the present disclosure may be regarded as optional embodiments; in other words, actions and modules involved thereof are not necessarily required for the implementation of a certain solution or some solutions of the present disclosure. Additionally, according to different solutions, descriptions of some embodiments of the present disclosure have their own emphases. In view of this, those skilled in the art may understand that for parts that are not described in detail in a certain embodiment of the present disclosure, reference may be made to related descriptions in other embodiments.

For specific implementations, according to the present disclosure and under the teaching of the present disclosure, those skilled in the art may understand that several embodiments disclosed in the present disclosure may be implemented through other methods that are not disclosed in the present disclosure. For example, for units in the aforementioned electronic device or apparatus embodiment, the present disclosure divides the units on the basis of considering logical functions, but there may be other division methods during actual implementations. For another example, a plurality of units or components may be combined or integrated into another system, or some features or functions in the units or components may be selectively disabled. In terms of a connection between different units or components, the connection discussed above in combination with drawings may be direct or indirect coupling between the units or components. In some scenarios, the direct or indirect coupling relates to a communication connection using an interface, where the communication interface may support electrical, optical, acoustic, magnetic, or other forms of signal transmission.

In the present disclosure, units described as separate components may or may not be physically separated. Components shown as units may or may not be physical units. The components or units may be located in a same position or distributed to a plurality of network units. Additionally, according to actual requirements, some or all of the units may be selected for achieving the purpose of the solution described in embodiments of the present disclosure. Additionally, in some scenarios, a plurality of units in the embodiments of the present disclosure may be integrated into one unit, or each of the units may be physically separated.

In some implementation scenarios, the integrated unit may be implemented in the form of a software program unit. If the integrated unit is implemented in the form of the software program unit and sold or used as an independent product, the integrated unit may be stored in a computer-readable memory. Based on such understanding, if the solution of the present disclosure is embodied in the form of a software product (such as a computer-readable storage medium), the software product may be stored in a memory. The software product may include several instructions used to enable a computer device (which may be a personal computer, a server, or a network device, and the like) to perform part or all of steps of the method of the embodiments of the present disclosure. The foregoing memory includes but is not limited to an USB, a flash disk, a read only memory (ROM), a random access memory (RAM), a mobile hard disk, a magnetic disk, or an optical disc, and other media that may store a program code.

In some other implementation scenarios, the integrated unit may be implemented in the form of hardware. The hardware may be a specific hardware circuit, which may include a digital circuit and/or an analog circuit. A physical implementation of a hardware structure of the circuit includes but is not limited to a physical component. The physical component includes but is not limited to a transistor, or a memristor, and the like. In view of this, various apparatuses (such as the computing apparatus or other processing apparatus) described in the present disclosure may be implemented by an appropriate hardware processor, such as a central processing unit (CPU), a graphics processing unit (GPU), a field-programmable gate array (FPGA), a digital signal processor (DSP), and an application-specific integrated circuit (ASIC), and the like. Further, the storage unit or the storage apparatus may be any appropriate storage medium (including a magnetic storage medium or a magneto-optical storage medium, and the like), such as a resistive random access memory (RRAM), a dynamic random access memory (DRAM), a static random access memory (SRAM), an enhanced dynamic random access memory (EDRAM), a high bandwidth memory (HBM), a hybrid memory cube (HMC), the ROM, and the RAM, and the like.

The foregoing may be better understood according to following articles:

2020110458882 Article A1. An integrated circuit apparatus for fusing a neural network, where the neural network includes an i-th layer, an input feature map of the i-th layer is less than an output feature map of the i-th layer, and the integrated circuit apparatus includes:
  a processing apparatus configured to create a template fuse unit according to a fusion policy; and
  a computing apparatus configured to perform neural network computing according to the template fuse unit, where
  the template fuse unit includes the i-th layer, where i is a natural number.

Article A2. The integrated circuit apparatus of article A1, where the neural network further includes a j-th layer, which is located before the i-th layer, an input feature map of the j-th layer is greater than an output feature map of the j-th layer, and the template fuse unit further includes the j-th layer, where j is a natural number, and i is not equal to j.

Article A3. The integrated circuit apparatus of article A1, where the neural network further includes a j-th layer, which is located after the i-th layer, an input feature map of the j-th layer is greater than an output feature map of the j-th layer, and the template fuse unit further includes the j-th layer, where j is a natural number, and i is not equal to j.

Article A4. The integrated circuit apparatus of article A2 or article A3, where the i-th layer and the j-th layer are adjacent.

Article A5. The integrated circuit apparatus of article A1, where the fusion policy is that the i-th layer is a starting layer of the template fuse unit.

Article A6. The integrated circuit apparatus of article A1, where the i-th layer is located in a block structure of the neural network, and a rule of the fusion policy is to add and delete the template fuse unit in the unit of the block structure.

Article A7. The integrated circuit apparatus of article A1, where the i-th layer is one of a deconvolution layer, an unpooling layer, and an unsampling layer.

Article A8. The integrated circuit apparatus of article A7, where the neural network includes a plurality of main layers, where a main layer is one of matrix multiplication, pooling, convolution, and the i-th layer, a rule of the fusion policy is that the template fuse unit includes at least two main layers, and when the processing apparatus judges that the rule is not satisfied, the processing apparatus adjusts the template fuse unit until the rule is satisfied.

Article A8. The integrated circuit apparatus of article A7, where the neural network includes a plurality of main layers, where a main layer is one of matrix multiplication, pooling, convolution, and the i-th layer; a rule of the fusion policy is that the template fuse unit includes a continuous structure in which the main layer, the main layer, and a non-main layer are successively adjacent; and when the processing apparatus judges that the rule is not satisfied, the processing apparatus adjusts the template fuse unit until the rule is satisfied.

Article A10. The integrated circuit apparatus of article A1, where the i-th layer is a self-defined layer.

Article A11. A board card, including the integrated circuit apparatus of any one of articles A1-A10.

Article A12. A method for fusing a neural network, where the neural network includes an i-th layer, and an input feature map of the i-th layer is less than an output feature map of the i-th layer, where i is a natural number, and the method includes:
  creating a template fuse unit according to a fusion policy, where the template fuse unit includes the i-th layer; and
  performing neural network computing according to the template fuse unit.

Article A13. The method of article A12, where the neural network further includes a j-th layer, which is located before the i-th layer, an input feature map of the j-th layer is greater than an output feature map of the j-th layer, and the template fuse unit further includes the j-th layer, where j is a natural number, and i is not equal to j.

Article A14. The method of article A12, where the neural network further includes a j-th layer, which is located after the i-th layer, an input feature map of the j-th layer is greater than an output feature map of the j-th layer, and the template fuse unit further includes the j-th layer, where j is a natural number, and i is not equal to j.

Article A15. The method of article A13 or article A14, where the i-th layer and the j-th layer are adjacent.

Article A16. The method of article A12, where the fusion policy is that the i-th layer is a starting layer of the template fuse unit.

Article A17. The method of article A12, where the i-th layer is located in a block structure of the neural network, and a rule of the fusion policy is to add and delete the template fuse unit in the unit of the block structure.

Article A18. The method of article A12, where the i-th layer is one of a deconvolution layer, an unpooling layer, and an unsampling layer.

Article A19. The method of article A18, where the neural network includes a plurality of main layers, where a main layer is one of matrix multiplication, pooling, convolution, and the i-th layer, a rule of the fusion policy is that the template fuse unit includes at least two main layers, and when the processing apparatus judges that the rule is not satisfied, the processing apparatus adjusts the template fuse unit until the rule is satisfied.

Article A20. The method of article A18, where the neural network includes a plurality of main layers, where a main layer is one of matrix multiplication, pooling, convolution, and the i-th layer, a rule of the fusion policy is that the template fuse unit includes a continuous structure in which the main layer, the main layer, and a non-main layer are successively adjacent, and when the processing apparatus judges that the rule is not satisfied, the processing apparatus adjusts the template fuse unit until the rule is satisfied.

Article A21. The method of article A12, where the i-th layer is a self-defined layer.

Article A22. A computer readable storage medium, on which computer program codes for fusing a neural network are stored, where, when the computer program codes are run by a processing apparatus, the method of any one of articles A1-A21 is performed. 2020110458882

2020110438963 Article B1. A computing apparatus for computing a neural network according to a template fuse unit, where the template fuse unit fuses a plurality of layers of the neural network, the computing apparatus includes a plurality of clusters, and each cluster includes:
 a shared storage unit configured to load an on-chip unit map from an off-chip memory;
 a plurality of processor cores, where each processor core includes:
 a neuron storage unit configured to load a sub-map from the shared storage unit, where the sub-map is at least part of the on-chip unit map; and
 an operation unit configured to compute the sub-map to generate intermediate results, where
 the intermediate results are reduced among the plurality of processor cores to generate a computing result corresponding to the on-chip unit map, and the shared storage unit stores the computing result back to the off-chip memory.

Article B2. The computing apparatus of article B1, where the off-chip memory stores a feature map, and when storage space required by the feature map is greater than available space of the shared storage unit, the on-chip unit map is a part of the feature map.

Article B3. The computing apparatus of article B2, where the feature map includes N, H, W, and C dimensions, and the on-chip unit map is formed by splitting the feature map in at least one of N, H, and W dimensions with specific granularity.

Article B4. The computing apparatus of article B1, where the off-chip memory stores a plurality of feature maps, and when storage space required by the plurality of feature maps is not greater than available space of the shared storage unit, the on-chip unit map includes the plurality of feature maps.

Article B5. The computing apparatus of article B4, where the sub-map is one of the plurality of feature maps.

Article B6. The computing apparatus of article B1, where the on-chip unit map includes N, H, W, and C dimensions, and the sub-map is formed by splitting the on-chip unit map in at least one of N, H, and W dimensions with specific granularity.

Article B7. The computing apparatus of article B1, where each cluster further includes a broadcast bus, one of the plurality of processor cores splits the on-chip unit map according to the number of the plurality of processor cores, the broadcast bus sends an intermediate result of each processor core to a next processor core, and the processor core computes an intermediate result of a previous processor core and a corresponding intermediate result that the processor core stores, so as to generate the computing result.

Article B8. An integrated circuit apparatus for computing a neural network according to a template fuse unit, including:
 an off-chip memory configured to store a feature map of the neural network;
 a processing apparatus configured to fuse a plurality of layers of the neural network according to a fusion policy to generate the template fuse unit and split the feature map into an on-chip unit map; and
 a computing apparatus, which includes a plurality of clusters, where each cluster includes:
 a shared storage unit configured to load the on-chip unit map;
 a plurality of processor cores, where each processor core includes:
 a neuron storage unit configured to load a sub-map from the shared storage unit, where the sub-map is at least part of the on-chip unit map; and
 an operation unit configured to compute the sub-map to generate intermediate results, where
 the intermediate results are reduced among the plurality of processor cores to generate a computing result corresponding to the on-chip unit map, and the shared storage unit stores the computing result back to the off-chip memory.

Article B9. The integrated circuit apparatus of article B8, where, when the processing apparatus judges that storage space required by the feature map is greater than available space of the shared storage unit, the feature map is split into the on-chip unit map.

Article B10. The integrated circuit apparatus of article B9, where the feature map includes N, H, W, and C dimensions, and the processing apparatus splits the feature map in at least one of N, H, and W dimensions with specific granularity.

Article B11. The integrated circuit apparatus of article B8, where, when the processing apparatus judges that storage space required by the feature map is not greater than available space of the shared storage unit, the on-chip unit map includes a plurality of feature maps.

Article B12. The integrated circuit apparatus of article B11, where the sub-map is one of a plurality of on-chip unit maps.

Article B13. The integrated circuit apparatus of article B9, where the on-chip unit map includes N, H, W, and C dimensions, and one of the plurality of processor cores splits the on-chip unit map into the sub-map in at least one of N, H, and W dimensions with specific granularity.

Article B14. The integrated circuit apparatus of article B8, where each cluster further includes a broadcast bus, one of the plurality of processor cores splits the on-chip unit map according to the number of the plurality of processor cores, the broadcast bus sends an intermediate result of each processor core to a next processor core, and the processor core computes an intermediate result of a previous processor core and a corresponding intermediate result that the processor core stores, so as to generate the computing result.

Article B15. A board card, including the integrated circuit apparatus of any one of articles B8-B14.

Article B16. A method for computing a neural network according to a template fuse unit, where the template fuse unit fuses a plurality of layers of the neural network, the method includes:
- loading an on-chip unit map;
- loading a sub-map, where the sub-map is at least part of the on-chip unit map;
- computing the sub-map to generate intermediate results;
- reducing the intermediate results to generate a computing result corresponding to the on-chip unit map; and
- storing the computing result back.

Article B17. The method of article B16, further including: storing a feature map of the neural network.

Article B18. A computer readable storage medium, on which computer program codes for computing a neural network according to a template fuse unit are stored, where, when the computer program codes are run by a processing apparatus, the method of any one of articles B16-B17 is performed. 2020110438963

2020110458524 Article C1. An integrated circuit apparatus for fusing a neural network, including:
- a computing apparatus, which includes a plurality of processor cores, where each processor core includes a neuron storage unit and a weight storage unit;
- a processing apparatus configured to:
- fuse the neural network to create a template fuse unit, where the template fuse unit has an on-chip unit map and a corresponding weight of the on-chip unit map; and
- divide the template fuse unit into a plurality of sub template fuse units according to sizes of the neuron storage unit and the weight storage unit, where each sub template fuse unit has a sub-map and a corresponding weight of the sub-map, the sub-map is a part of the on-chip unit map, and the corresponding weight of the sub-map is a part of the corresponding weight of the on-chip unit map, where
- the computing apparatus loads the sub-map to the neuron storage unit, loads the corresponding weight of the sub-map to the weight storage unit, and performs computing in the unit of the sub template fuse unit.

Article C2. The integrated circuit apparatus of article C1, where the computing apparatus further includes a shared storage unit, the sub-map is moved from the shared storage unit to the neuron storage unit, and the corresponding weight of the sub-map is moved from the shared storage unit to the weight storage unit.

Article C3. The integrated circuit apparatus of article C2, further including an off-chip memory, where the on-chip unit map and the corresponding weight of the on-chip unit map are moved from the off-chip memory to the shared storage unit.

Article C4. The integrated circuit apparatus of article C3, where the computing apparatus further includes an operation unit, the sub-map is read from the neuron storage unit, the corresponding weight of the sub-map is read from the weight storage unit, and an intermediate result is generated after computing, where the intermediate result is temporarily stored in the neuron storage unit.

Article C5. The integrated circuit apparatus of article C4, where the intermediate result is moved from the neuron storage unit to the shared storage unit.

Article C6. The integrated circuit apparatus of article C5, where one of the plurality of processor cores reduces an intermediate result of each sub template fuse unit to generate a computing result, and the computing result is moved from the shared storage unit to the off-chip memory.

Article C7. A board card, including the integrated circuit apparatus of any one of articles C1-C6.

Article C8. A computing apparatus for computing a neural network according to a template fuse unit, where the template fuse unit is divided into a plurality of sub template fuse units, where each sub template fuse unit has a sub-map and a corresponding weight of the sub-map, and the computing apparatus includes a plurality of processor cores, where each processor core includes a neuron storage unit and a weight storage unit, and the computing apparatus loads the sub-map to the neural storage unit, loads the corresponding weight of the sub-map to the weight storage unit, and performs computing in the unit of the sub template fuse unit.

Article C9. The computing apparatus of article C8, where the computing apparatus further includes a shared storage unit, the sub-map is moved from the shared storage unit to the neuron storage unit, and the corresponding weight of the sub-map is moved from the shared storage unit to the weight storage unit.

Article C10. The computing apparatus of article C9, which is connected to an off-chip memory, where the template fuse unit has an on-chip unit map and a corresponding weight of the on-chip unit map, the sub-map is a part of the on-chip unit map, the corresponding weight of the sub-map is a part of the corresponding weight of the on-chip unit map, and the on-chip unit map and the corresponding weight of the on-chip unit map are moved from the off-chip memory to the shared storage unit.

Article C11. The computing apparatus of article C10, further including an operation unit, where the sub-map is read from the neuron storage unit, the corresponding weight of the sub-map is read from the weight storage unit, and an intermediate result is generated after computing, where the intermediate result is temporarily stored in the neuron storage unit.

Article C12. The computing apparatus of article C11, where the intermediate result is moved from the neuron storage unit to the shared storage unit.

Article C13. The computing apparatus of article C12, where one of the plurality of processor cores reduces an intermediate result of each sub template fuse unit to generate a computing result, and the computing result is moved from the shared storage unit to the off-chip memory.

Article C14. A processing apparatus for fusing a neural network, which is connected to a computing apparatus, where the computing apparatus includes a plurality of processor cores, each processor core includes a neuron storage unit and a weight storage unit, and the processing apparatus is configured to
- fuse the neural network to create a template fuse unit, where the template fuse unit has an on-chip unit map and a corresponding weight of the on-chip unit map; and
- divide the template fuse unit into a plurality of sub template fuse units according to sizes of the neuron storage unit and the weight storage unit, where each sub template fuse unit has a sub-map and a corresponding weight of the sub-map, the sub-map is a part of the on-chip unit map, and the corresponding weight of the sub-map is a part of the corresponding weight of the on-chip unit map.

Article C15. A method for fusing a neural network in an integrated circuit apparatus, where the integrated circuit apparatus includes a computing apparatus, which includes a plurality of processor cores, where each processor core includes a neuron storage unit and a weight storage unit, and the method includes:

fusing the neural network to create a template fuse unit, where the template fuse unit has an on-chip unit map and a corresponding weight of the on-chip unit map; and dividing the template fuse unit into a plurality of sub template fuse units according to sizes of the neuron storage unit and the weight storage unit, where each sub template fuse unit has a sub-map and a corresponding weight of the sub-map, the sub-map is a part of the on-chip unit map, and the corresponding weight of the sub-map is a part of the corresponding weight of the on-chip unit map; and loading the sub-map to the neuron storage unit, loading the corresponding weight of the sub-map to the weight storage unit, and performing computing in the unit of the sub template fuse unit.

Article C16. A computer readable storage medium, on which computer program codes for fusing a neural network are stored, where, when the computer program codes are run by a processing apparatus, the method of article C15 is performed. 2020110458524

The embodiments of the present disclosure have been described in detail above. The present disclosure uses specific examples to explain principles and implementations of the present disclosure. The descriptions of the embodiments above are only used to facilitate understanding of the method and core ideas of the present disclosure. Simultaneously, those skilled in the art may change the specific implementations and application scope of the present disclosure based on the ideas of the present disclosure. In summary, the content of this specification should not be construed as a limitation on the present disclosure.

What is claimed:

1. An integrated circuit apparatus for performing neural network computing, comprising:
    a processing apparatus configured to create a template fuse unit;
    a compiler configured to convert the template fuse unit into an object code;
    a linker configured to link the object code with a library to form an executable file; and
    a computing apparatus configured to perform the executable file to implement the neural network computing,
    wherein, when converting the template fuse unit into the object code, the compiler derives a shape of the template fuse unit, and
    wherein the compiler performs a reverse derivation forward from outputs for required input data and redundancy.

2. The integrated circuit apparatus of claim 1, wherein, when creating the template fuse unit, the processing apparatus is configured to:
    select a starting layer of the template fuse unit according to a starting rule of a fusion policy; and
    perform a fusion based on the starting layer and check rules of the fusion policy to create the template fuse unit.

3. The integrated circuit apparatus of claim 1, wherein the compiler derives an address of on-chip storage space of a whole control flow graph and implements access to a general address.

4. The integrated circuit apparatus of claim 3, wherein the compiler is configured to:
    divide basic blocks initially according to a division of the template fuse unit; and
    confirm the basic blocks and mutual relations between the basic blocks after iterative operations.

5. The integrated circuit apparatus of claim 3, wherein the compiler is configured to:
    judge how much data in a previous template fuse unit is able to be used by a next template fuse unit; and
    plan the address of on-chip storage space according to a judging result.

6. The integrated circuit apparatus of claim 5, wherein the processing apparatus allocates on-chip storage space according to the address of on-chip storage space.

7. A board card, comprising an integrated circuit apparatus that includes:
    a processing apparatus configured to create a template fuse unit;
    a compiler configured to convert the template fuse unit into an object code;
    a linker configured to link the object code with a library to form an executable file; and
    a computing apparatus configured to perform the executable file to implement the neural network computing,
    wherein the compiler derives a shape of the template fuse unit in converting the template fuse unit into the object code, and
    wherein the compiler performs a reverse derivation forward from outputs for required input data and redundancy.

8. The board card of claim 7, wherein the processing apparatus is further configured to:
    select a starting layer of the template fuse unit according to a starting rule of a fusion policy; and
    perform a fusion based on the starting layer and check rules of the fusion policy to create the template fuse unit.

9. The board card of claim 7, wherein the compiler derives an address of on-chip storage space of a whole control flow graph and implements access to a general address.

10. The board card of claim 9, wherein the compiler is configured to:
    divide basic blocks initially according to a division of the template fuse unit; and
    confirm the basic blocks and mutual relations between the basic blocks after iterative operations.

11. The board card of claim 9, wherein the compiler is configured to:
    judge how much data in a previous template fuse unit is able to be used by a next template fuse unit; and
    plan the address of on-chip storage space according to a judging result.

12. The board card of claim 11, wherein the processing apparatus allocates on-chip storage space according to the address of on-chip storage space.

* * * * *